(12) United States Patent
Li et al.

(10) Patent No.: US 12,086,569 B2
(45) Date of Patent: Sep. 10, 2024

(54) METHOD AND DEVICE FOR QUANTUM DIVISION OPERATION WITH PRECISION

(71) Applicant: ORIGIN QUANTUM COMPUTING TECHNOLOGY (HEFEI) CO., LTD., Hefei (CN)

(72) Inventors: Ye Li, Hefei (CN); Menghan Dou, Hefei (CN)

(73) Assignee: Origin Quantum Computing Technology (Hefei) Co., Ltd., Hefei (CN)

( * ) Notice: Subject to any disclaimer, the term of this patent is extended or adjusted under 35 U.S.C. 154(b) by 0 days.

(21) Appl. No.: 18/029,558

(22) PCT Filed: Sep. 17, 2021

(86) PCT No.: PCT/CN2021/119125
§ 371 (c)(1),
(2) Date: Mar. 30, 2023

(87) PCT Pub. No.: WO2022/068618
PCT Pub. Date: Apr. 7, 2022

(65) Prior Publication Data
US 2023/0376276 A1    Nov. 23, 2023

(30) Foreign Application Priority Data

Sep. 30, 2020  (CN) .......................... 202011058718.8
Sep. 30, 2020  (CN) .......................... 202011058756.3
(Continued)

(51) Int. Cl.
*G06F 7/575* (2006.01)
*G06F 7/48* (2006.01)
*G06N 10/20* (2022.01)

(52) U.S. Cl.
CPC ............ *G06F 7/575* (2013.01); *G06F 7/4824* (2013.01); *G06N 10/20* (2022.01)

(58) Field of Classification Search
CPC .......... G06F 7/462; G06F 7/463; G06F 7/575; G06F 7/4824; G06F 17/00; G06F 17/10; G06F 17/11; G06F 17/18
See application file for complete search history.

(56) References Cited

U.S. PATENT DOCUMENTS
7,523,152 B2    4/2009   Roussel et al.

FOREIGN PATENT DOCUMENTS
CN      1423189 A      6/2003
CN    105389157 A      3/2016
(Continued)

OTHER PUBLICATIONS

Wikipedia, Mathematical formulation of quantum mechanics, citing sources dated no later than 2019 (Year: 2019).*
(Continued)

*Primary Examiner* — Emily E Larocque
(74) *Attorney, Agent, or Firm* — SALIWANCHIK, LLOYD & EISENSCHENK

(57) ABSTRACT

A method and device for quantum division operation with precision. The method includes: obtaining dividend data and divisor data to be operated, transforming the dividend data into a first target quantum state, and transforming the divisor data into a second target quantum state; for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; for a current first target (Continued)

quantum state and a current second target quantum state, iteratively executing quantum state evolution corresponding to fractional part operation of the quotient; and outputting a finally obtained quantum state on a qubit with preset precision bits.

12 Claims, 24 Drawing Sheets

(30) Foreign Application Priority Data

Sep. 30, 2020 (CN) .......................... 202011058770.3
Sep. 30, 2020 (CN) .......................... 202011059513.1
Sep. 30, 2020 (CN) .......................... 202011064018.X

(56) References Cited

FOREIGN PATENT DOCUMENTS

| | | |
|---|---|---|
| CN | 107066234 | 8/2017 |
| CN | 112162724 A | 1/2021 |

OTHER PUBLICATIONS

C.P. Williams, Explorations in Quantum Computing, Springer 2011 (Year: 2011).*
A. Khosropour et al., Quantum Division Circuit Based on Restoring Division Algorithm, 2011 Eighth International Conference on Information Technology: New Generations, 2011 (Year: 2011).*
H. Thapliyal et al., Quantum Circuit Designs of Integer Division Optimizing T-count and T-depth, IEEE Transactions on Emerging Topics in Computing, 2018 (Year: 2018).*
H, Thapliyal et al., Quantum Circuit Design of Integer Division Optimizing Ancillary Qubits and T-Count, arXiv:1609.01241v1 [quant-ph], 2016 (Year: 2016).*
M. Dou et al., QPanda: high-performance quantum computing framework for multiple application scenarios, arXiv:2212.14201v1 [cs.PL], 2022 (Year: 2022).*
Chen, S., "Ten-Valued Logic Circuit and Ten-Valued Digital Fuzzy Computer." Study of Decimal System Operation Method and Operation Components, 2002, Abstract.
Steven A. Cuccaro et al., A new quantum ripple-carry addition circuit, arXiv:quant-ph/0410184v1, Oct. 22, 2004, 9 pages.
Moayad A. Fahdil et al., Operations Algorithms on Quantum Computer, IJCSNS International Journal of Computer Science and Network Security, vol. 10, No. 1, Jan. 2010, 11 pages.

* cited by examiner

S2201 — Obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value S2202 — Obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data;

S2203 — Executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data S2204 — For the first complement quantum state and the second complement quantum state, executing quantum state evolution corresponding to the addition operation, so as to evolve the first complement quantum state into a third target quantum state including the sum of the complement of the minuend data and the complement of said subtrahend data S2205 — According to the sign-bit sub-quantum state in the third target quantum state and the quantum state of the first preset auxiliary qubit, controlling the third target quantum state to execute a quantum state evolution corresponding to the complement operation, to obtain and output an evolved fourth target quantum state as the subtraction operation result of subtracting the subtrahend data from the minuend data; wherein the fourth target quantum state is a quantum state including the complement of the sum of the complements

FIG.14

METHOD AND DEVICE FOR QUANTUM DIVISION OPERATION WITH PRECISION

CROSS REFERENCE TO RELATED APPLICATIONS

This disclosure is a National Stage of International Application No. PCT/CN2021/119125, filed on Sep. 17, 2021, which claims priority to: Chinese Patent Application No. 202011058756.3 entitled "QUANTUM ADDITION OPERATION METHOD, DEVICE, ELECTRONIC DEVICE AND STORAGE MEDIUM" filed with the CNIPA on Sep. 30, 2020; Chinese Patent Application No. 202011058770.3 entitled "QUANTUM SUBTRACTION OPERATION METHOD, DEVICE, ELECTRONIC DEVICE AND STORAGE MEDIUM" filed with the CNIPA on Sep. 30, 2020; Chinese Patent Application No. 202011058718.8 entitled "QUANTUM MULTIPLICATION OPERATION METHOD, DEVICE, ELECTRONIC DEVICE AND STORAGE MEDIUM" filed with the CNIPA on Sep. 30, 2020; Chinese Patent Application No. 202011064018.X entitled "QUANTUM DIVISION OPERATION METHOD, DEVICE, ELECTRONIC DEVICE AND STORAGE MEDIUM" filed with the CNIPA on Sep. 30, 2020; and Chinese Patent Application No. 202011059513.1 entitled "QUANTUM DIVISION OPERATION METHOD AND DEVICE WITH PRECISION" filed with the CNIPA on Sep. 30, 2020; all of which are hereby incorporated by reference in their entireties.

TECHNICAL FIELD

The present disclosure relates to the field of quantum computing, in particular to a method and device for quantum division operation with precision.

BACKGROUND

Quantum computers take advantage of Quantum Superposition, and in some cases, they are theoretically capable of exponential acceleration. For example, although RSA key cracking takes hundreds of years on a classical computer, it takes only a few hours via execution of a quantum algorithm on a quantum computer. At present, however, extensive execution of quantum algorithms is not yet possible due to limited computing power of existing quantum computers, as existing quantum computers can only manipulate a limited number of bits restricted by current development status of quantum chip hardwares. Accordingly, quantum computing simulation methods are required for extensive execution of quantum algorithms.

In the process of implementing simulation of quantum algorithms, various quantum logic gates are typically required to construct the quantum algorithms. However, in the case of relying only on various quantum logic gates to construct quantum algorithms, there is no such quantum logic gates as corresponding to classical operations e.g., addition, subtraction, multiplication, and division. For this reason, there has been a pressing need for a technology that can realize basic arithmetic operations in quantum circuits, so as to fill the gap in the related art.

SUMMARY

In order to address the disadvantages in the prior art, the present disclosure aims at providing a method and device for quantum division operation with precision, which can realize a basic arithmetic operation in quantum circuits and can fill the gap in the related art.

The present disclosure adopts the following technical solution:

An embodiment of the present disclosure provides a method for quantum division operation with precision, the method including: obtaining dividend data and divisor data to be operated, transforming the dividend data into a first target quantum state, and transforming the divisor data into a second target quantum state; wherein each of the first target quantum state and the second target quantum state includes: a sign-bit sub-quantum state representing a data sign, and a value bit sub-quantum state representing a data value; for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation; for a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits; and outputting a finally obtained quantum state on a qubit with preset precision bits, wherein the quantum state includes binary values for fractional part of the quotient.

Optionally, said "for the first target quantum state and the second target quantum state, iteratively executing quantum state evolution corresponding to a subtraction operation, counting the number of executions of the subtraction operation until the dividend data is reduced to a negative number" includes: for a current first target quantum state and the second target quantum state, executing quantum state evolution corresponding to the subtraction operation, to obtain the first target quantum state including a subtraction operation result; for a third target quantum state of a current first preset auxiliary qubit and a fourth target quantum state of a current second preset auxiliary qubit, executing quantum state evolution corresponding to the subtraction operation, to increment a value contained in the current third target quantum state by 1; wherein an initial value contained in the third target quantum state and a value contained in the fourth target quantum state are both −1; measuring a sign-bit sub-quantum state of the first target quantum state currently including the subtraction operation result, and determining whether a value of the sign bit of the first target quantum state that currently contains the subtraction operation result is 0; in the case that the value of the sign bit of the first target quantum state that currently contains the subtraction operation result is 0, returning and executing the step "for a current first target quantum state and the second target quantum state, executing quantum state evolution corresponding to the subtraction operation", until it is determined that the value of the sign bit of the first target quantum state currently including the subtraction operation result is 1.

Optionally, said "outputting a finally obtained counting result as integer part of a quotient of dividing the dividend data by the divisor data" includes: outputting a finally obtained third target quantum state, wherein the third target quantum state contains an integer-bit binary value of a quotient of dividing the dividend data by the divisor data.

Optionally, said "for a current first target quantum state and a current second target quantum state, iteratively executing quantum state evolution corresponding to fractional part operation of the quotient" includes: inverting the sign-bit sub-quantum state of the current second target quantum state, executing the quantum state evolution corresponding to the subtraction operation for the current first target quantum state and the second target quantum state with its sign bit inverted, so as to evolve the current first target quantum state to a quantum state including a binary value of a remainder of dividing said dividend data by said divisor data; left-shifting sub-quantum state of each bit of the current first target quantum state by one bit, and re-inverting the sign-bit sub-quantum state of the current second target quantum state; for the first target quantum state that has been left-shifted by one bit and the second target quantum state that has been re-inverted, iteratively executing quantum state evolution corresponding to the subtraction operation, counting the number of executions of the subtraction operation until the first target quantum state that has been left-shifted by one bit is reduced to a negative number, and obtaining a fractional part quantum state including a binary value of the counting result on a preset intermediate bit qubit; swapping a sub-quantum state of the last bit of the fractional part quantum state with the initial quantum state |0⟩ of the corresponding preset precision bit qubit, and outputting a quantum state on the preset precision bit qubit after swapping; and returning to execute the step of "inverting the sign-bit sub-quantum state of the current second target quantum state, executing the quantum state evolution corresponding to the subtraction operation for the current first target quantum state and the second target quantum state with its sign bit inverted", until a preset number of iterations required for the quantum state evolution corresponding to the iterative execution of the fractional part operation of the quotient is reached, wherein the preset number of iterations is equal to the number of precision bits in the fractional part to be operated.

Optionally, the method further includes: obtaining a preset sign-bit-qubit, and executing a preset quantum logic gate operation for a qubit corresponding to the sign-bit sub-quantum state of the first target quantum state, a qubit corresponding to the sign-bit sub-quantum state of the second target quantum state, the first preset auxiliary qubit and the preset sign-bit-qubit, so as to finally obtain a sign value represented by a sign-bit-qubit sub-quantum state in the third target quantum state.

Optionally, said executing the quantum state evolution corresponding to the subtraction operation further includes: for two quantum states to be operated, i.e, a minuend quantum state representing the minuend data and a subtrahend quantum state representing the subtrahend data, obtaining a quantum state of a third preset auxiliary qubit, and according to a sign-bit sub-quantum state of the minuend quantum state and the quantum state of the third preset auxiliary qubit, controlling the minuend quantum state to execute quantum state evolution corresponding to the complement operation so as to obtain a first complement quantum state; wherein the first complement quantum state is a quantum state including the complement of the minuend data; for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state including the complement of the subtrahend data; for the first complement quantum state and the second complement quantum state, executing quantum state evolution corresponding to the addition operation, so as to evolve the first complement quantum state into a fifth target quantum state including a sum of a complement of the minuend data and a complement of the subtrahend data; according to the sign-bit sub-quantum state in the fifth target quantum state as well as the quantum state of the third preset auxiliary qubit, controlling the fifth target quantum state to execute the quantum state evolution corresponding to the complement operation, so as to obtain an evolved sixth target quantum state which is output as the subtraction operation result of subtracting the subtrahend data from the minuend data, wherein the sixth target quantum state is a quantum state including a complement of the sum of the complement; and according to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit inversion for the sign-bit sub-quantum state in the current subtrahend quantum state, so as to restore the current subtrahend quantum state.

Optionally, said "according to a sign-bit sub-quantum state of the minuend quantum state and the quantum state of the third preset auxiliary qubit, controlling the minuend quantum state to execute quantum state evolution corresponding to the complement operation" includes: executing a CNOT gate operation on the first sign-bit-qubit corresponding to the sign-bit sub-quantum state in the minuend quantum state and the third preset auxiliary qubit, wherein the first sign-bit-qubit is a controlling bit and the third preset auxiliary qubit is a controlled bit; according to the quantum state of the third preset auxiliary qubit after execution of the CNOT gate operation, controlling whether the current minuend quantum state executes the quantum state evolution corresponding to the complement operation: if yes, inverting the non-sign-bit sub-quantum state of the current minuend quantum state, and for the inverted minuend quantum state and the fourth preset auxiliary qubit quantum state |1⟩, executing quantum state evolution corresponding to the addition operation to obtain the evolved first complement quantum state; otherwise, using the minuend quantum state as the first complement quantum state; and executing CNOT gate operation on the current first sign-bit-qubit and the third preset auxiliary qubit to restore the current quantum state of the third preset auxiliary qubit; wherein the first sign-bit-qubit is a controlling bit, and the third preset auxiliary qubit is a controlled bit.

Optionally, said "for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation" includes: for the second sign-bit-qubit corresponding to the sign-bit sub-quantum state in the subtrahend quantum state, executing an X-gate operation to obtain the inverted sign-bit sub-quantum state; executing a CNOT gate operation on the current second sign-bit-qubit and the third preset auxiliary qubit, wherein the second sign-bit-qubit is a controlling bit, and the third preset auxiliary qubit is a controlled bit; according to the current quantum state of the third preset auxiliary qubit after execution of the CNOT gate operation, controlling whether the current subtrahend quantum state executes the quantum state evolution corresponding to the complement operation; if yes, inverting the non-sign-bit sub-quantum state of the current subtrahend quantum state, and for the inverted subtrahend quantum state and the fourth preset auxiliary qubit quantum state |1⟩, executing quantum state evolution corresponding to the addition operation to obtain the evolved second complement quantum state; otherwise, using the current subtrahend quantum state as the second complement quantum state; executing a CNOT gate operation on the current second sign-bit-qubit and the third preset auxiliary qubit to restore the current quantum state of the third preset auxiliary qubit; wherein the second sign-bit-qubit is a controlling bit, and the third preset auxiliary qubit is a controlled bit.

Optionally, said "executing quantum state evolution corresponding to the addition operation" includes: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules; according to an addition instruction, cascading the MAJ modules and the UMA modules both in the target module number, to generate a target quantum circuit corresponding to the adder; executing, with the target quantum circuit, an addition operation of each sub-quantum state of the two quantum states to be operated, so as to generate and output a target quantum state result.

Optionally, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the method further includes, before the step "according to an addition instruction, cascading the MAJ modules and the UMA modules both in the target module number, to generate a target quantum circuit corresponding to the adder": obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Optionally, the MAJ module and the UMA module each includes three input items and three output items, said step "according to an addition instruction, cascading the MAJ modules and the UMA modules both in the target module number, to generate a target quantum circuit corresponding to the adder" specifically includes: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

Optionally, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, said step "according to an addition instruction, using three output items of an MAJ cascading module as three input items of a corresponding UMA cascading module, so as to cascade the MAJ cascading module with the corresponding UMA cascading module to generate a target quantum circuit corresponding to the adder" specifically includes: according to the addition instruction, using the carry output item output by the previous MAJ module and the two sub-quantum state input items to be operated as the three input items of the next MAJ module, so as to cascade the MAJ modules in the target module number; using two intermediate result output items of an MAJ module as two input items of a corresponding UMA module, obtaining a previous UMA module preceding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module; and adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

Another embodiment of the present disclosure provides a device of quantum division operation with precision, characterized by including: a transformation module, configured for: obtaining, by a processor dividend data and divisor data to be operated, transforming, by the processor the dividend data into a first target quantum state, and transforming, by the processor the divisor data into a second target quantum state; wherein each of the first target quantum state and the second target quantum state includes: a sign-bit sub-quantum state representing a data sign, and a value bit sub-quantum state representing a data value; a first quantum state evolution module, configured for: for the first target quantum state and the second target quantum state, iteratively executing, by the processor quantum state evolution corresponding to a subtraction operation, and counting, by the processor the number of executions of the subtraction operation until the dividend data is reduced to a negative number, and outputting by the processor, a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation; a second quantum state evolution module, configured for: for a current first target quantum state and a current second target quantum state, iteratively executing by the processor, quantum state evolution corresponding to fractional part operation of the quotient, wherein a preset number of iterations therefor is equal to the number of precision bits in the fractional part to be operated, and after each iteration, obtaining, by the processor, a quantum state of a value including corresponding precision bits on a corresponding qubit with preset precision bits; and an output module, configured for outputting, by the processor, a finally obtained quantum state on a qubit with preset precision bits, wherein the quantum state includes binary values for fractional part of the quotient.

The present disclosure also provides an electronic device, including a memory having a computer program stored therein, and a processor configured to execute the computer program to perform the above steps and method.

The present disclosure also provides a storage medium having a computer program stored therein, the computer program being configured to perform during execution thereof the above steps and method.

Compared with the prior art, the method for quantum division operation with precision provided in the present disclosure obtains dividend data and divisor data to be operated, transforms the dividend data into a first target quantum state, and transforms the divisor data into a second target quantum state; for the first target quantum state and the second target quantum state, iteratively executes quantum state evolution corresponding to a subtraction operation, counts the number of executions of the subtraction operation until the dividend data is reduced to a negative number, and outputs a finally obtained counting result as integer part of a quotient of dividing the dividend data by the divisor data; for a current first target quantum state and a current second target quantum state, iteratively executes quantum state evolution corresponding to fractional part operation of the quotient; and outputs a finally obtained quantum state on a qubit with preset precision bits. Thereby, the disclosure realizes a basic arithmetic operation that can be used in quantum circuits, and fills the gap in the related art.

BRIEF DESCRIPTION OF THE DRAWINGS

FIG. 14 is a schematic flow chart of a quantum subtraction method provided in an embodiment of the present disclosure;

DETAILED DESCRIPTION

The exemplary embodiments described below with reference to the accompanying figures are only used for explaining the present disclosure, and should not be construed as limiting thereto.

It is to be noted that the terms "first" and "second" in the description and claims of the present disclosure are used for distinguishing between similar objects, and are not necessarily used for describing a specific order or sequence.

Embodiments of the present disclosure provide method and device for quantum addition/quantum subtraction/quantum multiplication/quantum division/quantum division with precision, which are used for implementing basic arithmetic operations of qubits in quantum circuits. The method can be applied for electronic equipment such as mobile terminals, in particular mobile phones and tablet computers; and computer terminals, in particular ordinary computers and quantum computers.

Figure 1:
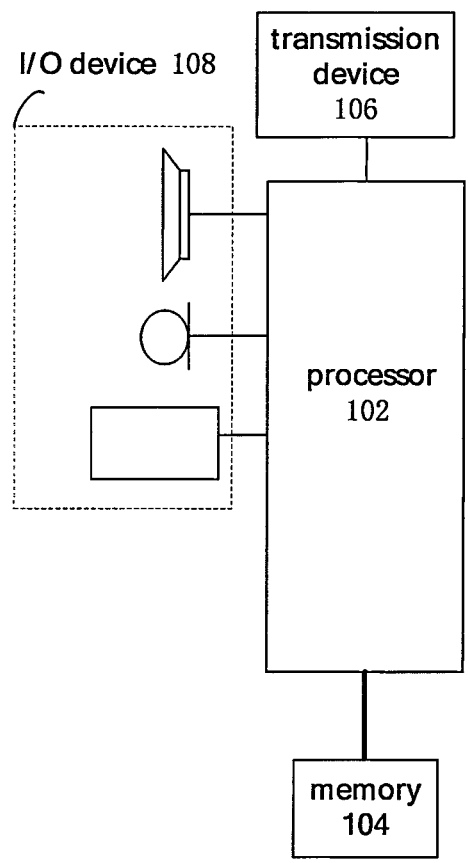
FIG. 1 is a computer terminal hardware structural block diagram of quantum addition/quantum subtraction/quantum multiplication/quantum division/quantum division with precision provided in an embodiment of the present disclosure.

The following will describe the embodiments in detail, using operation thereof on a computer terminal as an example. FIG. 1 is a block diagram of the hardware structure of a computer terminal of a method for quantum addition/quantum subtraction/quantum multiplication/quantum division/quantum division operation with precision, according to an embodiment of the present disclosure. As shown in FIG. 1, a computer terminal may include one or more (only one is shown in FIG. 1) processor 102 (a processor 102 may include but not limited to processing devices such as microprocessors MCUs or programmable logic devices FPGAs) and a memory 104 for storing data. Optionally, the above-mentioned computer terminal may further include a transmission device 106 and an I/O (input/output) device 108 for communication functions. Those skilled in the art can understand that the structure shown in FIG. 1 is only for illustration, and constitutes no limitation to the structure of the above computer terminal. For example, the computer terminal may also include more or fewer components than shown in FIG. 1, or have a configuration different from that shown in FIG. 1.

The memory 104 can be used for storing software programs and modules of application softwares, such as program instructions/modules corresponding to the quantum computing simulation method in the embodiment of the present disclosure. By running software programs and modules stored in the memory 104, the processor 102 executes various functional applications and data processing, i.e., to perform the above-mentioned method. The memory 104 may include a high-speed random-access memory, and may also include non-volatile memories, such as one or more of magnetic storage devices, flash memory, or other non-volatile solid-state memories. In some examples, the memory 104 may further include a memory that is remotely located relative to the processor 102, and these remote memories may be connected to a computer terminal through a network. Examples of the aforementioned networks include, but are not limited to, the Internet, intranets, local area networks, mobile communication networks, and combinations thereof.

The transmission device 106 is used for receiving or transmit data via a network. A specific example of the above-mentioned network may include a wireless network provided by a communication provider of the computer terminal. In one example, the transmission device 106 includes a network adapter (Network Interface Controller, NIC), which can be connected to other network devices through a base station so as to communicate with the Internet. In one example, the transmission device 106 may be a radio frequency (Radio Frequency, RF) module, which is used for communicating with the Internet in a wireless manner.

It is to be noted that a real quantum computer is of a hybrid structure, which consists of two parts: one is a classical computer, which functions to execute classical computing and control; the other is a quantum device, which functions to run quantum programs and implementing quantum computing. A quantum program is a series of instruction sequences written in a quantum language such as Qrunes that can be run on a quantum computer, which supports quantum logic gate operations and ultimately realizes quantum computing. Specifically, a quantum program is a series of instruction sequences that operate quantum logic gates in a certain sequence.

In practical applications, due to the limitation of the development of quantum device hardware, quantum computing simulations are usually required to verify quantum algorithms, quantum applications, etc. Quantum computing simulation is the process of simulating the operation of quantum programs corresponding to specific problems using a virtual architecture (that is, a quantum virtual machine) built with the resources of ordinary computers. Typically, quantum programs corresponding to specific problems need to be constructed. The quantum program referred to in the embodiment of the present disclosure is a program written in a classical language to characterize qubits and their evolution, in which qubits, quantum logic gates, etc. related to quantum computing all have expressions with corresponding classical codes.

As an embodiment of quantum programs, quantum circuits, also known as quantum logic circuits, are the most commonly used general-purpose quantum computing models, which means circuits that operate on qubits under abstract concepts: components thereof include qubits, circuits (timelines), and various quantum logic gates; and results thereof usually need to be read out through quantum measurement operations.

Unlike traditional circuits, which are connected by metal wires to transmit voltage signals or current signals, in quantum circuits, the circuits can be regarded as connected by time, that is, the state of qubits evolves naturally with time. In this process, it follows the instruction of the Hamiltonian operator, and is operated upon its encounter with a logic gate.

A quantum program as a whole corresponds to a total quantum circuit, and the quantum program in the present disclosure refers to the total quantum circuit, wherein the total number of qubits in the total quantum circuit is the same as the total number of qubits in the quantum program. It can be understood that: a quantum program can be consisted of quantum circuits, measurement operations for qubits in quantum circuits, registers for storing measurement results, and control flow nodes (jump instructions). A quantum circuit can contain tens, hundreds or even tens of thousands of quantum logic gate operations. An execution process of a quantum program is the process of executing all quantum logic gates according to a certain time sequence. It is to be noted that "timing" refers to a time sequence in which a single quantum logic gate is executed.

It is to be noted that in classical computing, the most basic unit is a bit, and the most basic control mode is a logic gate. With a combination of logic gates, the purpose of controlling a circuit can be achieved. Similarly, the means by which to handle qubits is quantum logic gates. The use of quantum logic gates can make the quantum states evolve. Accordingly, quantum logic gates are the basis of quantum circuits. Quantum logic gates include single-bit quantum logic gates, such as Hadamard gates (H gates), Pauli-X gates, Pauli-Y gates, Pauli-Z gates, RX gates, RY gates, RZ gates; multi-bit quantum logic gates such as CNOT gates, CR gates, iSWAP gates, Toffoli gates. Quantum logic gates are generally represented by unitary matrices, which are not only in the form of matrices but also a certain kind of operation and transformation.

At present, there are not yet any implementation of classical operations such as the Four Arithmetic Operations, e.g., quantum logic gates for addition, subtraction, multiplication, and division. Accordingly, it is pressing to construct quantum circuits to realize the functional operation of any of the Four Arithmetic Operations, and in turn to promote the development of quantum computing, as well as landing and expanding of quantum applications.

Figure 2:
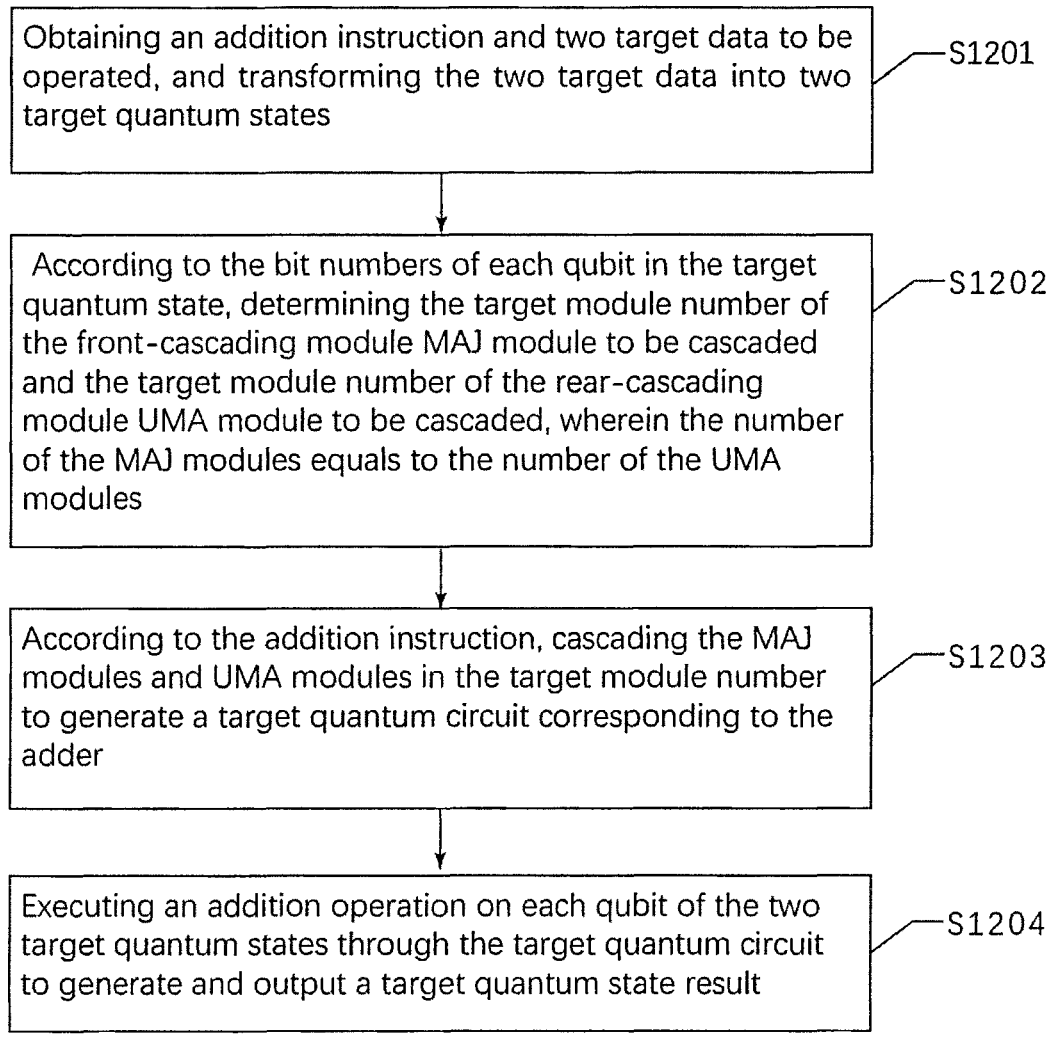
FIG. 2 is a schematic flow chart of a method for quantum addition operation provided in an embodiment of the present disclosure.

As shown in FIG. 2, Embodiment 1 of the present disclosure provides a method for quantum addition operation, the method includes:

S1201. Obtaining an addition instruction and two target data to be operated, and transforming the two target data into two target quantum states;

This embodiment is used for introducing how to implement the logic circuit of the addition operation in a quantum computer, and for describing each module in conjunction with the pre-developed software QPanda. Any classical logic circuit can also be represented by a quantum circuit. There is a one-to-one correspondence between a classical circuit and a quantum circuit. The input and output of a quantum logic gate/quantum circuit are both qubits, and the number of input qubits is equal to that of output qubits. Quantum circuits allow quantum states to be input in a superposition way, while output states can be superimposed and output in the same way as input states. Reversible computing is the basis of quantum computing, that is, any reversible circuit has an inverse circuit thereof: that is to say, by using each original output as input, it can be mapped exactly to an original input thereof. A reversible circuit means that for every output, there is exactly one input corresponding to it, and this mapping is a one-to-one mapping. For example, a NOT gate is a typical reversible logic gate, and its inverse circuit is itself. On the other hand, AND gates and OR gates are typical irreversible logic gates. For example, no matter whether the input of an AND gate is "0,0"; "0,1" or "1,0", the output remains 0, indicating that there is no unique mapping from output to input. "Reversible computing" means that there is no loss of information during the computing process, and the original state can be restored after inverse transformation. Irreversible computing means that there is loss of information. For example, from the output of an AND gate, the state of the input thereof cannot be inferred; while for reversible computation, it is deducible. Any sequentially executed reversible logic gates add up to a reversible operation. Because all quantum logic gates are reversible logic gates, quantum circuits are reversible circuits. However, quantum measurements are not reversible computations.

Specifically, the addition instruction input by the user is received, the two target data corresponding to the addition instruction are obtained, and the two target data to be operated are transformed into two corresponding target quantum states. The existing amplitude encoding method can be used for transforming the decimal data to be operated into a binary quantum state representation. For example, the first addition data is 7, a signed binary expression thereof is 0111, the highest bit is 0 to represent a positive number (1 to represent a negative number); the second addition data is 4, and a signed binary expression thereof is 011. Here, the target quantum state is the eigenstate corresponding to the two target qubits, and the number of all eigenstates corresponding to the qubits is 2 to the power of the bit number of qubits. For example: if a group of qubits is $q_0$, $q_1$, and $q_2$, which means the 0th, 1st, and 2nd qubits, and the order from high to low is $q_2$ $q_1$ $q_0$, then the group of qubits correspond to 8 eigenstates (that is, quantum states), namely: |000>, |001>, |010>, |011>, |100>, |101>, |110>, |111>, the superposition state between the eight eigenstates. The bit number of qubits in this group can be set according to actual operational needs.

Figure 3:
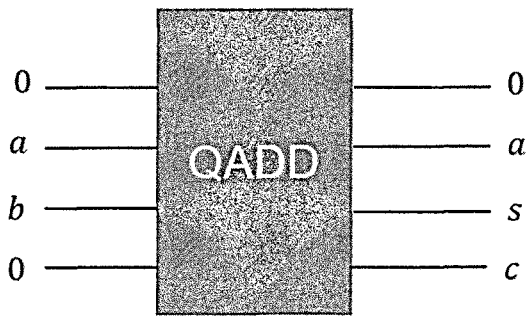
FIG. 3 is a schematic illustration of an adder provided in the present disclosure.

It is to be noted that, as shown in FIG. 3, the first qubit in the circuit is the first preset auxiliary qubit, which is initially in the state |0⟩ and will eventually return to the state |0⟩. The "a" and "b" in the circuit are the quantum states corresponding to data to be added, each corresponding to a set of qubits. The "c" represents the final carry item, corresponding to the preset carry auxiliary qubit, and the "s" is the output bit that does not include a carry bit. It is generally required that the bit number of qubits corresponding to "a" equals to that corresponding to "b", and the bit number of qubits corresponding to "s" equals to those corresponding to a and b. Here, $a_{[i]}$ and $b_{[i]}$ are respectively the i-th bit of the quantum state corresponding to the two addends, and $c_{[i]}$ is the previous-stage carry.

$$s_{[i]} = a_{[i]} \text{ XOR } b_{[i]} \text{ XOR } c_{[i]}.$$

$$c_{[i+1]} = (a_{[i]} \text{ AND } b_{[i]}) \text{XOR}(a_{[i]} \text{ AND } b_{[i]}) \text{XOR}(a_{[i]} \text{ AND } b_{[i]}).$$

Figure 4:
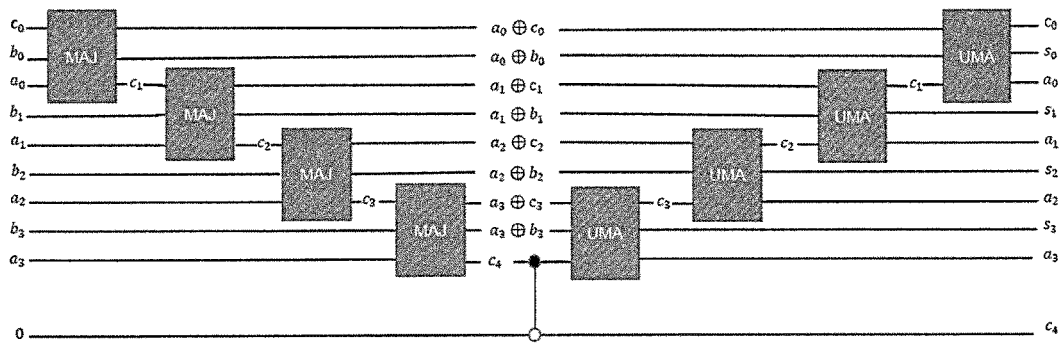
FIG. 4 is a schematic illustration of the quantum circuit of the adder provided in the present disclosure.

S1202. According to the bit numbers of each qubit in the target quantum state, determining the target module number of the front-cascading module MAJ module to be cascaded and the target module number of the rear-cascading module UMA module to be cascaded, wherein the number of the MAJ modules equals to the number of the UMA modules;

In this embodiment, as shown in FIG. 4, s=a+b. In the final output result, the first qubit (that is, the $c_0$ in the above cascaded circuit) will eventually return to the 0 state. Both "a" and "b" are numbers bound by a set of qubits, and it is generally required that a and b have the same number of bits. The "s" is the output bit that does not contain a carry, and has the same number of bits as "b". The "c" is the final carry term. AN MAJ module includes three input quantum states and three corresponding output quantum states, wherein the first qubit is the first preset auxiliary qubit, corresponding to the "$c_0$" in the quantum circuit. The first MAJ module includes three input quantum states and three corresponding output quantum states, where the three input quantum states are $c_0$, $a_0$, and $b_0$, and $a_0$ is the $0^{th}$ quantum state of the first quantum state to be operated, $b_0$ is the 0th quantum state of the second quantum state to be operated, $c_0$ is the quantum state of the third preset auxiliary qubit, and the initial value is 0, that is to say there is no carry. The three output quantum states are respectively $a_0 \oplus c_0$, $a_0 \oplus b_0$ and $c_1$, and $c_1$ is the carry after the addition of $a_0$ and $b_0$. Similarly, the three input quantum states of the next MAJ module are $c_1$, $a_1$, and $b_1$, and the three output quantum states are respectively $a_1 \oplus c_1$, $a_1 \oplus b_1$, and $c_2$, and so on to the last MAJ module.

For the first UMA module, it includes three input quantum states and three corresponding output quantum states, where the three output quantum states of the MAJ module correspond to the three input quantum states of the UMA module, and the three output quantum states are respectively $c_0$, $s_0$, $a_0$; wherein $s_0$ is the carry-free result of adding $a_0$ and $b_0$. Similarly, $s_1$ is the result of adding $a_1$ and $b_1$ without carry, and so on. The $c_4$ is the final carry item, corresponding to the preset carry auxiliary qubit. It is to be noted that, in practical applications, if there is no need to calculate the final carry, the qubit corresponding to $c_4$ does not have to be provided in the quantum circuit.

Moreover, the number of the MAJ modules and the number of UMA modules can be determined according to the number of sub-quantum states contained in any quantum state to be operated, one sub-quantum state corresponding to one qubit, wherein the number of the MAJ modules is equal to the number of UMA modules. What is shown in the figure is only an example, 4 qubits are required for coding "a" and "b", and the number of MAJ modules and that of UMA modules are both 4. The MAJ module and the UMA module constitute the front and rear cascading units of the adder. The MAJ module can be used for extracting the carry term of any step and pass it to the next stage to calculate the final carry term. The UMA module not only extracts the information of "c" and transmits it to the previous-stage UMA, but also calculates the "s" (result item) of each stage and recovers the information of "a".

For Example: When 4 (corresponding encoding is expressed in a 3-qubit quantum state as 100)+2 (corresponding encoding is expressed in a 3-qubit quantum state as 010)=6 (corresponding encoding is expressed in a 3-qubit quantum state as 110). At this time, the bit number of qubits encoding the operation result is the same as the bit number of qubits encoding "a" or the bit number of qubits used for encoding "b", and the number of the MAJ modules and the number of UMA modules are both 3.

For Example: When 4 (corresponding encoding is expressed in a 3-qubit quantum state as 100)+7 (corresponding encoding is expressed in a 3-qubit quantum state as 111)=11 (corresponding encoding is expressed in a 3-qubit quantum state as 011). However, it can be understood that the binary number corresponding to 11 is 1011, and the bit where the leftmost 1 is located is a carry item, which can be represented by an auxiliary qubit. At this time, the bit number of qubits encoding the operation result is larger than the bit number of qubits encoding "a" or the bit number of qubits used for encoding "b", and the number of the MAJ modules and the number of UMA modules are both 3.

For Example: when 2 (corresponding encoding is expressed in a 2-qubit quantum state as 10)+4 (corresponding encoding is expressed in a 3-qubit quantum state as 100)=6 (corresponding encoding is expressed in a 3-qubit quantum state as 110). At this time, the numerical item "3" encoding the numerical value of "6" equals to the number of quantum states of the qubit encoding "b", and the number of the MAJ modules and the number of UMA modules are both 3.

S1203. According to the addition instruction, cascading the MAJ modules and UMA modules in the target module number to generate a target quantum circuit corresponding to the adder;

Here, at least one of the MAJ modules are cascaded to form an MAJ cascading module, at least one of the UMA modules are cascaded to form a UMA cascading module, and both the MAJ cascading module and the UMA cascading module include three input items and three output items;

Said step "according to an addition instruction, cascading the MAJ modules and the UMA modules in the target module number to generate a target quantum circuit corresponding to the adder" specifically includes:

According to the addition instruction, using three output items of an MAJ cascading module as three input items of a corresponding UMA cascading module, so as to cascade the MAJ cascading module with the corresponding UMA cascading module to generate a target quantum circuit corresponding to the adder.

In this embodiment, as shown in FIG. 4, according to the figure, use the three output bits of the MAJ module as the three input bits of the UMA module, thereby cascading the same number of MAJ modules and UMA modules to generate a target quantum circuit corresponding to the adder.

Here, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, The method further includes, before the step "according to an addition instruction, cascading the MAJ modules and the UMA modules both in the target module number, to generate a target quantum circuit corresponding to the adder":

Obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and According to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Figure 5:
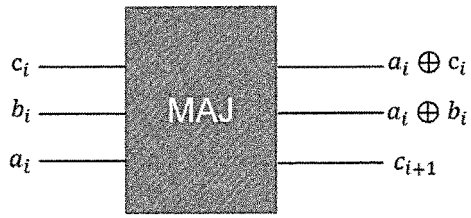
FIG. 5 is a schematic illustration of the MAJ module provided in the present disclosure.
Figure 6:
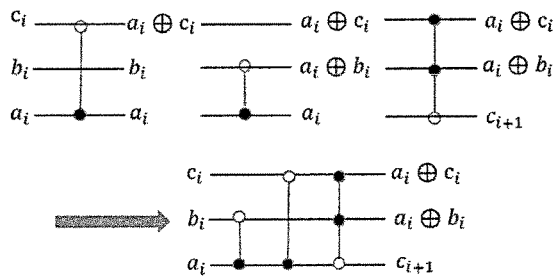
FIG. 6 is a schematic illustration of the MAJ module quantum circuit combination process provided in the present disclosure.

In this embodiment, the MAJ module and the UMA module constitute the front and rear cascading units of the adder. As shown in FIG. 5, the MAJ module is used for extracting the carry item after each stage of addition, and pass it to the next stage, so as to calculate the final carry item. Here, hollow circles in the circuit diagram represent NOT operations, and solid circles represent controlling bits. The UMA module is not only for extracting the value of the carry item "c" and passing the value of the carry item "c" to the previous-stage UMA module, but also for calculating the sum s (result item) of each stage and restoring the value of "a". Here, as shown in FIG. 6, the MAJ module can be composed of three logic gates, i.e., two CNOT gates and one Toffoli gate respectively. The function of the CNOT gate (the first and second logic gates from left to right in FIG. 6) is: add the controlling bit to the target bit to form a modulo 2 addition, which is an exclusive OR operation, and get (a+c) %2, therefore the order can be swapped. The function of the Toffoli gate (the third logic gate from left to right in FIG. 6) is: add both controlling bits to the target bit to get the carry item $c_i$, $c_{[i+1]}=(a_{[i]}$ AND $b_{[i]})$ XOR $(a_{[i]}$ AND $b_{[i]})$ XOR $(a_{[i]}$ AND $b_{[i]})$. That is, to implement $e_i \oplus c_i$ through the first CNOT gate from left to right in FIG. 6, to implement $e_i \oplus f_i$ through the second CNOT gate from left to right in FIG. 6, and to implement $c_{i+1}$ through the third TOFFOLI gate from left to right in FIG. 6, thereby forming the front-stage cascading unit of the quantum adder with two CNOT gates and one TOFFOLI gate.

Example 1: $a_i$ is 1, $b_i$ is 1, and $c_i$ is 1.

The MAJ module starts by adding $a_i$ to $c_i$, and the value of $c_i$ becomes 0; and then adds $a_i$ to $b_i$, and the value of $b_i$ becomes 0; and finally adds $b_i$ and $c_i$ to $a_i$, the value of $a_i$ becomes 1, that is, the carry of $c_{i+1}$ is 1.

Example 2: $a_i$ is 0, $b_i$ is 1, and $c_i$ is 1.

The MAJ module starts by adding $a_i$ to $c_i$, and the value of $c_i$ becomes 1, then adds $a_i$ to $b_i$, and the value of $b_i$ becomes 1, and finally adds $b_i$ and $c_i$ to $a_i$, the value of $a_i$ becomes 1, that is, the carry of $c_{i+1}$ is 1.

Figure 7:
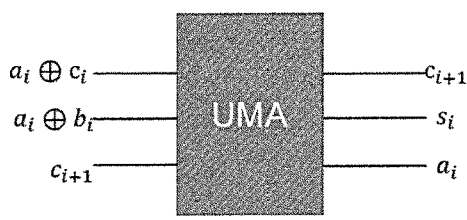
FIG. 7 is a schematic illustration of a UMA module provided in the present disclosure.
Figure 8:
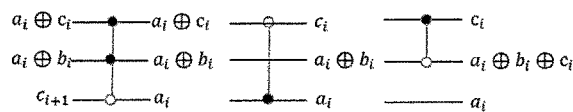
FIG. 8 is a schematic illustration of the UMA module quantum circuit combination process provided in the present disclosure.

As shown in FIG. 7, the UMA module is used for the rear-stage of the cascaded adder. The implementation of a UMA module is similar to that of an MAJ module. As shown in FIG. 8, the Toffoli gate (the first logic gate from left to right in FIG. 8) is first used for restoring $c_{i+1}$ to $a_i$, and then use $a_i$ to restore (a+c) %2 with the CNOT gate (the second logic gate from left to right in FIG. 8) to $c_i$, and finally use $c_i$ to execute a CNOT gate (the third logic gate from left to right in FIG. 8) on (a+b) %2 to get the final result $s_i$ of the current bit.

Example 1: $(a_i+c_i)$%2 is 0, $(a_i+b_i)$ %2 is 0, and $c_{i+1}$ is 1.

Start by adding $(a_i+c_i)$ %2 and $(a_i+b_i)$ %2 to $c_{i+1}$, the value of $c_{i+1}$ becomes 1, and the meaning thereof becomes $a_i$, then add $a_i$ to $(a_i+c_i)$ %2, the value of $(a_i+c_i)$ %2 becomes 1, and the meaning thereof becomes $c_i$, then add $c_i$ to $(a_i+b_i)$ %2, the value of $(a_i+b_i)$ %2 becomes 1, and the meaning thereof becomes $s_i$.

Example 2: $(a_i+c_i)$ %2 is 1, $(a_i+b_i)$ %2 is 1, and $c_{i+1}$ is 1.

Start by adding $(a_i+c_i)$ %2 and $(a_i+b_i)$ %2 to $c_{i+1}$, the value of $c_{i+1}$ becomes 0, and the meaning thereof becomes $a_i$, then add $a_i$ to $(a_i+c_i)$ %2, the value of $(a_i+c_i)$ %2 becomes 1, and the meaning thereof becomes $c_i$, then add $c_i$ to $(a_i+b_i)$ %2, the value of $(a_i+b_i)$ %2 becomes 0, and the meaning thereof becomes $s_i$.

As shown in FIG. 4, the last CNOT gate from top to bottom, that is, the CNOT gate between the MAJ module and the UMA module in the entire adder, is used for storing the result of $c_i+1$.

Specifically, the three input items of the MAJ cascading module include a carry input item and two sub-quantum state input items to be operated, and the three output items of the MAJ cascading module include a carry output item and two intermediate result output items, the three input items of the UMA cascading module include a carry output item and two intermediate result output items of a corresponding MAJ cascading module, and the three output items of the UMA cascading module include a result carry output item, an accumulation and output item and a sub-quantum state input item to be operated.

Said step "according to an addition instruction, three output items of an MAJ cascading module are used as three input items of a corresponding UMA cascading module, so as to cascade the MAJ cascading module with the corresponding UMA cascading module, thereby generating the target quantum circuit corresponding to the adder" specifically includes:

According to the addition instruction, the carry output item output by the previous MAJ module and the two sub-quantum state input items to be operated are used as three input items of the next MAJ module, so that the MAJ modules in the target module number are cascaded to generate the MAJ cascading module;

using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade the MAJ modules in the target module number and the UMA modules in the target module number to generate the UMA cascading module, wherein the carry output item of the last MAJ module is used as an input item to the corresponding first UMA module;

Using the three output items of an MAJ cascading module as three input items of a corresponding UMA cascading module, to cascade the MAJ cascading module with the corresponding UMA cascading module to generate the initial quantum circuit;

Adding a CNOT quantum logic gate between the last MAJ cascading module and the corresponding first UMA cascading module in the initial quantum circuit, wherein the qubit corresponding to the carry output item of the MAJ cascading module is used as the controlling bit, and the preset carry auxiliary qubit is used as the controlled bit, so as to generate the target quantum circuit of the adder.

In further embodiments, if the carry item is not needed, the CNOT gate and the carry auxiliary qubit does not have to be provided.

S1204. Executing an addition operation on each qubit of the two target quantum states through the target quantum circuit to generate and output a target quantum state result.

In this embodiment, by inputting the sub-quantum state s of the two target quantum states, such as |111> and |111>, into the adder (that is, the target quantum circuit), a corresponding binary representation of the operation result of the target quantum state (including the carry term and the result term obtained by directly adding each sub-quantum state) is obtained. Then the binary expression of the result |1110> of the target quantum state is directly output, or is further transformed into a decimal result 14 and output to complete the addition operation of the two target data.

It can be seen that the method for quantum division operation provided in the present disclosure is used for implementing the basic arithmetic operation in the quantum circuit, obtaining the dividend data and the divisor data to be operated, transforming the dividend data into a first target quantum state, and transforming the divisor data into a second target quantum state, for the first target quantum state and the second target quantum state, iteratively executing quantum state evolution corresponding to a subtraction operation, counting the number of executions of the subtraction operation until the dividend data is reduced to a negative number, and using a finally obtained counting result as a quotient of dividing the dividend data by the divisor data, transforming it into a decimal representation and output it, thereby realizing a basic arithmetic operation that can be used in quantum circuits, filling the gap in the related art.

Another embodiment of the present disclosure provides a detailed implementation of the method for executing the subtraction operation.

For the two quantum states to be operated, i.e., the minuend quantum state including the minuend data and the subtrahend quantum state including the subtrahend data respectively, obtaining the quantum state of the second preset auxiliary qubit; according to the sign-bit sub-quantum state in the minuend quantum state and the quantum state of the second preset auxiliary qubit, control the minuend quantum state to execute quantum state evolution corresponding to the complement operation so as to obtain the first complement quantum state, wherein the first complement quantum state is a quantum state including the complement of the minuend data;

As can be seen from the foregoing embodiments, the two quantum states to be operated have the following groups: one consisting of the first target quantum state and the second target quantum state; one consisting of the third target quantum state and the fourth target quantum state; and one consisting of the first target quantum state and the second target quantum state after the sign-bit-inversion. Here, the former can be called the minuend quantum state, and the data contained therein is called the minuend in the subtraction operation, and the latter can be called the subtrahend quantum state, and the data contained therein is called the subtrahend.

This embodiment is mainly used for implementing the function of the subtractor. The biggest difference between the subtractor and the adder in the following text is that, the subtractor may produce a negative number. Therefore, a binary handling way is used in which a sign bit is added to both the subtrahend and the minuend so as to represent the positive and negative sign of the value, and use the complement to execute the operation. The complement of positive numbers remains unchanged, while negative numbers are bitwise inverted and increment by 1 except for the sign bit. In a corresponding instance of the quantum circuit, the sign bit is used for controlling whether to execute the complement operation, the X gate is used for inversion, and the increment by 1 can be realized through the adder. In the case of complement, after the operation is completed, and the target value is obtained after execution of a further complement operation on the result. The minuend data and the subtrahend data to be operated are obtained, and the minuend data and the subtrahend data are transformed respectively into a first target quantum state and a second target quantum state. Here, each of the first target quantum state and the second target quantum state includes: a sign-bit sub-quantum state representing a data sign, and a value bit sub-quantum state representing a data value.

Specifically, according to the sign-bit sub-quantum state in the minuend quantum state and the quantum state of the second preset auxiliary qubit, by controlling the minuend quantum state to execute quantum state evolution corresponding to the complement operation, a CNOT gate operation may be executed on the first sign-bit-qubit corresponding to the sign-bit sub-quantum state in the minuend quantum state, and on the second preset auxiliary qubit, wherein the first sign-bit-qubit is a controlling bit, and the second preset auxiliary qubit is a controlled bit. Moreover, it is reasonable and feasible to substitute the CNOT gate with other existing quantum logic gates or combinations of logic gates that are equivalent.

According to the quantum state of the second preset auxiliary qubit after execution of the CNOT gate operation, control whether the current minuend quantum state executes the quantum state evolution corresponding to the complement operation;

If yes, invert the non-sign-bit sub-quantum state of the current minuend quantum state, and for the inverted minuend quantum state and the quantum state |1⟩ of the second preset auxiliary qubit, execute quantum addition operation, to obtain the evolved first complement quantum state, otherwise, the minuend quantum state is used as the first complement quantum state. Here, the quantum state evolution corresponding to the complement operation is controlled to be executed only when the quantum state of the second preset auxiliary qubit after execution of the CNOT gate operation can be |1⟩, otherwise it will not be executed.

Execute a CNOT gate operation on the current first sign-bit-qubit and the second preset auxiliary qubit to restore the quantum state of the current second preset auxiliary qubit; wherein, the first sign-bit-qubit is a controlling bit, and the second preset auxiliary qubit is a controlled bit.

For Example: the minuend quantum state is assumed to be |0011⟩. The sign-bit sub-quantum state of |0011⟩ is the highest bit sub-quantum state, that is, the |0⟩ state, the value of this bit is 0, the corresponding first sign-bit-qubit is set to g.sign, and the second preset auxiliary qubit is the preset qubit $q_1$ which is initially |0⟩ state.

Execute the CNOT gate operation on g.sign and $q_1$, g.sign is used as the controlling bit, $q_1$ is used as the controlled bit, and the quantum state of the g.sign bit is a |0⟩ state. After the CNOT gate operation, the quantum state |0⟩ of the controlled bit $q_1$ remains unchanged.

Since the quantum state of $q_1$ after execution of the CNOT gate operation is a |0⟩ state, the quantum state evolution corresponding to the complement operation is not executed on the minuend quantum state. The principle is that when the minuend is a positive number, there is no need to complement it in the subtraction operation, or in other words, its complement is itself, i.e. the |0011⟩ can be directly used as the first complement quantum state.

Finally, the CNOT gate can be executed again on the current g.sign and $q_1$. The quantum state of the g.sign bit is a |0⟩ state. After the CNOT gate operation, the quantum state |0⟩ of the controlled bit $q_1$ remains unchanged, and $q_1$ is restored to the |0⟩ state, thereby releasing information stored in the third auxiliary qubit. It can be seen that the value 0011 contained in the first complement quantum state is the complement of the minuend 0011.

Figure 9:
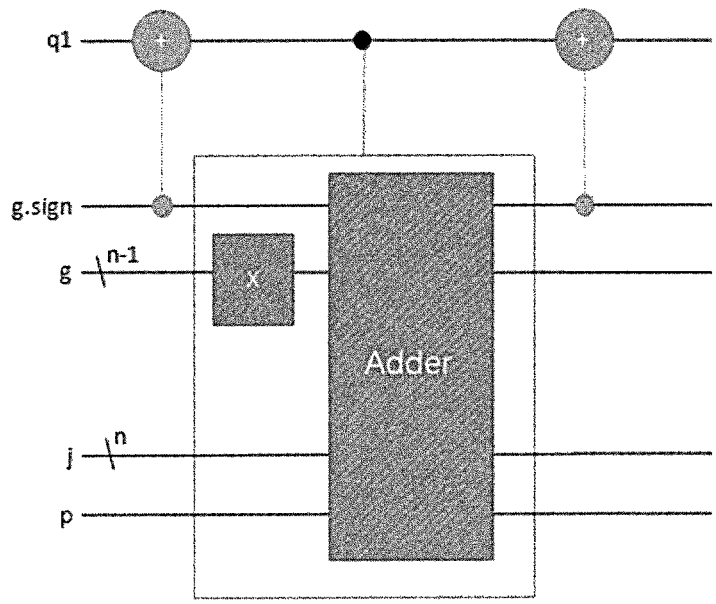
FIG. 9 is a quantum circuit schematic illustration of the complement operation provided in the present disclosure.

As shown in FIG. 9, $q_1$ is the second preset auxiliary qubit, which is used for controlling whether to execute complement operation; the first target quantum state is g, and g.sign is the sign-bit sub-quantum state in the first target quantum state, the remaining of g is the value bit sub-quantum state representing the data value, j is the second preset auxiliary qubit, that is, an auxiliary qubit set to a value of 1, and p is an auxiliary qubit used by the adder (the first preset auxiliary qubit described below).

The quantum circuit shown in FIG. 9 realizes the quantum circuit of the complement operation on g. First, the CNOT gate operation is executed on g.sign and $q_1$, so that $q_1$ temporarily represents g.sign, and $q_1$ is used for controlling whether to execute the complement operation. After finding the complement, restore $q_1$, thereby controlling the minuend quantum state to execute the quantum state evolution corresponding to the complement operation to obtain the first complement quantum state.

Specifically, according to the sign-bit sub-quantum state of g, the second preset auxiliary qubit $q_1$ is used for controlling whether to execute the complement operation. If g is a negative number, the complement operation of the negative number is executed. The complement of a negative number is to increment by 1 after the bitwise inversion except the sign bit. If the operation of bitwise inversion except the sign bit is realized by logic gates, it is only necessary to execute X gates on all the value bits. Since increment by 1 is needed after inversion, therefore, by adding j and g, the value of j is set to 1. The "p" is the auxiliary qubit of the adder, upon adding g and j after inverting the value bits, what is stored on g is the value after the complement, then restore $q_1$ for the next use.

Example: when g is a negative number, "g.sign" is 1, and $q_1$ is also 1, and operations such as inversion need to be executed, and when g is positive, g.sign is 0, and $q_1$ is also 0, then there is no need to further execute a complement operation.

Executing the quantum state evolution corresponding to sign-bit-inversion on the sign-bit sub-quantum state in the subtrahend quantum state, and according to the sign-bit sub-quantum state after inversion and the quantum state of the second preset auxiliary qubit, controlling the current subtraction quantum state to execute the quantum state evolution corresponding to the complement operation to obtain the second complement quantum state; wherein, the second complement quantum state is a quantum state that includes the complement of the subtrahend data;

Specifically, the X gate operation can be executed on the second sign-bit-qubit corresponding to the sign-bit sub-quantum state in the subtrahend quantum state, to obtain the inverted sign-bit sub-quantum state; wherein, it is also reasonable and feasible to substitute the X gate with other existing quantum logic gates or combinations of quantum logic gates that are equivalent;

Similarly, continue to execute the CNOT gate operation on the current second sign-bit-qubit and the second preset auxiliary qubit, wherein the second sign-bit-qubit is a controlling bit, and the second preset auxiliary qubit is a controlled bit;

According to the current quantum state of the second preset auxiliary qubit after execution of the CNOT gate operation, control whether the current subtrahend quantum state executes the quantum state evolution corresponding to the complement operation;

If yes, invert the non-sign-bit sub-quantum state of the current subtrahend quantum state, and execute quantum addition operation on the subtrahend quantum state after inversion and the quantum state |1⟩ of the second preset auxiliary qubit, to obtain the evolved second complement quantum state, otherwise, the current subtrahend quantum state is used as the second complement quantum state;

Execute a CNOT gate operation on the current second sign-bit-qubit and the second preset auxiliary qubit to restore the current quantum state of the second preset auxiliary qubit; wherein, the second sign-bit-qubit is a controlling bit, and the second preset auxiliary qubit is a controlled bit.

For Example: the minuend quantum state is assumed to be |0100⟩. The sign-bit sub-quantum state of |0100⟩ is the highest bit sub-quantum state, that is, the state |0⟩, the value of this bit is 0, the corresponding second sign-bit-qubit is set to b.sign, and the current third auxiliary qubit is restored to state |0⟩.

First, X gate may be executed on h.sign, invert the corresponding sign-bit sub-quantum state |0⟩ to |1⟩, and the subtrahend quantum state becomes |1100⟩.

Continue to execute the CNOT gate operation on h.sign and $q_1$, h.sign is used as the controlling bit, $q_1$ is used as the controlled bit, the quantum state of the current h.sign bit is the state |1⟩, and after the CNOT gate operation, the quantum state |0⟩ of the controlled bit $q_1$ is inverted to |1⟩ state.

The quantum state of $q_1$ after execution of the CNOT gate operation is a |1⟩ state, and the quantum state evolution corresponding to the complement operation is executed on the current subtrahend quantum state |1100⟩. An implementation of the quantum state evolution corresponding to the complement operation is as follows:

Invert the current subtrahend quantum state |1100⟩, and execute quantum addition operation on the subtrahend quantum state |1011⟩ after inversion and the quantum state |1⟩ of the second preset auxiliary qubit to obtain the evolved second complement quantum state |1100⟩.

Here, the non-sign-bit sub-quantum state |100⟩ of |1100⟩ can be inverted by execution of a X gate; in order to keep the dimensions consistent, the second preset auxiliary qubits is a preset 4-bit qubit "m3, m2, m1, m0". The quantum state |1⟩ of the second preset auxiliary qubit is actually written as |0001⟩, the two are equivalent.

Finally, the CNOT gate can be executed again on the current h.sign and $q_1$. The quantum state of the h.sign bit is a state |1⟩. After the CNOT gate operation, the quantum state |1⟩ of the controlled bit $q_1$ is inverted to |0⟩, thereby restoring $q_1$ to the initial state again |0⟩ state, releasing the storage space of $q_1$. It can be seen that the value 1100 contained in the second complement quantum state is the complement of the subtrahend 1100 after executing the X gate on h.sign.

Figure 10:
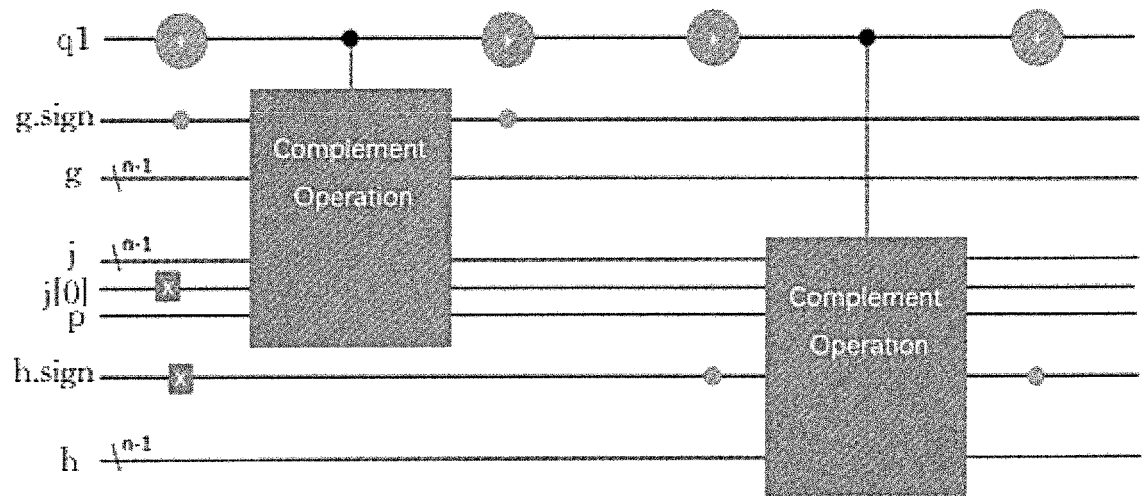
FIG. 10 is a schematic illustration of the first half quantum circuit corresponding to the subtractor provided in the present disclosure.

In this embodiment, similarly for the second target quantum state h. Initially, executing X gate on $j_{[0]}$ is to set the value to 1, and executing X gate on the sign-bit sub-quantum state h.sign in the second target quantum state is to turn subtraction into addition. As shown in FIG. 10, FIG. 10 is a schematic illustration of the quantum state evolution corresponding to the complement operation on g and h, with reference to a similar pattern to the above, the quantum state evolution corresponding to the complement operation for the second target quantum state h is executed to get the second complement quantum state.

Executing a quantum addition operation on the first complement quantum state and the second complement quantum state, to evolve the first complement quantum state into a fifth target quantum state including the sum of the complement of the minuend data and the complement of the subtrahend data;

For Example: a quantum addition operation is executed on the first complement quantum state |0011⟩ and the second complement quantum state |1100⟩ to evolve the first complement quantum state |0011⟩ into the fifth target quantum state |1111⟩.

In this embodiment, after the complement is obtained, the addition operation is executed on g and h. After the addition, the previous operation is restored, and the value stored in g is the desired value. Substituting the first complement quantum state and the second complement quantum state into the quantum circuit of the adder, to execute a quantum addition operation, thereby evolving the first complement quantum state to a third target quantum state including the sum of the complement of the minuend data and the complement of the subtrahend data.

According to the sign-bit sub-quantum state in the fifth target quantum state and the quantum state of the second preset auxiliary qubit, control the fifth target quantum state to execute the quantum state evolution corresponding to the complement operation, and obtain the evolved sixth target quantum state which is output as the subtraction result of subtracting the subtrahend data from the minuend data; wherein, the sixth target quantum state is a quantum state including the complement of the complement sum;

For Example: according to the sign-bit sub-quantum state |1⟩ in the current fifth target quantum state |1111⟩ and the current quantum state |0⟩ of the second preset auxiliary qubit, control the fifth target quantum state |1111⟩ to execute the quantum state evolution corresponding to the complement operation, and obtain the evolved sixth target quantum state |1001⟩ including the value 1001 (decimal −1), which is the subtraction result of subtracting the subtrahend 0100 (decimal 4) contained in the subtrahend quantum state |0100⟩ from the minuend 0011 (decimal 3) contained in the minuend quantum state |0011⟩.

It is to be noted that the quantum state evolution corresponding to the complement operation can be in the same way as the above. After the evolution, the quantum state of the second preset auxiliary qubit is still restored to |0⟩ to facilitate subsequent computing.

According to the sign-bit sub-quantum state in the current subtrahend quantum state and the quantum state of the current second preset auxiliary qubit, control the current subtrahend quantum state to execute the quantum state evolution corresponding to the complement operation, and execute quantum state evolution corresponding to sign-bit-inversion for the sign-bit sub-quantum state in the current subtrahend quantum state, so as to restore the current subtrahend quantum state.

For Example: the current subtrahend quantum state is the second complement quantum state |1100⟩, and the current quantum state of the second preset auxiliary qubit is |0⟩. Continue to follow a similar pattern to the above to control |1100⟩ to execute the quantum state evolution corresponding to the complement operation, and obtain the evolved |1100⟩, and then use the X-gate operation to invert its sign-bit sub-quantum state, and restore it to the original subtrahend quantum state |0100⟩.

Figure 11:
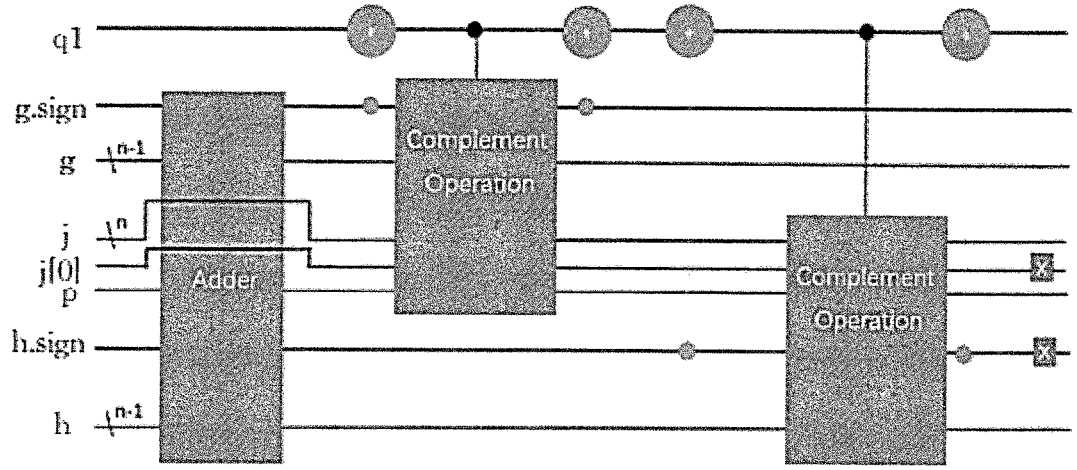
FIG. 11 is a schematic illustration of the second half quantum circuit corresponding to the subtractor provided in the present disclosure.
Figure 12:
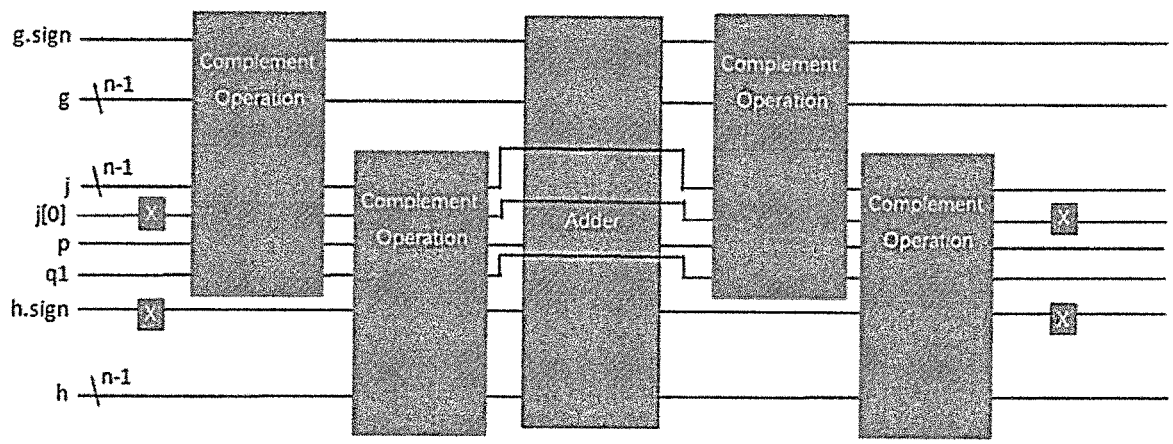
FIG. 12 is a schematic illustration of a quantum circuit corresponding to the subtractor provided in the present disclosure.

In this embodiment, after the addition operation, the quantum state evolution corresponding to the complement operation is further executed on the third target quantum state of the sum of the complement of the minuend data and the complement of the subtrahend data. As shown in FIG. 11, first, the purpose of executing an X gate on $j_{[0]}$ is to set the value of $j_{[0]}$ to 1, which is convenient for the +1 operation in the complement operation. The reason for executing the X gate operation on the sign bit of h is to transform g-h to g+(−h). Then, we execute complement processing on both g and h. After the processing is completed, add the complements of g and h; upon obtaining the result thereof, we execute once again a complement operation on g and h to restore them to normal values. Finally, we restore the initial operation, that is to restore the auxiliary qubits and to execute two X gates. Accordingly, the quantum circuit diagram of the entire subtractor as shown in FIG. 12 is formed, which is a simple functional example.

Figure 13:
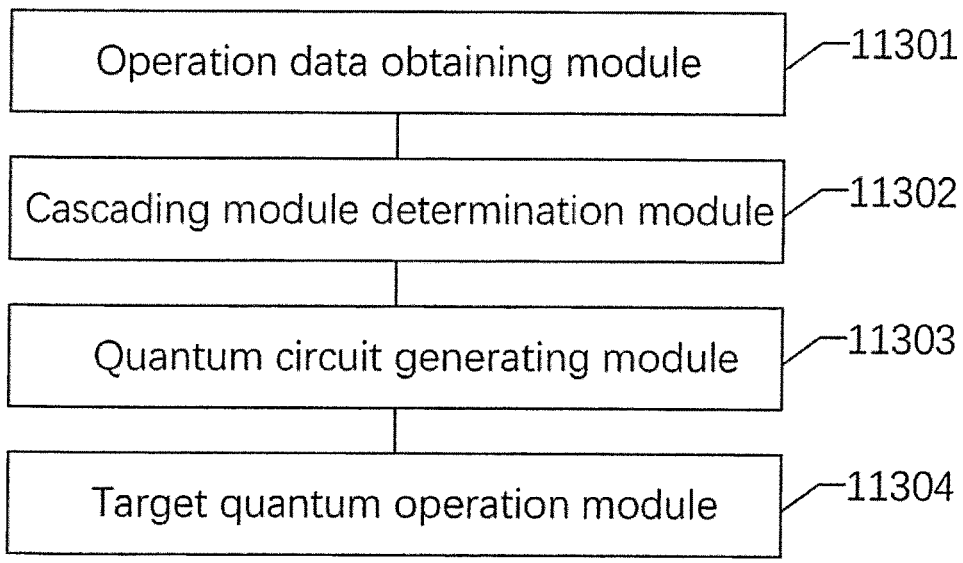
FIG. 13 is a schematic structural illustration of a quantum addition device provided in an embodiment of the present disclosure.

Another embodiment of the present disclosure provides a quantum addition device, as shown in FIG. 13, the device includes:

An operation data obtaining module 11301, configured for obtaining an addition instruction and two target data to be operated, and transform the two target data into two target quantum states;

A cascading module determination module 11302, configured for determining the target module numbers of the front-cascading module MAJ module to be cascaded and the rear-cascading module UMA module to be cascaded according to the bit numbers of each qubit in the target quantum state number, wherein the number of the MAJ modules equals to the number of the UMA modules;

A quantum circuit generating module 11303, configured to cascade the MAJ modules in the target module number with the UMA modules in the target module number according to the addition instruction, to generate a target quantum circuit corresponding to the adder.

A target quantum operation module 11304, configured to execute an addition operation on each qubit of the two target quantum states through the target quantum circuit, generating and outputting a target quantum state result.

Further, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, and the device further includes a cascading module preset module:

Obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and According to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Further, at least one MAJ module is cascaded to form an MAJ cascading module, at least one UMA module is cascaded to form a UMA cascading module, and both the MAJ cascading module and the UMA cascading module include three input items and three output items, the quantum circuit generating module is further used for:

Said step "according to an addition instruction, cascading the MAJ modules and the UMA modules both in the target module number, to generate a target quantum circuit corresponding to the adder" specifically includes:

According to the addition instruction, using three output items of an MAJ cascading module as three input items of a corresponding UMA cascading module, so as to cascade the MAJ cascading module with the corresponding UMA cascading module to generate a target quantum circuit corresponding to the adder.

Further, the three input items of the MAJ cascading module include a carry input item and two sub-quantum state input items to be operated, and the three output items of the MAJ cascading module include a carry output item and two intermediate result output items, the three input items of the UMA cascading module include a carry output item and two intermediate result output items of a corresponding MAJ cascading module, and the three output items of the UMA cascading module include a result carry output item, an accumulation and output item, and a sub-quantum state input item to be operated, the quantum circuit generating module is further used for:

According to the addition instruction, the carry output item output by the previous MAJ module and the two sub-quantum state input items to be operated are used as three input items of the next MAJ module, so that the MAJ modules in the target module number are cascaded to generate the MAJ cascading module;

using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Using the three output items of an MAJ cascading module as three input items of a corresponding UMA cascading module, to cascade the MAJ cascading module with the corresponding UMA cascading module to generate the initial quantum circuit;

Adding a CNOT quantum logic gate between the last MAJ cascading module and the corresponding first UMA cascading module in the initial quantum circuit, wherein the qubit corresponding to the carry output item of the MAJ cascading module is used as the controlling bit, and the preset carry auxiliary qubit is used as the controlled bit, so as to generate the target quantum circuit of the adder.

As mentioned above, here, preferably, the device includes:

An operation data obtaining module, configured for: obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value;

A first quantum state evolution module, configured for: obtaining the quantum state of the second preset auxiliary qubit, and according to the sign-bit sub-quantum state in the first target quantum state and the quantum state of the second preset auxiliary qubit, controlling the first target quantum state to execute quantum state evolution corresponding to the complement operation, to obtain the first complement quantum state; wherein the first complement quantum state is the quantum state including the complement of the minuend data;

A second quantum state evolution module, configured for: executing quantum state evolution corresponding to sign-bit-inversion on the sign-bit sub-quantum state in the second target quantum state, and according to the inverted sign-bit sub-quantum state and the quantum state of the second preset auxiliary qubit, controlling the current second target quantum state to execute quantum state evolution corresponding to the complement operation, to obtain the second complement quantum state; wherein the second complement quantum state is the quantum state including the complement of the subtrahend data;

A third quantum state evolution module, configured for: executing quantum state evolution corresponding to the addition operation on the first complement quantum state and the second complement quantum state, so as to evolute the first complement quantum state into a third target quantum state including the sum of the complement of the minuend data and the complement of the subtrahend data;

A target quantum operation module, configured for: according to the sign-bit sub-quantum state in the third target quantum state and the quantum state of the second preset auxiliary qubit, controlling the third target quantum state to execute a quantum state evolution corresponding to the complement operation, to obtain and output an evoluted fourth target quantum state as the subtraction operation result of subtracting the subtrahend data from the minuend data; wherein the fourth target quantum state is a quantum state including the complement of the sum of the complements;

As mentioned above, here, preferably, further to the target quantum operation module, the device further includes:

A restoration module, configured for: according to the sign-bit sub-quantum state in the current second target quantum state and the quantum state of the current second preset auxiliary qubit, controlling the current second target quantum state to execute quantum state evolution corresponding to the complement operation, and executing quantum state evolution corresponding to sign-bit-inversion on the sign-bit sub-quantum state in the current second target quantum state, so as to restore the current second target quantum state.

As mentioned above, here, preferably, the first quantum state evolution module is specifically configured for:

Executing a CNOT gate operation on the first sign-bit-qubit corresponding to the sign-bit sub-quantum state in the first target quantum state and the second preset auxiliary qubit, wherein the first sign-bit-qubit is a controlling bit, and the second preset auxiliary qubit is a controlled bit;

According to the quantum state of the second preset auxiliary qubit after execution of the CNOT gate operation, controlling whether the current first target quantum state executes the quantum state evolution corresponding to the complement operation;

if yes, inverting the non-sign-bit sub-quantum state of the first target quantum state, and executing quantum state evolution corresponding to addition operation on the inverted first target quantum state and the quantum state |1⟩ of the second preset auxiliary qubit, to obtain the evolved first complement quantum state, otherwise, using the first target quantum state as the first complement quantum state;

Executing a CNOT gate operation on the current first sign-bit-qubit and the second preset auxiliary qubit to restore the quantum state of the current second preset auxiliary qubit; wherein, the first sign-bit-qubit is a controlling bit, and the second preset auxiliary qubit is a controlled bit.

The above-described embodiments can be summarized as follows.

C11. A method for quantum addition operation, characterized by including: obtaining an addition instruction and two target data to be operated, and transforming the two target data into two target quantum states; according to the bit numbers of each qubit in the target quantum state, determining the target module number of the front-cascading module MAJ module to be cascaded and the target module number of the rear-cascading module UMA module to be cascaded, wherein the number of the MAJ modules equals to the number of the UMA modules; according to the addition instruction, cascading the MAJ modules and UMA modules in the target module number to generate a target quantum circuit corresponding to the adder; and executing an addition operation on each qubit of the two target quantum states through the target quantum circuit to generate and output a target quantum state result.

C12. A method for quantum addition operation according to C11, characterized by including: the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the method further includes, before the step "according to an addition instruction, cascading the MAJ modules and the UMA modules both in the target module number, to generate a target quantum circuit corresponding to the adder": obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

C13. A method for quantum addition operation according to C11 or C12, characterized in that at least one of the MAJ modules are cascaded to form an MAJ cascading module, at least one of the UMA modules are cascaded to form a UMA cascading module, and both the MAJ cascading module and the UMA cascading module include three input items and three output items; said step "according to an addition instruction, cascading the MAJ modules and the UMA modules in the target module number to generate a target quantum circuit corresponding to the adder" specifically includes: according to the addition instruction, using three output items of an MAJ cascading module as three input items of a corresponding UMA cascading module, so as to cascade the MAJ cascading module with the corresponding UMA cascading module to generate a target quantum circuit corresponding to the adder.

C14. The method for quantum addition operation according to any one of C11-C13, characterized in that the three input items of the MAJ cascading module include a carry input item and two sub-quantum state input items to be operated, and the three output items of the MAJ cascading module include a carry output item and two intermediate result output items, the three input items of the UMA cascading module include a carry output item and two intermediate result output items of a corresponding MAJ cascading module, and the three output items of the UMA cascading module include a result carry output item, an accumulation and output item and a sub-quantum state input item to be operated, said step "according to an addition instruction, three output items of an MAJ cascading module are used as three input items of a corresponding UMA cascading module, so as to cascade the MAJ cascading module with the corresponding UMA cascading module, thereby generating the target quantum circuit corresponding to the adder" specifically includes: according to the addition instruction, the carry output item output by the previous MAJ module and the two sub-quantum state input items to be operated are used as three input items of the next MAJ module, so that the MAJ modules in the target module number are cascaded to generate the MAJ cascading module; using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade the MAJ modules in the target module number and the UMA modules in the target module number to generate the UMA cascading module, wherein the carry output item of the last MAJ module is used as an input item to the corresponding first UMA module; using the three output items of an MAJ cascading module as three input items of a corresponding UMA cascading module, to cascade the MAJ cascading module with the corresponding UMA cascading module to generate the initial quantum circuit; adding a CNOT quantum logic gate between the last MAJ cascading module and the corresponding first UMA cascading module in the initial quantum circuit, wherein the qubit corresponding to the carry output item of the MAJ cascading module is used as the controlling bit, and the preset carry auxiliary qubit is used as the controlled bit, so as to generate the target quantum circuit of the adder.

C15. The method for quantum addition operation of any one of C11-C14, characterized in that, the method for quantum addition operation further includes: obtaining the minuend data and the subtrahend data to be operated, transforming the minuend data into a first target quantum state, transforming the subtrahend data into a second target quantum state; wherein each of the first target quantum state and the second target quantum state includes a sign-bit sub-quantum state representing the data sign and a value bit sub-quantum state representing the data value; obtaining a quantum state of a second auxiliary qubit, and according to the sign-bit sub-quantum state in the first target quantum state and the quantum state of the second auxiliary qubit, controlling the first target quantum state to execute quantum state evolution corresponding to the complement operation, to obtain a first complement quantum state; wherein the first complement quantum state is a quantum state including the complement of the minuend data; executing quantum state evolution corresponding to sign-bit-inversion on sign-bit sub-quantum state in the second target quantum state, and according to the inverted sign-bit sub-quantum state and the quantum state of the second preset auxiliary qubit, controlling the current second target quantum state to execute quantum state evolution corresponding to complement operation, to obtain a second complement quantum state; wherein the second complement quantum state is a quantum state including the complement of the subtrahend data; executing quantum addition operation on the first complement quantum state and the second complement quantum state, to evolve the first complement quantum state into a third target quantum state including the sum of the complement of the minuend data and the complement of the subtrahend data; according to the sign-bit sub-quantum state in the third target quantum state and the quantum state of the second preset auxiliary qubit, controlling the third target quantum state to execute the quantum state evolution corresponding to the complement operation, to obtain the evolved fourth target quantum state which is output as the subtraction result of subtracting the subtrahend data from the minuend data; wherein the fourth target quantum state is a quantum state including the complement of the sum of the complements.

C16. A method for quantum addition operation according to any one of C11-C15, characterized in that the method further includes, after said step "controlling the third target quantum state to execute the quantum state evolution corresponding to the complement operation, to obtain the evolved fourth target quantum state": according to the sign-bit sub-quantum state in the current second target quantum state and the quantum state of the current first preset auxiliary qubit, controlling the current second target quantum state to execute quantum state evolution corresponding to the complement operation, and executing quantum state evolution corresponding to sign-bit-inversion on the sign-bit sub-quantum state in the current second target quantum state, so as to restore the current second target quantum state.

C17. A method for quantum addition operation according to any one of C11-C16, characterized in that: said step "according to the sign-bit sub-quantum state in the first target quantum state and the quantum state of the second preset auxiliary qubit, controlling the first target quantum state to execute quantum state evolution corresponding to the complement operation" specifically includes: executing a CNOT gate operation on the first sign-bit-qubit corresponding to the sign-bit sub-quantum state in the first target quantum state and the second preset auxiliary qubit, wherein the first sign-bit-qubit is a controlling bit, and the second preset auxiliary qubit is a controlled bit; according to the quantum state of the second preset auxiliary qubit after execution of the CNOT gate operation, controlling whether the current first target quantum state executes the quantum state evolution corresponding to the complement operation; if yes, inverting the non-sign-bit sub-quantum state of the first target quantum state, and executing quantum addition operation on the inverted first target quantum state and the quantum state |1⟩ of the second preset auxiliary qubit, to obtain the evolved first complement quantum state, otherwise, using the first target quantum state as the first complement quantum state; and executing a CNOT gate operation on the current first sign-bit-qubit and the second preset auxiliary qubit to restore the quantum state of the current second preset auxiliary qubit; wherein, the first sign-bit-qubit is a controlling bit, and the second preset auxiliary qubit is a controlled bit.

C18. A device for quantum addition operation, characterized in that the device includes: an operation data obtaining module, configured for: obtaining an addition instruction and two target data to be operated, and transforming the two target data into two target quantum states; a cascading module determination module, configured for: according to the bit numbers of each qubit in the target quantum state, determining the target module number of the front-cascading module MAJ module to be cascaded and the target module number of the rear-cascading module UMA module to be cascaded, wherein the number of the MAJ modules equals to the number of the UMA modules; a quantum circuit generating module, configured for: according to the addition instruction, cascading the MAJ modules and UMA modules in the target module number to generate a target quantum circuit corresponding to the adder; and a target quantum operation module, configured for: executing an addition operation on each qubit of the two target quantum states through the target quantum circuit to generate and output a target quantum state result.

C19. An electronic device, including a memory having a computer program stored therein, and a processor configured to execute the computer program to perform the method of any one of C11-C17.

C110. A storage medium, characterized in that a computer program is stored in the storage medium, wherein the computer program is configured to execute any one of the methods in C11-C17 when running.

Yet another embodiment of the present disclosure provides an electronic device, including a memory having a computer program stored therein, and a processor configured to execute the computer program to perform the above steps and method.

Still another embodiment of the present disclosure provides a storage medium, in which a computer program is stored, and the computer program is configured to execute the above method steps when running.

Compared with the prior art, the method for quantum addition operation provided in the present disclosure obtains the addition instruction and the two target data to be operated, and transforms the two target data into two target quantum states; determines the target module number of the front-cascading module MAJ module to be cascaded and the target module number of the rear-cascading module UMA module to be cascaded according to the bit numbers of each qubit in the target quantum state, wherein the number of the MAJ modules equals to the number of the UMA modules; cascades the MAJ modules and UMA modules in the target module number according to the addition instruction to generate a target quantum circuit corresponding to the adder; and executes an addition operation on each qubit of the two target quantum states through the target quantum circuit to generate and output a target quantum state result. Thereby, the disclosure realizes a basic arithmetic operation that can be used in quantum circuits, and fills the gap in the related art.

Embodiment 1 of the present disclosure provides a quantum subtraction method, as shown in FIG. 14, the method includes:

S2201. Obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value;

Specifically, existing amplitude encoding methods can be used for transforming the decimal data to be operated into a binary quantum state representation. For example, the minuend data is 7, the signed binary expression thereof is 0111, the highest bit is 0 for positive numbers, and 1 for negative numbers; the subtrahend data is 4, and the signed binary expression thereof is 011.

Obtain at least 4 qubits "a.sign", "a2", "a1" and "a0"; encode 7 to the first target quantum state |0111⟩ of "a.sign, a2, a1, a0"; and set the amplitude of the quantum state to 1. Here, |0111⟩ =|0⟩|1⟩|1⟩|1⟩, where |0⟩, |1⟩, |1⟩, |1⟩ are called sub-quantum state s of |0111⟩, one sub-quantum state corresponding to one qubit. Here, "from right to left" meaning "from high to low", where the highest bit corresponds to "a.sign", the third bit corresponds to "a2", the second bit corresponds to "a1", and the lowest bit corresponds to "a0"; the highest bit |0⟩ representing the sign-bit sub-quantum state, and the remaining bits represent the sub-quantum state s of the value bits. In order to unify the operation dimensions, additionally obtain 4 qubits "b.sign", "b2", "b1" and "b0", and encode "4" into the second target quantum state |0100⟩ of "b.sign, b2, b1, b0", the amplitude of which also being 1.

This embodiment it is mainly used for implementing the function of a subtractor. An MAJor difference between the subtractor and the adder to be described is that, the subtractor generates negative numbers. Accordingly, a binary processing method is used, where the positive and negative signs of a numerical value are expressed by adding a sign bit to each of the subtrahend and the minuend, and operation thereof are executed using complements: for a positive number, a complement thereof remains unchanged, while for a negative number, a complement thereof is bitwise inverted except for the sign bit thereof, and then is incremented by 1. In the case of a quantum circuit, the sign bit is used for controlling whether to execute the complement operation, an X gate may be used for the inversion operation, and the "increment by 1" may be implemented with an adder. When an operation is finished in the manner of complements, an additional complement operation is further executed on a result of the operation, to obtain a target value. The minuend data and the subtrahend data are obtained, and are respectively transformed into a first target quantum state and a second target quantum state, where each of the first target quantum state and the second quantum state includes a sign-bit sub-quantum state representing the data sign and a value bit sub-quantum state representing the data value.

S2202. Obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data;

Specifically, said "according to the sign-bit sub-quantum state in the first target quantum state and the quantum state of the first preset auxiliary qubit, controlling the first target quantum state to execute quantum state evolution corresponding to the complement operation" may include executing a CNOT gate operation on a first sign-bit-qubit corresponding to the sign-bit sub-quantum state in the first target quantum state, and on the first preset auxiliary qubit, wherein the first sign-bit-qubit is a controlling bit and the first preset auxiliary qubit is a controlled bit. Moreover, it is reasonable and feasible to substitute the CNOT gate with other existing quantum logic gates or combinations of logic gates that are equivalent.

According to the quantum state of the second preset auxiliary qubit after execution of the CNOT gate operation, control whether the current minuend quantum state executes the quantum state evolution corresponding to the complement operation;

if yes, inverting the non-sign-bit sub-quantum state of the first target quantum state, and executing quantum state evolution corresponding to addition operation on the inverted first target quantum state and the quantum state |1 ⟩ of the second preset auxiliary qubit, to obtain the evolved first complement quantum state, otherwise, using the first target quantum state as the first complement quantum state;

Executing a CNOT gate operation on the current first sign-bit-qubit and the second preset auxiliary qubit to restore the quantum state of the current second preset auxiliary qubit; wherein, the first sign-bit-qubit is a controlling bit, and the second preset auxiliary qubit is a controlled bit.

For Example: assume the first target quantum state is |0011 ⟩. The sign-bit sub-quantum state of |0011 ⟩ is the highest bit sub-quantum state, that is, the |0 ⟩ state, the value of this bit is 0, the corresponding first sign-bit-qubit is set to a.sign, and the first preset auxiliary qubit is the preset qubit $q_1$, which is initially a |0⟩ state.

Execute a CNOT gate operation on a.sign and $q_1$, where a.sign is used as the controlling bit, $q_1$ is used as the controlled bit, the quantum state of the a.sign bit being |0⟩ state. After the CNOT gate operation, the quantum state |0⟩ of the controlled bit $q_1$ remains unchanged.

Since the quantum state of $q_1$ after execution of the CNOT gate operation is a $|0\rangle$ state, the quantum state evolution corresponding to the complement operation is not executed on the first target quantum state. The principle is that: when the minuend is a positive number, there is no need to complement it in the subtraction operation, or in other words, its complement is itself. The $|0011\rangle$ may be directly used as the first complement quantum state.

Finally, the CNOT gate can be executed again on the current a.sign and $q_1$. The quantum state of the a.sign bit is a $|0\rangle$ state. After the CNOT gate operation, the quantum state $|0\rangle$ of the controlled bit $q_1$ remains unchanged, and the state $|0\rangle$ of $q_1$ is restored, thereby releasing the information stored in the first preset auxiliary qubit. It can be seen that the value 0011 contained in the first complement quantum state is the complement of the minuend 0011.

Figure 15:
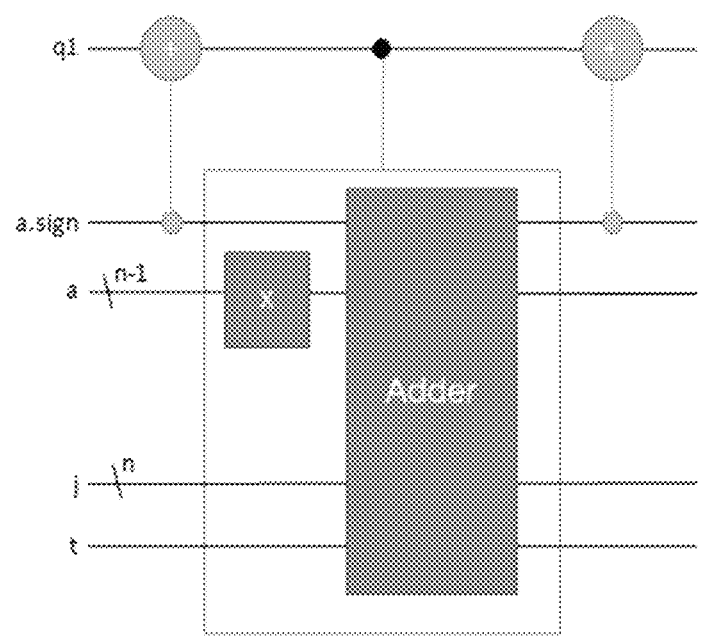
FIG. 15 is a schematic illustration of a complement quantum circuit provided in the present disclosure.

As shown in FIG. 15, $q_1$ is the first preset auxiliary qubit, which is used for controlling whether to execute the complement operation. The first target quantum state is "a", and "a.sign" is the sign-bit sub-quantum state in the first target quantum state, the remaining part of "a" is the value bit sub-quantum state s representing the data value. The "j" is the second preset auxiliary qubit, an initial state thereof is a 0 state, which is set to a 1 state by the X gate before the complement operation. The "t" is an auxiliary qubit used by the adder (the third preset auxiliary qubit to be described below), an initial state thereof os a 0 state.

The quantum circuit shown in FIG. 15 implements a quantum circuit that executes a complement operation on "a". Firstly, a CNOT gate operation is executed on "a.sign" and $q_1$, so that $q_1$ temporarily represents "a.sign", and use $q_1$ for controlling whether to execute the complement operation. Then, after finishing the complement operation, restore $q_1$. As such, the first target quantum state is controlled to execute quantum state evolution corresponding to the complement operation, and the first complement quantum state is obtained.

Specifically, according to the sign-bit sub-quantum state of a, the first preset auxiliary qubit $q_1$ is used for controlling whether to execute the complement operation. If a is a negative number, the complement operation of the negative number is executed. The complement of a negative number is to increment by 1 after the bitwise inversion except the sign bit. If the operation of bitwise inversion except the sign bit is realized by logic gates, it is only necessary to execute X gates on all the value bits. Since increment by 1 is needed after inversion, therefore, by adding j and a, the current value of j is set to 1. The "t" is the auxiliary qubit of the adder, upon adding a and j after inverting the value bits, what is stored on a is the value after the complement, then restore $q_1$ for the next use.

For example: when "a" is a negative number, "a.sign" is 1, and therefore $q_1$ is also 1, then operations such as inversion is needed. Otherwise, when a is positive, "a.sign" is 0, and therefore $q_1$ is also 0, then there is no need for the complement operation.

S2203. Executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data.

Specifically, the X gate operation can be executed on the second sign-bit-qubit corresponding to the sign-bit sub-quantum state in the second target quantum state to obtain the inverted sign-bit sub-quantum state; wherein, it is also reasonable and feasible to substitute the X gate with other existing quantum logic gates or combinations of quantum logic gates that are equivalent;

Similarly, continue to execute the CNOT gate operation on the current second sign-bit-qubit and the first preset auxiliary qubit, wherein the second sign-bit-qubit is a controlling bit, and the first preset auxiliary qubit is a controlled bit;

According to the current quantum state of the first preset auxiliary qubit after execution of the CNOT gate operation, control whether the current second target quantum state executes the quantum state evolution corresponding to the complement operation;

if yes, invert the non-sign-bit sub-quantum state of the current second target quantum state, and for the inverted second target quantum state and the quantum state $|1\rangle$ of the second preset auxiliary qubit, execute quantum state evolution corresponding to the addition operation, to obtain the evolved second complement quantum state, otherwise, use the current second target quantum state as the second complement quantum state;

Execute a CNOT gate operation on the current second sign-bit-qubit and the first preset auxiliary qubit to restore the current quantum state of the first preset auxiliary qubit; wherein, the second sign-bit-qubit is a controlling bit, and the first preset auxiliary qubit is a controlled bit.

For Example: the second target quantum state is assumed to be $|0100\rangle$. The sign-bit sub-quantum state of $|0100\rangle$ is the highest bit sub-quantum state, that is, the state $|0\rangle$, the value of this bit is 0, the corresponding second sign-bit-qubit is set to "b.sign", and the current third auxiliary qubit is restored to state $|0\rangle$.

First of all, an X gate may be executed on "b.sign", to invert the corresponding sign-bit sub-quantum state $|1\rangle$ into $|0\rangle$, turning the second target quantum state into $|1100\rangle$.

Continue to execute the CNOT gate operation on "b.sign" and $q_1$, where "b.sign" is used as the controlling bit, $q_1$ is used as the controlled bit. The current quantum state of the "b.sign" bit is $|1\rangle$ state. After the CNOT gate operation, the quantum state $|0\rangle$ of the controlled bit $q_1$ is inverted as $|1\rangle$ state.

The quantum state of $q_1$ after execution of the CNOT gate operation is $|1\rangle$ state, and therefore quantum state evolution corresponding to the complement operation is executed on the current second target quantum state $|1100\rangle$. An implementation of the quantum state evolution corresponding to the complement operation is as follows:

Invert the non-sign-bit sub-quantum state of the current second target quantum state $|1100\rangle$, and execute the quantum state evolution corresponding to the addition operation on the inverted second target quantum state $|1011\rangle$ and the quantum state $|1\rangle$ of the second preset auxiliary qubit, to obtain the evolved second complement quantum state $|1100\rangle$.

Here, the non-sign-bit sub-quantum state $|100\rangle$ of $|1100\rangle$ can be inverted by execution of a X gate; in order to keep the dimensions consistent, the second preset auxiliary qubit j is the preset 4-bit qubit "$j_{[3]}, j_{[2]}, j_{[1]}, j_{[0]}$". The quantum state $|1\rangle$ of the second preset auxiliary qubit is actually written as $|0001\rangle$, the two are equivalent.

Finally, the CNOT gate can be executed again on the current "b.sign" and $q_1$. The quantum state of the b.sign bit is $|1\rangle$ state. After the CNOT gate operation, the quantum state |1⟩ of the controlled bit $q_1$ is inverted into |0⟩, thereby once again restoring $q_1$ to the initial state |0⟩, releasing the storage space for $q_1$. It can be seen that the value 1100 included in the second complement quantum state is the complement of the subtrahend 1100 after executing the X gate on "b.sign".

Figure 16:
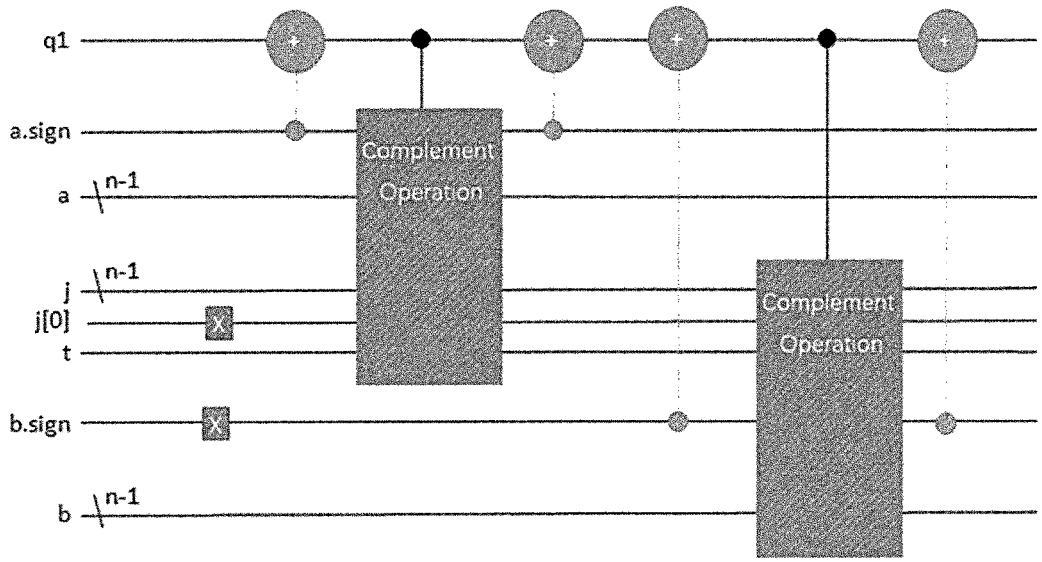
FIG. 16 is a schematic illustration of a complement quantum circuit before addition operation provided in the present disclosure.

In this embodiment, similarly for the second target quantum state b, the initial state of j is 0 state, the X gate is initially executed on $j_{[0]}$ in order to set the value to 1, and the X gate is executed on the sign-bit sub-quantum state "b.sign" in the second target quantum state to turn subtraction into addition. As shown in FIG. 16, which is a schematic illustration of the quantum state evolution corresponding to the complement operation for a and b: referring to a similar pattern to the above to execute the quantum state evolution corresponding to the complement operation for the second target quantum state b, to obtain the second complement quantum state.

S2204. For the first complement quantum state and the second complement quantum state, executing quantum state evolution corresponding to the addition operation, so as to evolve the first complement quantum state into a third target quantum state including the sum of the complement of the minuend data and the complement of said subtrahend data;

For Example: for the first complement quantum state |0011⟩ and the second complement quantum state |1100⟩, executing quantum state evolution corresponding to the addition operation, to evolve the first complement quantum state |0011⟩ into the fifth target quantum state |1111⟩.

In this embodiment, after the complement operation is executed, the addition operation is executed on "a" and "b", and the previous operation is restored after the addition. Accordingly, what is stored in "a" is what is required. Substituting the first complement quantum state and the second complement quantum state into the quantum circuit of the adder, to execute a quantum state evolution corresponding to the addition operation, thereby evolving the first complement quantum state into the third target quantum state including the sum of the complement of the minuend data and the complement of the subtrahend data.

S2205. According to the sign-bit sub-quantum state in the third target quantum state and the quantum state of the first preset auxiliary qubit, controlling the third target quantum state to execute a quantum state evolution corresponding to the complement operation, to obtain and output an evolved fourth target quantum state as the subtraction operation result of subtracting the subtrahend data from the minuend data; wherein the fourth target quantum state is a quantum state including the complement of the sum of the complements.

For Example: according to the sign-bit sub-quantum state |1⟩ in the current fifth target quantum state |1111⟩ and the quantum state |0⟩ of the current first preset auxiliary qubit, control the fifth target quantum state |1111⟩ to execute the quantum state evolution corresponding to the complement operation, to obtain the evolved sixth target quantum state |1001⟩ which includes a value of 1001 (decimal −1). That is, the result of subtracting the subtrahend 0100 (decimal 4) included in the second target quantum state |0100⟩ from the minuend 0011 (decimal 3) included in the first target quantum state |0011⟩.

It is to be noted that the quantum state evolution corresponding to the complement operation can be in the same way as the above. After the evolution, the quantum state of the second preset auxiliary qubit is still restored to |0⟩ to facilitate subsequent computing.

Further, the embodiment may further include, after said step "controlling the third target quantum state to execute the quantum state evolution corresponding to the complement operation, to obtain the evolved fourth target quantum state": according to the sign-bit sub-quantum state in the current second target quantum state and the quantum state of the current first preset auxiliary qubit, controlling the current second target quantum state to execute quantum state evolution corresponding to the complement operation, and executing quantum state evolution corresponding to sign-bit-inversion on the sign-bit sub-quantum state in the current second target quantum state, so as to restore the current second target quantum state.

For Example: the current second target quantum state is the second complement quantum state |1100⟩, and the current quantum state of the first preset auxiliary qubit is |0⟩. Continue to follow a similar pattern to the above to control |1100⟩ to execute the quantum state evolution corresponding to the complement operation, and obtain the evolved |1100⟩, and then use the X-gate operation to invert its sign-bit sub-quantum state, and restore it to the original second target quantum state |0100⟩.

Figure 17:
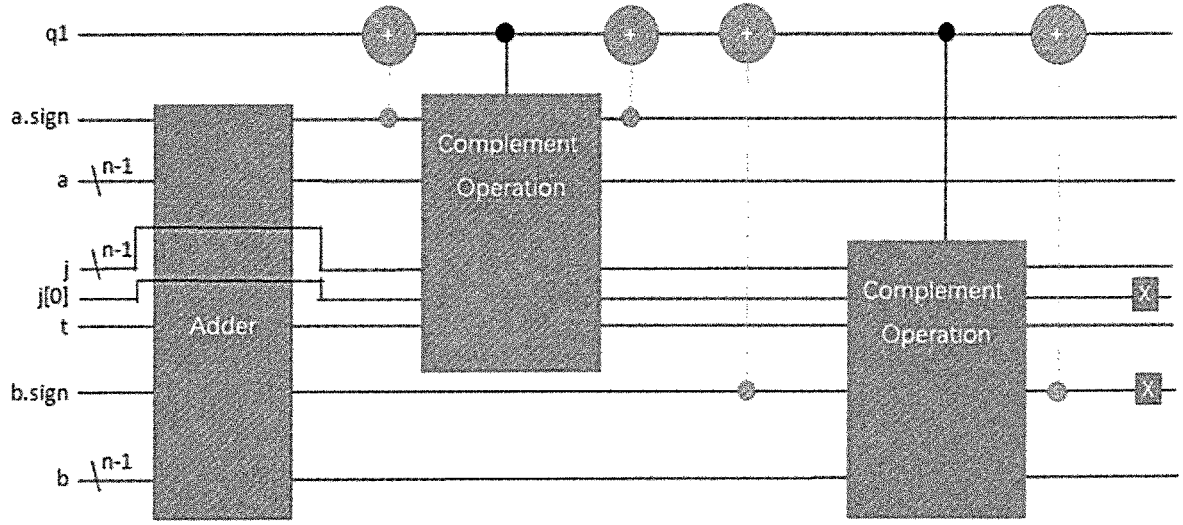
FIG. 17 is a schematic illustration of a complement quantum circuit after addition operation provided in the present disclosure.
Figure 18:
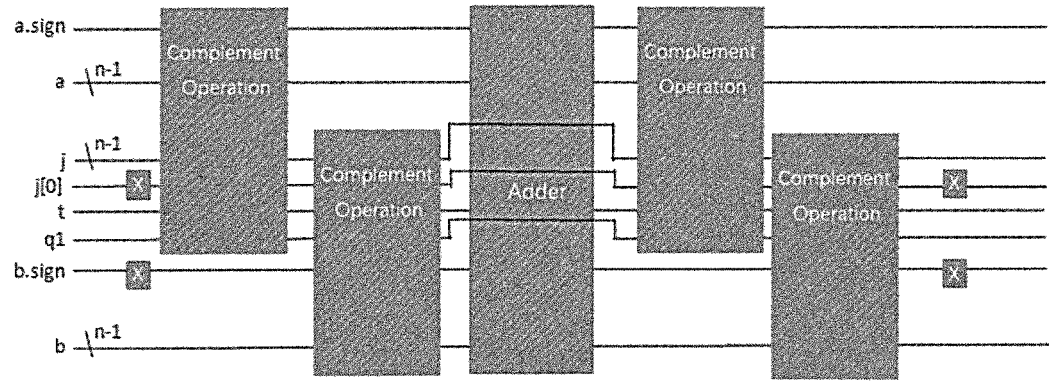
FIG. 18 is a schematic illustration of the quantum circuit of the subtractor provided in the present disclosure.

In this embodiment, after the addition operation, the quantum state evolution corresponding to the complement operation is further executed on the third target quantum state including the sum of the complement of the minuend data and the complement of the subtrahend data. As shown in FIG. 17, after completing the complement operations on a and b, we add the complements of "a" and "b". After obtaining the addition result on "a", execute the complement operation once again on "a", to evolve "a" into the final subtraction result. Then we restore b by executing a complement operation on "b" and inverting the sign bit of "b" through the X gate. In addition, we restore the first preset auxiliary qubit $q_1$ through the last CNOT gate, and then invert $j_{[0]}$ through the X gate and restore it to the initial 0 state, so as to obtain from FIG. 16 and FIG. 17 the simple quantum circuit diagram of the entire subtractor shown in FIG. 18.

Further, the quantum state evolution corresponding to the addition operation may include:

S2301, according to the bit number of qubits corresponding to the two quantum states to be operated, determining the target module number of the front-cascading modules (MAJ modules) to be cascaded and that of the rear-cascading modules (UMA modules) to be cascaded, wherein the number of the MAJ modules equals to the number of the UMA modules;

It can be seen from the foregoing that the two quantum states to be operated may be: the first complement quantum state and the second complement quantum state; the inverted first target quantum state and the quantum state |1⟩ of the second preset auxiliary qubit.

Figure 19:
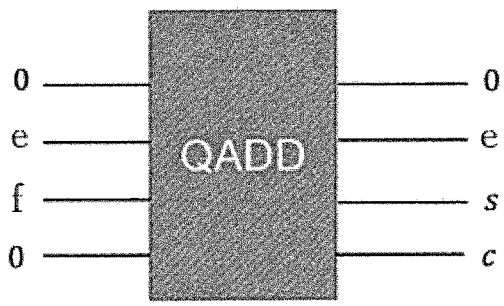
FIG. 19 is a schematic illustration of an adder provided in an embodiment of the present disclosure.

For Example: as shown in FIG. 19, the first qubit in the circuit is the third preset auxiliary qubit, which is initially |0⟩ state and will eventually return to |0⟩ state. The "e" and the "f" are quantum states corresponding to the data for addition operation, each corresponding to a group of qubits. The "c" represents the final carry item, corresponding to the preset carry auxiliary qubit. The "s" is the output bit and does not include a carry bit. Generally, it is generally required that the bit number of qubits corresponding to "e" equals to that corresponding to "f", and the bit number of "s" equals to that of "e" and "f".

Figure 20:
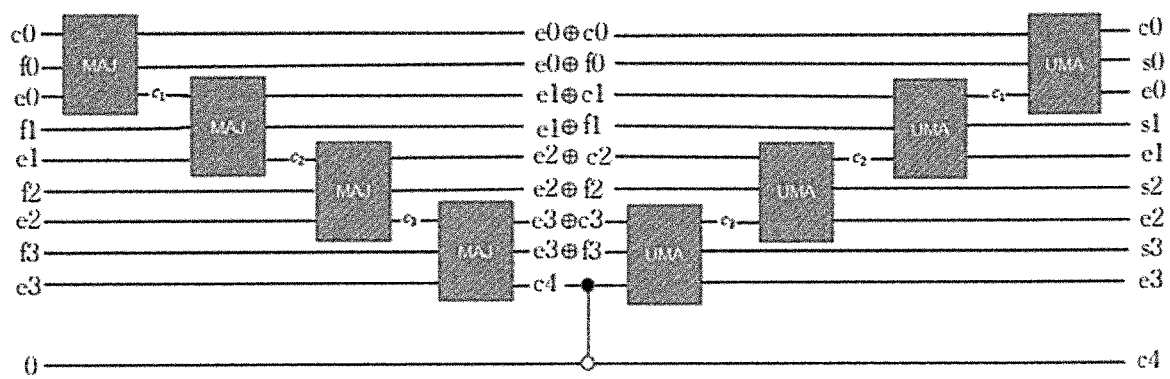
FIG. 20 is a schematic illustration of an adder quantum circuit provided in an embodiment of the present disclosure.

For Example: as shown in FIG. 20, $e_{[i]}$ and $f_{[i]}$ are respectively the i-th bit of the quantum state corresponding to the two addends, and $c_{[i]}$ is the previous-stage carry.

$$s_{[i]}=e_{[i]} \text{ XOR } f_{[i]} \text{ XOR } c_{[i]},$$

$$c_{[i+1]}=(e_{[i]} \text{ AND } f_{[i]}) \text{XOR}(e_{[i]} \text{ AND } f_{[i]}) \text{XOR}(e_{[i]} \text{ AND } f_{[i]}),$$

Here, the first qubit is the third preset auxiliary qubit, corresponding to $c_0$ in the quantum circuit. The first MAJ module includes three input quantum states and three corresponding output quantum states, where the three input quantum states are $c_0$, $e_0$, and $f_0$, and $e_0$ is the 0th bit quantum state of the first quantum state to be operated, $f_0$ is the $0^{th}$ bit quantum state of the second quantum state to be operated, $c_0$ is the quantum state of the third preset auxiliary qubit, and the initial value is 0, that is to say there is no carry. The three output quantum states are respectively $e_0 \oplus c_0$, $e_0 \oplus f_0$ and $c_1$, and $c_1$ is the carry after the addition of $c_0$ and $f_0$. Similarly, the three input quantum states of the next MAJ module are $c_i$, $e_i$, and $f_i$, and the three output quantum states are respectively $e_1 \oplus c_1$, $e_1 \oplus f_1$, and $c_2$, and so on to the last MAJ module.

For the first UMA module, it includes three input quantum states and three corresponding output quantum states, where the three output quantum states of the MAJ module correspond to the three input quantum states of the UMA module, and the three output quantum states are respectively $c_0$, $s_0$, $e_0$, where $s_0$ is the carry-free result of adding $e_0$ and $f_0$. Similarly, $s_i$ is the carry-free result of adding $e_1$ and $f_1$, and so on, the $c_4$ is the final carry item. It is to be noted that, in practical applications, where there is no need to calculate the final carry, the qubit corresponding to $c_4$ does not have to be provided in the quantum circuit.

Moreover, the number of the MAJ modules and the number of UMA modules can be determined according to the number of sub-quantum state s contained in any quantum state to be operated, one sub-quantum state corresponding to one qubit, wherein the number of the MAJ modules is equal to the number of UMA modules. What is shown in FIG. 20 is only an example, where 4 qubits are required for encoding each of "e" and "f", and the number of MAJ modules and that of UMA modules are both 4. The MAJ module and the UMA module constitute the front and rear cascading units of the adder. The MAJ module can be used for extracting the carry term of any step, and pass it to the next stage to calculate the final carry term. The UMA module not only extracts the information of "c" and transmits it to the previous-stage UMA, but also calculates the "s" (result item) of each stage and recovers the information of "e".

For Example: When 4 (corresponding encoding is expressed in a 3-qubit quantum state as 100)+2 (corresponding encoding is expressed in a 3-qubit quantum state as 010)=6 (corresponding encoding is expressed in a 3-qubit quantum state as 110). At this time, the bit number of qubits encoding the operation result is the same as the bit number of qubits encoding "e" or the bit number of qubits used for encoding "f", while the number of the MAJ modules and the number of UMA modules are both 3.

For Example: When 4 (corresponding encoding is expressed in a 3-qubit quantum state as 100)+7 (corresponding encoding is expressed in a 3-qubit quantum state as 111)=11 (corresponding encoding is expressed in a 3-qubit quantum state as 011). However, it can be understood that the binary number corresponding to 11 is 1011, and the bit where the leftmost 1 is located is a carry item, which can be represented by an auxiliary qubit. At this time, the bit number of qubits encoding the operation result is greater than the bit number of qubits encoding "e" or the bit number of qubits used for encoding "f", and the number of the MAJ modules and the number of UMA modules are both 3.

For Example: when 2 (corresponding encoding is expressed in a 2-qubit quantum state as 10)+4 (corresponding encoding is expressed in a 3-qubit quantum state as 100)=6 (corresponding encoding is expressed in a 3-qubit quantum state as 110). At this time, the numerical item "3" encoding the numerical value of "6" equals to the number of quantum states of the qubit encoding "b", and the number of the MAJ modules and the number of UMA modules are both 3.

S2302. According to an addition instruction, cascading the MAJ modules and the UMA modules both in the target module number, to generate a target quantum circuit corresponding to the adder;

Here, the MAJ module and the UMA module each includes three input items and three output items; according to the addition instruction, the three output items of an MAJ cascading module can be used as three inputs of a corresponding UMA cascading module, so as to cascade the MAJ cascading module with the corresponding UMA cascading module to generate a target quantum circuit corresponding to an adder. Here, the MAJ cascading module is determined by cascading of MAJ modules in the target module number, and the UMA cascading module is determined by cascading of UMA modules in the target module number.

Specifically, the three input items of the MAJ module include a carry input item and two sub-quantum state input items to be operated, the three output items of the MAJ module include a carry output item and two intermediate result output items. The three input items of the UMA module include a carry output item and two intermediate result output items of the corresponding MAJ module, and the three output items of the UMA module include a result carry output item, an accumulation output item and a sub-quantum state input item to be operated, Then, according to the addition instruction, the carry output item output by the previous MAJ module and the two sub-quantum state input items to be operated can be used as three input items of the next MAJ module, so that the MAJ modules in the target module number are cascaded;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder. If the carry item is not needed, the CNOT gate and the carry auxiliary qubit does not have to be provided.

In this embodiment, as shown in FIG. 20, according to the figure, use the three output bits of the MAJ module as the three input bits of the UMA module, thereby cascading the same number of MAJ modules and UMA modules to generate a target quantum circuit corresponding to an adder. Here, the hollow circles and solid circles connected in the circuit diagram represent CNOT gate operations, the hollow circles correspond to qubits as controlling bits, and the solid circles correspond to those as controlled bits.

Here, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the embodiment further includes, before said step "cascading the MAJ modules in the target module number with the UMA modules in the target module number, so as to generate a target quantum circuit corresponding to the adder": obtaining operation qubits corresponding to the two CNOT quantum logic gates and one TOFFOLI quantum logic gate, the control relationship between the operation qubits and the timing relationship between the two CNOT quantum logic gates and one TOFFOLI quantum logic gate; according to the operation qubits, the control relationship and the timing relationship, use the two CNOT quantum logic gates and one TOFFOLI quantum logic gate to construct and generate the MAJ quantum circuit or the UMA quantum circuit as a corresponding MAJ module or a corresponding UMA module.

Figure 21:
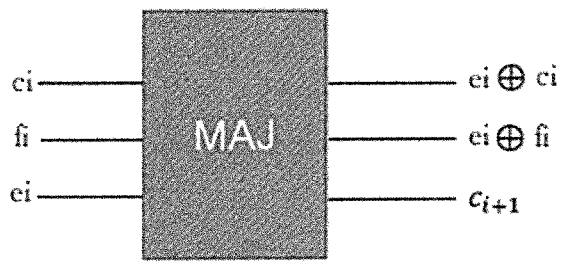
FIG. 21 is a schematic illustration of an MAJ module provided in an embodiment of the present disclosure.
Figure 22:
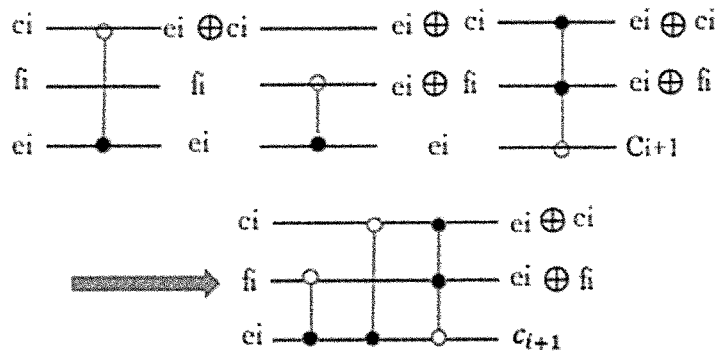
FIG. 22 is a schematic illustration of the MAJ module quantum circuit combination process provided in an embodiment of the present disclosure.

In this embodiment, the MAJ module and the UMA module constitute the front and rear cascading units of the adder. As shown in FIG. 21, the MAJ module is used for extracting the carry item after each stage of addition and pass it to the next stage, so as to calculate the final carry item. Here, as shown in FIG. 22, the MAJ module can be mainly composed of three logic gates, namely two CNOT gates and one Toffoli gate. The function of a CNOT gate (the first and second logic gates from left to right in FIG. 22) is: adding the controlling bit to the target bit to form a modulo 2 addition, which is an exclusive OR operation, and obtaining $(e_i+c_i)$ %2 and $(e_i+f_i)$ %2, the order of the two CNOT gates can be swapped. The function of the Toffoli gate (the third logic gate from left to right in FIG. 22) is: adding both controlling bits to the target bit to obtain the carry item $c_{[i+1]}=(e_{[i]}$ AND $f_{[i]})$ XOR $(e_{[i]}$ AND $f_{[i]})$ XOR $(e_{[i]}$ AND $f_{[i]})$. That is, to implement $e_i \oplus c_i$ through the first CNOT gate from left to right in FIG. 22, to implement $e_i \oplus f_i$ through the second CNOT gate from left to right in FIG. 24, and to implement ciii through the third TOFFOLI gate from left to right in FIG. 22, thereby forming the front-stage cascading unit of the quantum adder with two CNOT gates and one TOFFOLI gate.

Example 1: $e_i$ is 1, $f_i$ is 1, and $c_i$ is 1.

The MAJ module starts by adding $e_i$ to $c_i$, the value of $c_i$ becomes 0, then adds $e_i$ to $f_i$, the value of $f_i$ also becomes 0, and finally adds $f_i$ and $c_i$ to $e_i$, the value of $e_i$ becomes 1, that is, the carry of $c_{i+1}$ is 1.

Example 2: $e_i$ is 0, $f_i$ is 1, and $c_i$ is 1.

The MAJ module starts by adding $e_i$ to $c_i$, the value of $c_i$ becomes 1, then adds $e_i$ to $f_i$, the value of $f_i$ also becomes 1, and finally adds $f_i$ and $c_i$ to $e_i$, the value of $e_i$ becomes 1, that is, the carry of $c_{i+1}$ is 1.

Figure 23:
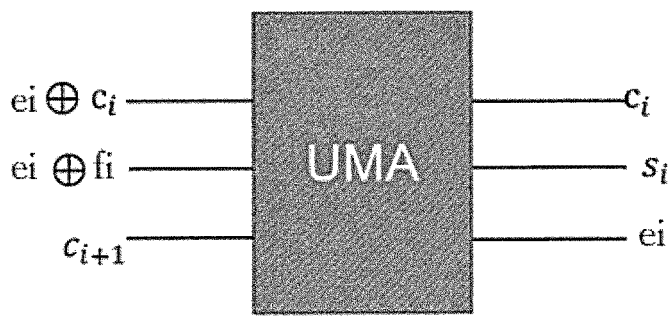
FIG. 23 is a schematic illustration of a UMA module provided in an embodiment of the present disclosure.
Figure 24:
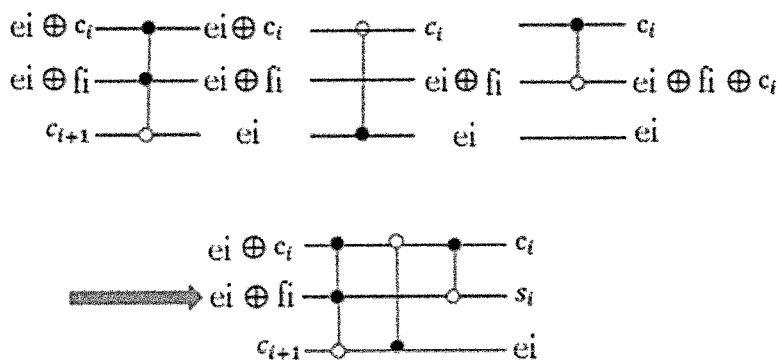
FIG. 24 is a schematic illustration of the UMA module quantum circuit combination process provided in an embodiment of the present disclosure.

As shown in FIG. 23, the UMA module is used as the rear-stage of the cascaded adder. The implementation of a UMA module is similar to that of an MAJ module: as shown in FIG. 24, the Toffoli gate (the first logic gate from left to right in FIG. 24) is first used for restoring $c_{i+1}$ to $e_i$; and then use $e_i$ to restore (e+c) %2 with the CNOT gate (the second logic gate from left to right in FIG. 24), and $(e_i+c_i)$ %2 is restored to $c_i$; and finally, use $c_i$ to execute a CNOT gate (the third logic gate from left to right in FIG. 24) on $(e_i+f_i)$ %2, get the final result of the current bit $s_{[i]}=e_{[i]}$ XOR $f_{[i]}$ XOR $c_{[i]}$.

Example 1: $(e_i+c_i)$ %2 is 0, $(e_i+f_i)$ %2 is 0, $c_{i+1}$ is 1.

Start by adding $(e_i+c_i)$ %2 and $(e_i+f_i)$ %2 to $c_{i+1}$, the value of $c_{i+1}$ becomes 1, and the meaning thereof becomes $e_i$, then add $e_i$ to $(e_i+c_i)$ %2, the value of $(e_i+c_i)$ %2 becomes 1, and the meaning thereof becomes $c_i$, then add $c_i$ to $(e_i+f_i)$ %2, the value of $(e_i+f_i)$ %2 becomes 1, and the meaning thereof becomes $s_i$.

Example 2: $(e_i+c_i)$ %2 is 1, $(e_i+f_i)$ %2 is 1, $c_{i+1}$ is 1.

Start by adding $(e_i+c_i)$ %2 and $(e_i+f_i)$ %2 to $c_{i+1}$, the value of $c_{i+1}$ becomes 0, and the meaning thereof becomes $e_i$, then add $e_i$ to $(e_i+c_i)$ %2, the value of $(e_i+c_i)$ %2 becomes 1, and the meaning thereof becomes $c_i$, then add $c_i$ to $(e_i+f_i)$ %2, the value of $(e_i+f_i)$ %2 becomes 0, and the meaning thereof becomes $s_i$.

As shown in FIG. 22, the last CNOT gate from top to bottom, that is, the CNOT gate between the MAJ module and the UMA module in the entire adder, is used for storing the result of $c_{i+1}$.

S2303. Executing, with the target quantum circuit, an addition operation of each sub-quantum state of the two quantum states to be operated, so as to generate and output a target quantum state result.

In this embodiment, by inputting the two quantum states to be operated, such as |111> and |111>, into the adder (that is, the target quantum circuit), the corresponding binary representation of the operation result of the target quantum state (including carry term and the result term obtained by direct addition of each sub-quantum state) is obtained. Then the binary expression of the result |110> of the target quantum state is directly output, or is further transformed into a decimal result 14 and output to complete the addition operation of the two target data.

It can be seen that, by transforming the minuend data into a first target quantum state, transforming the subtrahend data into a second target quantum state; controlling the first target quantum state to execute the quantum state evolution corresponding to the complement operation, to obtain the first complement quantum state, controlling the current second target quantum state to execute the quantum state evolution corresponding to the complement operation, to obtain the second complement quantum state; executing quantum state evolution corresponding to the addition operation on the first complement quantum state and the second complement quantum state, to obtain a third target quantum state; controlling the third target quantum state to execute the quantum state evolution corresponding to the complement operation, to obtain an evoluted fourth target quantum state: the subtraction operation for quantum circuits is realized, and the gaps in the related art are filled.

Figure 25:
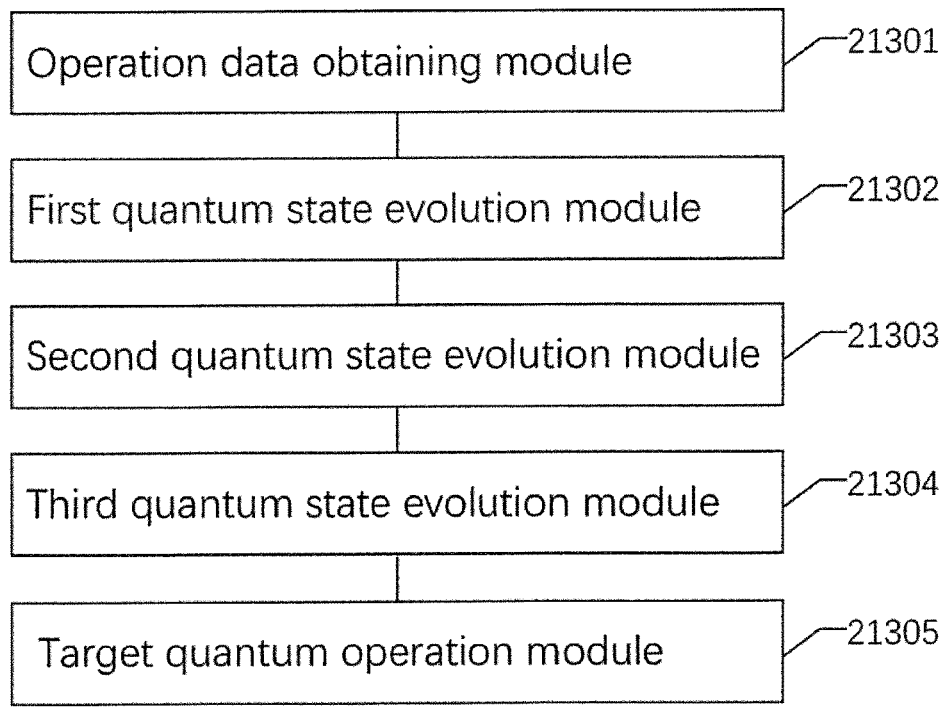
FIG. 25 is a schematic structural illustration of a device for quantum subtraction operation provided in an embodiment of the present disclosure.

Referring to FIG. 25, another embodiment of the present disclosure provides a device for quantum subtraction operation, and the device includes:

An operation data obtaining module 21301, configured for: obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value;

A first quantum state evolution module 21302, configured for: obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data;

A second quantum state evolution module 21303, configured for: executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data.

A third quantum state evolution module 21304, configured for: executing quantum state evolution corresponding to the addition operation on the first complement quantum state and the second complement quantum state, so as to evolute the first complement quantum state into a third target quantum state including the sum of the complement of the minuend data and the complement of the subtrahend data;

A target quantum operation module 21305, configured for; according to the sign-bit sub-quantum state in the third target quantum state and the quantum state of the first preset auxiliary qubit, controlling the third target quantum state to execute a quantum state evolution corresponding to the complement operation, to obtain and output an evolved fourth target quantum state as the subtraction operation result of subtracting the subtrahend data from the minuend data; wherein the fourth target quantum state is a quantum state including the complement of the sum of the complements.

Specifically, after the target quantum operation module, the device further includes:

A restoration module, configured for: according to the sign-bit sub-quantum state in the current second target quantum state and the quantum state of the current first preset auxiliary qubit, controlling the current second target quantum state to execute quantum state evolution corresponding to the complement operation, and executing quantum state evolution corresponding to sign-bit-inversion on the sign-bit sub-quantum state in the current second target quantum state, so as to restore the current second target quantum state.

Specifically, the first quantum state evolution module is specifically configured for:

Executing a CNOT gate operation on the first sign-bit-qubit corresponding to the sign-bit sub-quantum state in the first target quantum state and the first preset auxiliary qubit, wherein the first sign-bit-qubit is a controlling bit, the first preset auxiliary qubit is a controlled bit;

According to the quantum state of the first preset auxiliary qubit after execution of the CNOT gate operation, controlling whether the current first target quantum state executes the quantum state evolution corresponding to the complement operation;

If yes, invert the non-sign-bit sub-quantum state of the current first target quantum state, and for the inverted first target quantum state and the quantum state |1⟩ of the second preset auxiliary qubit, executing quantum state evolution corresponding to the addition operation, to obtain the evolved first complement quantum state, otherwise, using the first target quantum state as the first complement quantum state;

Executing a CNOT gate operation on the current first sign-bit-qubit and the first preset auxiliary qubit, to restore the quantum state of the current first preset auxiliary qubit; wherein the first sign-bit-qubit is a controlling bit, and the first preset auxiliary qubit is a controlled bit.

Specifically, the second quantum state evolution module is configured for:

For the second sign-bit-qubit corresponding to the sign-bit sub-quantum state in the second target quantum state, executing an X-gate operation to obtain the inverted sign-bit sub-quantum state;

Executing a CNOT gate operation on the current second sign-bit-qubit and the first preset auxiliary qubit, wherein the second sign-bit-qubit is a controlling bit, and the first preset auxiliary qubit is a controlled bit;

According to the current quantum state of the first preset auxiliary qubit after execution of the CNOT gate operation, controlling whether the current second target quantum state executes the quantum state evolution corresponding to the complement operation;

if yes, inverting the non-sign-bit sub-quantum state of the current second target quantum state, and for the inverted second target quantum state and the quantum state |1⟩ of the second preset auxiliary qubit, executing quantum state evolution corresponding to the addition operation, to obtain the evolved second complement quantum state, otherwise, using the current second target quantum state as the second complement quantum state;

Executing a CNOT gate operation on the current second sign-bit-qubit and the first preset auxiliary qubit, to restore the current quantum state of the first preset auxiliary qubit; wherein the second sign-bit-qubit is a controlling bit, and the first preset auxiliary qubit is a controlled bit.

Specifically, the third quantum state evolution module includes:

A determination unit, configured for: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules;

A cascading unit, configured for: according to an addition instruction, cascading the MAJ modules and the UMA modules both in the target module number, to generate a target quantum circuit corresponding to the adder;

An operation unit, configured for: executing, with the target quantum circuit, an addition operation of each sub-quantum state of the two quantum states to be operated, so as to generate and output a target quantum state result.

Specifically, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, Before the cascading unit, the third quantum state evolution module further includes:

An obtaining unit, configured for: obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate;

A construction unit, configured for: according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Specifically, each of the MAJ module and the UMA module includes three input items and three output items; the cascading unit includes:

A cascading subunit, configured for: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

As mentioned above, here, preferably, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, the cascade subunit is specifically configured for:

According to the addition instruction, using the carry output item output by the previous MAJ module and the two sub-quantum state input items to be operated as the three input items of the next MAJ module, so as to cascade the MAJ modules in the target module number;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module; and Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

It can be seen that, with the method "transforming the minuend data into a first target quantum state, transforming the subtrahend data into a second target quantum state; controlling the first target quantum state to execute the quantum state evolution corresponding to the complement operation, to obtain the first complement quantum state, controlling the current second target quantum state to execute the quantum state evolution corresponding to the complement operation, to obtain the second complement quantum state; executing quantum state evolution corresponding to the addition operation on the first complement quantum state and the second complement quantum state, to obtain a third target quantum state; controlling the third target quantum state to execute the quantum state evolution corresponding to the complement operation, to obtain an evolved fourth target quantum state", the subtraction operation for quantum circuits is realized, filling the gap in the related art.

Yet another embodiment of the present disclosure provides an electronic device, including a memory having a computer program stored therein, and a processor configured to execute the computer program to perform the following method:

S1. Obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing a data sign, and a value bit sub-quantum state representing a data value;

S2. Obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data;

S3. Executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data.

S4. For the first complement quantum state and the second complement quantum state, executing quantum state evolution corresponding to the addition operation, so as to evolve the first complement quantum state into a third target quantum state including the sum of the complement of the minuend data and the complement of said subtrahend data;

S5. According to the sign-bit sub-quantum state in the third target quantum state and the quantum state of the first preset auxiliary qubit, controlling the third target quantum state to execute a quantum state evolution corresponding to the complement operation, to obtain and output an evolved fourth target quantum state as the subtraction operation result of subtracting the subtrahend data from the minuend data; wherein the fourth target quantum state is a quantum state including the complement of the sum of the complements.

Yet another embodiment of the present disclosure provides a storage medium, in which a computer program is stored, wherein the computer program is configured to execute the following method when running:

S1. Obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value;

S2. Obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data;

S3. Executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data;

S4. For the first complement quantum state and the second complement quantum state, executing quantum state evolution corresponding to the addition operation, so as to evolve the first complement quantum state into a third target quantum state including the sum of the complement of the minuend data and the complement of said subtrahend data;

S5. According to the sign-bit sub-quantum state in the third target quantum state and the quantum state of the first preset auxiliary qubit, controlling the third target quantum state to execute a quantum state evolution corresponding to the complement operation, to obtain and output an evoluted fourth target quantum state as the subtraction operation result of subtracting the subtrahend data from the minuend data; wherein the fourth target quantum state is a quantum state including the complement of the sum of the complements.

The above-described embodiments can be summarized as follows.

C21. A method for quantum subtraction operation, characterized by including: obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value; obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data; executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data; for the first complement quantum state and the second complement quantum state, executing quantum state evolution corresponding to the addition operation, so as to evolve the first complement quantum state into a third target quantum state including the sum of the complement of the minuend data and the complement of said subtrahend data; and according to the sign-bit sub-quantum state in the third target quantum state and the quantum state of the first preset auxiliary qubit, controlling the third target quantum state to execute a quantum state evolution corresponding to the complement operation, to obtain and output an evoluted fourth target quantum state as the subtraction operation result of subtracting the subtrahend data from the minuend data; wherein the fourth target quantum state is a quantum state including the complement of the sum of the complements.

C22. A method according to C21, characterized in that the method further includes, after said step "controlling the third target quantum state to execute the quantum state evolution corresponding to the complement operation, to obtain the evolved fourth target quantum state": according to the sign-bit sub-quantum state in the current second target quantum state and the quantum state of the current first preset auxiliary qubit, controlling the current second target quantum state to execute quantum state evolution corresponding to the complement operation, and executing quantum state evolution corresponding to sign-bit-inversion on the sign-bit sub-quantum state in the current second target quantum state, so as to restore the current second target quantum state.

C23. A method according to C21 or C22, characterized in that the first target quantum state is controlled according to the sign-bit sub-quantum state in the first target quantum state and the quantum state of the first preset auxiliary qubit. The step of executing the quantum state evolution corresponding to the complement operation in the state specifically includes: executing a CNOT gate operation on the first sign-bit-qubit corresponding to the sign-bit sub-quantum state in the first target quantum state and the first preset auxiliary qubit, wherein the first sign-bit-qubit is a controlling bit, the first preset auxiliary qubit is a controlled bit; according to the quantum state of the first preset auxiliary qubit after execution of the CNOT gate operation, controlling whether the current first target quantum state executes the quantum state evolution corresponding to the complement operation; if yes, invert the non-sign-bit sub-quantum state of the current first target quantum state, and for the inverted first target quantum state and the quantum state |1⟩ of the second preset auxiliary qubit, executing quantum state evolution corresponding to the addition operation, to obtain the evolved first complement quantum state, otherwise, using the first target quantum state as the first complement quantum state; executing a CNOT gate operation on the current first sign-bit-qubit and the first preset auxiliary qubit, to restore the quantum state of the current first preset auxiliary qubit; wherein the first sign-bit-qubit is a controlling bit, and the first preset auxiliary qubit is a controlled bit.

C24. A method according to any one of C21-C23, characterized in that, said step "executing quantum state evolution corresponding to sign-bit inversion on the sign-bit sub-quantum state in the second target quantum state, and according to the inverted sign-bit sub-quantum state and the quantum state of the first preset auxiliary qubit, controlling the second target quantum state to execute quantum state evolution corresponding to the complement operation" specifically includes: for the second sign-bit-qubit corresponding to the sign-bit sub-quantum state in the second target quantum state, executing an X-gate operation to obtain the inverted sign-bit sub-quantum state; executing a CNOT gate operation on the current second sign-bit-qubit and the first preset auxiliary qubit, wherein the second sign-bit-qubit is a controlling bit, and the first preset auxiliary qubit is a controlled bit; according to the current quantum state of the first preset auxiliary qubit after execution of the CNOT gate operation, controlling whether the current second target quantum state executes the quantum state evolution corresponding to the complement operation; if yes, invert the non-sign-bit sub-quantum state of the current second target quantum state, and for the inverted second target quantum state and the quantum state |1⟩ of the second preset auxiliary qubit, executing quantum state evolution corresponding to the addition operation, tp obtain the evolved second complement quantunm state, otherwise, use the current second target quantum state as the second complement quantum state; and executing a CNOT gate operation on the current second sign-bit-qubit and the first preset auxiliary qubit, to restore the current quantum state of the first preset auxiliary qubit; wherein the second sign-bit-qubit is a controlling bit, and the first preset auxiliary qubit is a controlled bit.

C25. A method according to any one of C21-C24, characterized in that said "executing quantum state evolution corresponding to the addition operation" includes: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules; according to an addition instruction, cascading the MAJ modules and the UMA modules both in the target module number, to generate a target quantum circuit corresponding to the adder; executing, with the target quantum circuit, an addition operation of each sub-quantum state of the two quantum states to be operated, so as to generate and output a target quantum state result.

C26. A method according to any one of C21-C25, characterized in that, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the method further includes, before the step "according to an addition instruction, cascading the MAJ modules and the UMA modules both in the target module number, to generate a target quantum circuit corresponding to the adder": obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

C27. A method according to any one of C21-C26, characterized in that, the MAJ module and the UMA module each includes three input items and three output items, said step "according to an addition instruction, cascading the MAJ modules and the UMA modules both in the target module number, to generate a target quantum circuit corresponding to the adder" specifically includes: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

C28. The method of any one of C21-C27, characterized in that the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, said step "according to an addition instruction, using three output items of an MAJ cascading module as three input items of a corresponding UMA cascading module, so as to cascade the MAJ cascading module with the corresponding UMA cascading module to generate a target quantum circuit corresponding to the adder" specifically includes: according to the addition instruction, using the carry output item output by the previous MAJ module and the two sub-quantum state input items to be operated as the three input items of the next MAJ module, so as to cascade the MAJ modules in the target module number; using two intermediate result output items of an MAJ module as two input items of a corresponding UMA module, obtaining a previous UMA module preceding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module; and adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

C28. A device for quantum subtraction operation, characterized in that the device includes: an operation data obtaining module, configured for: obtaining the minuend data and the subtrahend data to be operated, transforming the minuend data into a first target quantum state, and transforming the subtrahend data into a second target quantum state; wherein each of the first target quantum state and the second target quantum state includes: a sign-bit sub-quantum state representing the data sign and a value bit sub-quantum state representing the data value; a first quantum state evolution module, configured for: obtaining the quantum state of the first preset auxiliary qubit; a first quantum state evolution module, configured for: obtaining the quantum state of the first preset auxiliary qubit, and according to the sign-bit sub-quantum state in the first target quantum state and the quantum state of the first preset auxiliary qubit, controlling the first target quantum state to execute quantum state evolution corresponding to the complement operation, to obtain the first complement quantum state; wherein the first complement quantum state is the quantum state including the complement of the minuend data; a second quantum state evolution module, configured for executing quantum state evolution corresponding to sign-bit-inversion on the sign-bit sub-quantum state in the second target quantum state, and according to the inverted sign-bit sub-quantum state and the quantum state of the first preset auxiliary qubit, controlling the current second target quantum state to execute quantum state evolution corresponding to the complement operation, to obtain the second complement quantum state; wherein the second complement quantum state is the quantum state including the complement of the subtrahend data; a third quantum state evolution module, configured for: executing quantum state evolution corresponding to the addition operation on the first complement quantum state and the second complement quantum state, so as to evolute the first complement quantum state into a third target quantum state including the sum of the complement of the minuend data and the complement of the subtrahend data; a target quantum operation module, configured for: according to the sign-bit sub-quantum state in the third target quantum state and the quantum state of the first preset auxiliary qubit, controlling the third target quantum state to execute a quantum state evolution corresponding to the complement operation, to obtain and output an evoluted fourth target quantum state as the subtraction operation result of subtracting the subtrahend data from the minuend data; wherein the fourth target quantum state is a quantum state including the complement of the sum of the complements.

C29. An electronic device, including a memory having a computer program stored therein, and a processor configured to execute the computer program to perform the method of any one of C21-C27.

C210. A storage medium, wherein the storage medium has a computer program stored therein, which computer program, when executed, is configured to execute any one of the methods of C21-C27.

Compared with the prior art, the quantum subtraction method provided in the present disclosure includes: transforming the minuend data into a first target quantum state, transforming the subtrahend data into a second target quantum state; controlling the first target quantum state to execute the quantum state evolution corresponding to the complement operation, to obtain the first complement quantum state, controlling the current second target quantum state to execute the quantum state evolution corresponding to the complement operation, to obtain the second complement quantum state; executing quantum state evolution corresponding to the addition operation on the first complement quantum state and the second complement quantum state, to obtain a third target quantum state; controlling the third target quantum state to execute the quantum state evolution corresponding to the complement operation, to obtain an evoluted fourth target quantum state. Thereby, the subtraction operation for quantum circuits is realized, filling the gap in the related art.

An embodiment of the present disclosure provides a method for quantum multiplication operation for implementing a basic arithmetic operation. The basic arithmetic operation operation may be a multiplication operation as shown in a flow diagram of a method for quantum multiplication operation provided in FIG. 26, including:

S3201: Obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state.

Specifically, the multiplicand data to be operated refers to the number to be multiplied in the multiplication operation, also called a factor, generally placed in the front of the formula; the multiplier data refers to the number to multiply other numbers in the multiplication operation, also called a factor, generally placed in the rear of the formula.

A quantum state space represented by a qubit refers to the quantum state information represented by all the eigenstates corresponding to the qubit, and the number of all the eigenstates is 2 to the power of the bit number of qubits.

The quantum state refers to the state of the qubit, and its eigenstate is expressed in binary in the quantum algorithm (or quantum program). For example, a group of qubits is $q_0$, $q_1$, and $q_2$, representing the 0th, 1st, and 2nd qubits, and the order from high to low is $q_2q_1q_0$; the quantum state of this group of qubits is a superposition of $2^3$ eigenstates; the 8 eigenstates (determined states) refer to: $|000\rangle$, $|001\rangle$, $|010\rangle$, $|011\rangle$, $|100\rangle$, $|101\rangle$, $|110\rangle$, $|111\rangle$, each eigenstate is consistent with the qubit, for example $|000\rangle$, 000 corresponds to $q_2q_1q_0$ from high to low. In short, a quantum state is a superposition state composed of eigenstates. When the probability amplitude of other states is 0, it is in one of the definite eigenstates.

For example, the value of the data to be operated is 2, and a set of qubits for storing the data to be operated has 2 or more bits, for example, if there are 5 qubits, then its quantum state can be $|00010\rangle$, wherein the two lowest bits are binary 10, which is used for representing the binary value of the data to be operated. The useful information is the lowest two bits of information, and the quantum state corresponding to the data value to be operated can also be abbreviated as $|2\rangle = |10\rangle$.

For Example: if the multiplicand data to be operated is 7 and the multiplier data is 5, then the multiplicand data is transformed into the first target quantum state $|111\rangle$, and there are 3 or more qubits in a group of qubits for storing the first target quantum state; the multiplier data is transformed into the second target quantum state $|101\rangle$, because the bit number of qubits corresponding to the first target quantum state is at least twice the bit number of qubits corresponding to the second target quantum state, the bit number of qubits storing the first target quantum state needs to be increased.

That is, to increase the group of qubits for storing the first target quantum state to 6 qubits, and at this moment, the first target quantum state is |000111⟩.

S3202: For each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evoluted third target quantum state of the stored addition operation result; wherein the initial state of the third target quantum state is |0⟩, and the bit number by which the binary value left-shifts is determined by the bit number of the current bit.

Specifically, said step "for each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation" includes the following steps:

S32021: Obtaining a first preset auxiliary qubit in the same bit number as the qubit corresponding to the first target quantum state, and initializing a third target quantum state of the first preset auxiliary qubit as |0⟩.

Specifically, the first preset auxiliary qubit can be used for storing the multiplication result of the multiplicand data and the multiplier data, the initialized third target quantum state thereof being |0⟩, and the bit number of the first preset auxiliary qubit equals to the bit number of the qubit corresponding to storing the first quantum state.

For Example: following the above example, a group of qubits storing the first target quantum state includes 6 qubits, and the first target quantum state is |000111⟩, at this time, the bit number of the first preset auxiliary qubit equals to that of the qubit corresponding to storing the first quantum state, both are 6 qubits, and the third target quantum state after initialization is |000000⟩.

S32022: determining the binary value of the current bit, starting from the first bit in the binary value stored in the second target quantum state.

Specifically, the first bit in the binary value stored in the second target quantum state is the low bit of the second target quantum state, determination as to whether the current binary value is 1 is executed sequentially, starting from this low bit.

For Example: the second target quantum state is |101⟩, and from the high bit to the low bit is 101; the bit order of the preset second target quantum state starts from the low bit, i.e., the first bit is binary value 1, and the second bit is binary value 0, and the third bit is binary value 1.

S32023: In the case of determining that the binary value of the current bit is 1, executing quantum state evolution corresponding to the addition operation on the current third target quantum state of the first preset auxiliary qubit and the current first target quantum state; otherwise, no operation is executed.

Specifically, following the above example, initially, the first target quantum state is |000111⟩, the second target quantum state is |101⟩, and the third target quantum state is |000000⟩, and the binary value of the current bit of the second target quantum state is determined sequentially: if it is 1, then execute quantum state evolution corresponding to the addition operation on the third target quantum state of the first preset auxiliary qubit and the first target quantum state, i.e., to execute quantum state evolution corresponding to the addition operation on the current first target quantum state |000111⟩ with the third target quantum state |000000⟩; if it is 0, then no operation is executed.

S32024: Swapping between the sub-quantum state s contained in the first target quantum state using quantum logic gates, so that the binary value stored in the first target quantum state is left-shifted by one bit.

Specifically, following the above example, initially, the first target quantum state is |000111⟩, use quantum logic gates to swap between the sub-quantum state s contained in the first target quantum state |000111⟩, so that the binary value stored in the first target quantum state is left-shifted by one bit to transform into the quantum state |001110⟩.

For Example: the quantum logic gate SWAP gate is used e.g., for left-shifting the first target quantum state |000111⟩ by one bit and transform it into the quantum state |001110⟩. Specifically, in the quantum circuit storing the first target quantum state, from the low bit to the high bit: a SWAP gate is first inserted between the third and fourth qubits, that is, the first target quantum state |000111⟩ is transformed into the first intermediate quantum state |001011⟩; a SWAP gate is inserted between the fourth and fifth qubits, that is, to transform the first intermediate quantum state |001011⟩ to the second intermediate quantum state |001101⟩; finally, a SWAP gate is inserted between the fifth and sixth qubits, i.e., to transform the second intermediate quantum state |001101⟩ to the quantum state |001110⟩ where the first target quantum state has been left-shifted by one bit.

It is to be noted that, although the above implementation of the left-shifting of the quantum state utilizes the quantum logic gate "SWAP gate", during actual implementation process, the left-shift operation is not limited to one kind of quantum logic gate, and may be implemented with a combination of a plurality of single quantum logic gates and dual quantum logic gates. Therefore, any combination of quantum logic gates that can implement the transformation operations such as the left-shifting of the above quantum states should be included in the protection scope of this application, and specific limitation thereof is omitted here.

S32025: incrementing the bit number of the current bit by 1, and return to the step of determining the binary value of the current bit, until the last bit in the binary value stored in the second target quantum state is determined.

Specifically, increment the bit number of the current bit by 1, that is, increment the bit number of the binary value stored in the second target quantum state by 1, change it from the first bit to the second bit, and return to the step of determining the binary value of the current bit, that is, to return to step S2022 to step S2024 until the last bit of the binary value stored in the second target quantum state is determined.

For Example: the second target quantum state is |101⟩, and the binary value of the current bit is 1, and the quantum state evolution corresponding to the addition operation of the current third target quantum state |000000⟩ and the first target quantum state |000111⟩ is executed; upon completion of the execution, the bit number of the current bit of the second target quantum state is incremented by 1, the second bit is a binary value of 0, return to step S2022 to step S2024, wherein, the first target quantum state |000111⟩ is left-shifted by one bit to transform into a quantum state |001110⟩. Because the binary value of the current bit of the second target quantum state is 0, do not execute the addition operation that "the quantum state after completion of the quantum state evolution corresponding to the addition operation between the third target quantum state |000000⟩ and the first target quantum state |000111⟩" is added to the quantum state |001110⟩. Continue to execute step S2025, the third bit of the second target quantum state |101⟩ is a binary value 1. Return to step S2022 to step S2024, wherein, the current first target quantum state |001110⟩ is left-shifted by one bit to transform into a quantum state |011100⟩, and because the binary value of the current bit of the second target quantum state is 1, execute the addition operation that "the quantum state after completion of the quantum state evolution corresponding to the addition operation between the third target quantum state |000000⟩ and the first target quantum state |000111⟩" is added to the quantum state |011100⟩, and obtain the evolved third target quantum state that stores the addition operation result.

S3203: Outputting the finally obtained third target quantum state as a multiplication result of the multiplicand data and the multiplier data.

For Example: the multiplicand data is the first target quantum state |000111⟩, and the multiplier data is the second target quantum state |101⟩, then the finally obtained addition result stored in the third target quantum state |100011⟩ is used as the multiplication result of the multiplicand data and the multiplier data, and then the addition result |100011⟩ can be transformed into a decimal number 35 and is output as the result, alternatively, the binary operation result can be output directly.

After obtaining the operation result stored in the third target quantum state, the method further includes: using a quantum logic gate to restore the current first target quantum state.

Specifically, the quantum logic gate SWAP gate can be used for restoring the current first target quantum state to the initial state, so as to facilitate subsequent use and operation of quantum circuits.

It can be seen from the above introduction that in the multiplication operation, the multiplicand data and the multiplier data are stored in different numbers of qubits, however, the signs (positive and negative values) of the multiplicand data and the multiplier data are not considered. Therefore, in the operation of the multiplicand data and the multiplier data, the sign of the obtained operation result also needs to be considered. To obtain the positive and negative status of the operation result, the following steps are required:

Obtaining a first sub-quantum state storing the sign bit of the multiplicand data and a second sub-quantum state storing the sign bit of the multiplier data.

Specifically, according to the well-known multiplication rules, when the signs of the multiplied data and the multiplier data are the same, the results after multiplication are all positive numbers; when the signs of the multiplied data and the multiplier data are different, the results after multiplication are all negative numbers; wherein, the signs of the multiplicand data and the multiplier data need to be represented by the first sub-quantum state and the second sub-quantum state that store the sign bit, as well as their corresponding qubits.

According to the first sub-quantum state and the second sub-quantum state, evolving an initial state of the third sub-quantum state which is to store the sign bit of the multiplication result, into a final state of the third sub-quantum state which has stored the sign bit of the multiplication result.

Figure 27:
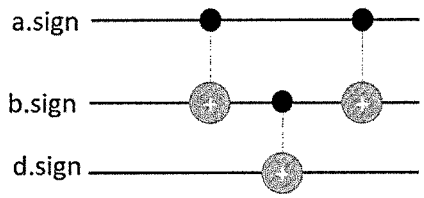
FIG. 27 is a schematic illustration of storing a sign bit operation result provided in an embodiment of the present disclosure.

For Example: FIG. 27 shows a schematic illustration of storing the operation result of the sign bits in this embodiment, in which the values "a" and "b" of two quantum registers (multiplicand and multiplier) are multiplied, and the operation result is stored in a register "d". "a.sign" is the sign bit of a, and is represented by the first sub-quantum state; "b.signt" is the sign bit of b, and is represented by the second sub-quantum state; "d.sign" is the sign bit of the computation result d, and is represented by the third sub-quantum state. The initial value of "d.sign" is the initial state of the third sub-quantum state, and can be set to |0⟩. Execute a CNOT gate on the first sign-bit-qubit corresponding to the first sub-quantum state and the second sign-bit-qubit corresponding to the second sub-quantum state; wherein the first sign-bit-qubit is used as a controlling bit of the CNOT gate (black dot in the figure, the same below), the second sign-bit-qubit is used as the controlled bit of the CNOT gate (the "+" sign in the circle shown in the figure, the same below). Execute a CNOT gate on the current second sign-bit-qubit and a third sign-bit-qubit corresponding to a third sub-quantum state which is to store the sign bit of the multiplication result, so as to evolve an initial state of the third sub-quantum state which is to store the sign bit of the multiplication result into a final state of the third sub-quantum state which has stored the sign bit of the multiplication result. Here, the second sign-bit-qubit is used as the controlling bit of the CNOT gate, the third sign-bit-qubit is used as the controlled bit of the CNOT gate, and the initial state is a |0⟩ state. Execute CNOT gate on the current first sign-bit-qubit and the current second sign-bit-qubit to restore the current second sub-quantum state, wherein, the first sign-bit-qubit is used as the controlling bit of the CNOT gate, and the second sign-bit-qubit is used as the controlled bit of the CNOT gate.

Specifically, the positive and negative signs of the multiplicand data and the multiplier data have the following four circumstances: the multiplicand data and the multiplier data are both positive numbers, both negative numbers, the former being a positive number and the latter being a negative number and vice versa. The positive and negative signs of the multiplicand data and the multiplier data can be represented by the quantum state as follows: when the first sub-quantum state is preset as a |0⟩ state, it means that the multiplicand data is a positive number; when the first sub-quantum state is preset as a |1⟩ state, it means that the multiplicand data is a negative number; similarly, when the second sub-quantum state is preset as a |0⟩ state, it means that the multiplier data is a positive number; when the second sub-quantum state is preset as a |1⟩ state, it means that the multiplier data is a negative number. Therefore, after going through the quantum circuit shown in FIG. 27, i.e., after three CNOT gate operations, the results are shown in the following table:

| a.sign | b.sign | d.sign |
|---|---|---|
| |0⟩ | |0⟩ | |0⟩ |
| |0⟩ | |1⟩ | |1⟩ |
| |1⟩ | |0⟩ | |1⟩ |
| |1⟩ | |1⟩ | |0⟩ |

As can be seen from the above table, for example, according to the first sub-quantum state |0⟩ and the second sub-quantum state |0⟩, the initial state of the third sub-quantum state which is to store the sign bit of the multiplication result is evolved into the final state (i.e., |0⟩ state) of the final state of the third sub-quantum state which has stored the sign bit of the multiplication result, this means when both the multiplicand data and the multiplier data are positive numbers, the result after operation is also a positive number. For example, according to the first sub-quantum state |1⟩ and the second sub-quantum state |0⟩, the initial state of the third sub-quantum state which is to store the sign bit of the multiplication result is evolved into the final state (i.e., |1⟩ state) of the final state of the third sub-quantum state which has stored the sign bit of the multiplication result, this means when the multiplicand data is a negative number and the multiplier data is a positive number, the result after operation is a negative number.

It is to be noted that FIG. 27 is only a schematic illustration of using the CNOT gate to store the operation result of the sign bit in this embodiment. In a specific implementation, other quantum logic gates can also be used for storing the operation result of the sign bit. No specific limitation is made here.

The following describes the specific steps of executing the quantum state evolution corresponding to the addition operation, which are used for introducing how to implement the logic circuit of the quantum state evolution corresponding to the addition operation in a quantum computer, and for describing each module in conjunction with the pre-developed software QPanda. Any classical logic circuit can also be represented by a quantum circuit. There is a one-to-one correspondence between a classical circuit and a quantum circuit. The input and output of a quantum logic gate/quantum circuit are both quantum states, and the number of input qubits is equal to that of output qubits. Quantum circuits allow quantum states to be input in a superposition way, while output states can be superimposed and output in the same way as input states. Reversible computing is the basis of quantum computing, that is, any reversible circuit has an inverse circuit thereof: that is to say, by using each original output as input, it can be mapped exactly to an original input thereof. A reversible circuit means that for every output, there is exactly one input corresponding to it, and this mapping is a one-to-one mapping.

The specific implementation of the quantum state evolution corresponding to the addition operation is described in detail below.

Specifically, said "executing quantum state evolution corresponding to the addition operation" may include:

According to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules.

Figure 28:
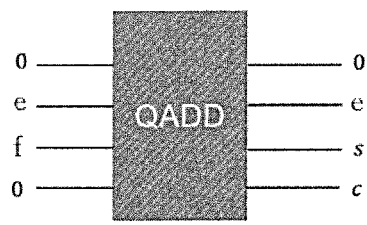
FIG. 28 is a schematic illustration of an adder provided in an embodiment of the present disclosure.

For Example: FIG. 28 is a schematic illustration of an adder provided in an embodiment of the present disclosure. The first qubit in the circuit is the second preset auxiliary qubit, which is initially in a |0⟩ state and will eventually return to |0⟩ a state. The "e" and "f" are the quantum states corresponding to the data to be added, each corresponding to a group of qubits. The "c" represents the final carry item, corresponding to the preset carry auxiliary qubit, and the "s" is the output bit that does not include a carry bit. It is generally required that the bit number of qubits corresponding to "e" equals to that corresponding to "f", and the bit number of "s" equal to those of "e" and "f".

Figure 29:
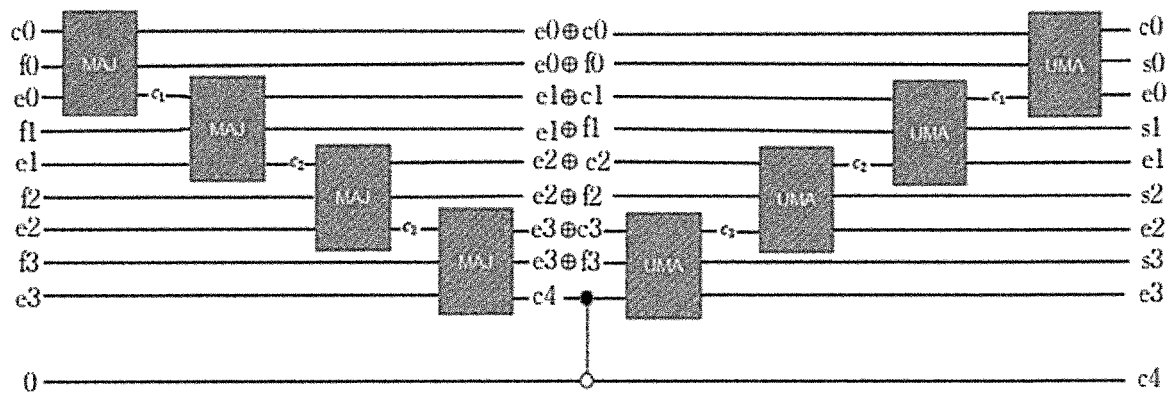
FIG. 29 is a schematic illustration of an adder quantum circuit provided in an embodiment of the present disclosure.

For Example: as shown in FIG. 29, it is a schematic illustration of the quantum circuit of the adder provided in an embodiment of the present disclosure, $e_{[i]}$ and $f_{[i]}$ are respectively the i-th bit of the quantum state corresponding to the two addends, and $c_{[i]}$ is the previous-stage carry.

$$s_{[i]} = e_{[i]} \text{ XOR } f_{[i]} \text{ XOR } c_{[i]},$$

$$c_{[i+1]} = (e_{[i]} \text{ AND } f_{[i]}) \text{XOR}(e_{[i]} \text{ AND } f_{[i]}) \text{XOR}(e_{[i]} \text{ AND } f_{[i]}),$$

Here, the first qubit is the second preset auxiliary qubit, corresponding to $c_0$ in the quantum circuit. The first MAJ module includes three input quantum states and three corresponding output quantum states, the three input quantum states being $c_0$, $e_0$, and $f_0$, wherein $e_0$ is the 0th-bit quantum state of the first quantum state to be operated, $f_0$ is the 0th quantum state of the second quantum state to be operated, $c_0$ is the quantum state of the second preset auxiliary qubit, and the initial value is 0, that is to say there is no carry. The three output quantum states are respectively $e_0 \oplus c_0$, $e_0 \oplus f_0$ and $c_1$, and $c_1$ is the carry after the addition of $e_0$ and $f_0$. Similarly, the three input quantum states of the next MAJ module are $c_1$, $e_1$, and $f_1$, and the three output quantum states are respectively $e_1 \oplus c_1$, $e_1 \oplus f_1$, and $c_2$, and so on to the last MAJ module.

For the first UMA module, it includes three input quantum states and three corresponding output quantum states, where the three output quantum states of the MAJ module correspond to the three input quantum states of the UMA module, and the three output quantum states are respectively $c_0$, $s_0$, $e_0$, where $s_0$ is the carry-free result of adding $e_0$ and $f_0$. Similarly, $s_i$ is the carry-free result of adding $e_1$ and $f_1$, and so on, the $c_4$ is the final carry item. It is to be noted that, in practical applications, where there is no need to calculate the final carry, the qubit corresponding to $c_4$ does not have to be provided in the quantum circuit.

Moreover, the number of the MAJ modules and the number of UMA modules can be determined according to the number of sub-quantum states contained in any quantum state to be operated, one sub-quantum state corresponding to one qubit, wherein the number of the MAJ modules is equal to the number of UMA modules. What is shown in the Figure is only an example, where 4 qubits are required for encoding each of "e" and "f", and the number of MAJ modules and that of UMA modules are both 4. The MAJ module and the UMA module constitute the front and rear cascading units of the adder. The MAJ module can be used for extracting the carry term of any step and pass it to the next stage to calculate the final carry term. The UMA module not only extracts the information of "c" and transmits it to the previous-stage UMA, but also calculates the "s" (result item) of each stage and recovers the information of "e".

For Example: When 4 (corresponding encoding is expressed in a 3-qubit quantum state as 100)+2 (corresponding encoding is expressed in a 3-qubit quantum state as 010)=6 (corresponding encoding is expressed in a 3-qubit quantum state as 110). At this time, the bit number of qubits encoding the operation result is the same as the bit number of qubits encoding "e" or the bit number of qubits used for encoding "f", and the number of the MAJ modules and the number of UMA modules are both 3.

For Example: When 4 (corresponding encoding is expressed in a 3-qubit quantum state as 100)+7 (corresponding encoding is expressed in a 3-qubit quantum state as 111)=11 (corresponding encoding is expressed in a 3-qubit quantum state as 011). However, it can be understood that the binary number corresponding to 11 is 1011, and the bit where the leftmost 1 is located is a carry item, which can be represented by an auxiliary qubit. At this time, the bit number of qubits encoding the operation result is greater than the bit number of qubits encoding "e" or the bit number of qubits used for encoding "f", and the number of the MAJ modules and the number of UMA modules are both 3.

For Example: when 2 (corresponding encoding is expressed in a 2-qubit quantum state as 10)+4 (corresponding encoding is expressed in a 3-qubit quantum state as 100)=6 (corresponding encoding is expressed in a 3-qubit quantum state as 110). At this time, the numerical item "3" encoding the numerical value of "6" equals to the number of quantum states of the qubit encoding "b", and the number of the MAJ modules and the number of UMA modules are both 3.

According to the addition instruction, the MAJ modules and UMA modules in the target module number are cascaded to generate a target quantum circuit corresponding to the adder.

Here, the MAJ module and the UMA module each includes three input items and three output items. According to the addition instruction, the three output items of an MAJ cascading module can be used as three inputs of a corresponding UMA cascading module, so as to cascade the MAJ cascading module with a corresponding UMA cascading module to generate a target quantum circuit corresponding to an adder, wherein the MAJ cascading module is determined by cascading of MAJ modules in the target module number, and the UMA cascading module is determined by cascading of UMA modules in the target module number.

Specifically, the three input items of the MAJ module include one carry input item and two sub-quantum state input items to be operated; the three output items of the MAJ module include one carry output item and two intermediate result output items; the three input items of the UMA module include a carry output item and two intermediate result output items of the corresponding MAJ module; and the three output items of the UMA module include a result carry output item, an accumulation sum output item and a sub-quantum state input item to be operated.

Then, according to the addition instruction, the carry output item output by the previous MAJ module and the two sub-quantum state input items to be operated can be used as three input items of the next MAJ module, so that the MAJ modules in the target module number are cascaded;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder. If the carry item is not needed, the CNOT gate and the carry auxiliary qubit does not have to be provided.

In this embodiment, as shown in FIG. 29, according to the figure, use the three output bits of the MAJ module as the three input bits of the UMA module, thereby cascading the same number of MAJ modules and UMA modules to generate a target quantum circuit corresponding to an adder. Here, the hollow circles and solid circles connected in the circuit diagram represent CNOT gate operations, the hollow circles correspond to qubits as controlling bits, and the solid circles correspond to those as controlled bits.

Here, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate. The embodiment further includes, before said step "cascading the MAJ modules in the target module number with the UMA modules in the target module number, so as to generate a target quantum circuit corresponding to the adder": obtaining operation qubits corresponding to the two CNOT quantum logic gates and one TOFFOLI quantum logic gate, the control relationship between the operation qubits and the timing relationship between the two CNOT quantum logic gates and one TOFFOLI quantum logic gate; according to the operation qubits, the control relationship and the timing relationship, use the two CNOT quantum logic gates and one TOFFOLI quantum logic gate to construct and generate the MAJ quantum circuit or the UMA quantum circuit as a corresponding MAJ module or a corresponding UMA module.

Figure 30:
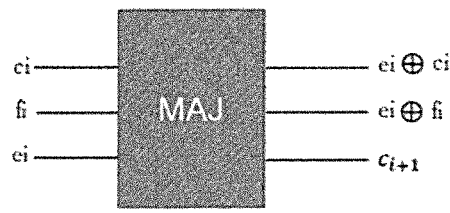
FIG. 30 is a schematic illustration of an MAJ module provided in an embodiment of the present disclosure.
Figure 31:
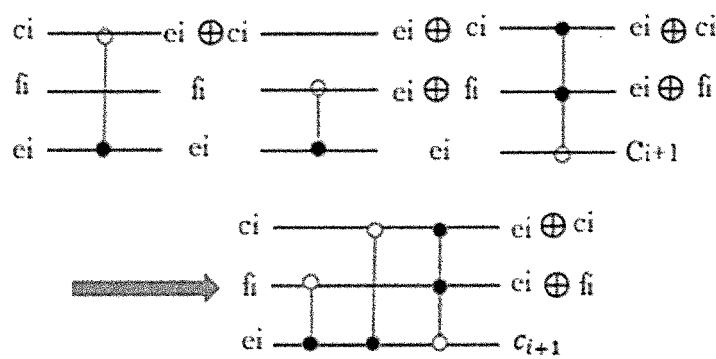
FIG. 31 is a schematic illustration of the MAJ module quantum circuit combination process provided in an embodiment of the present disclosure.

In this embodiment, the MAJ module and the UMA module constitute the front and rear cascading units of the adder. FIG. 30 is a schematic illustration of the MAJ module provided in an embodiment of the present disclosure. The MAJ module is used for extracting the carry item after each stage of addition and pass it to the next stage, so as to calculate the final carry item. Here, FIG. 31 is a schematic illustration of the MAJ module quantum circuit combination process provided in an embodiment of the present disclosure, wherein the MAJ module can be mainly composed of three logic gates, i.e., two CNOT gates and one Toffoli gate. The function of the CNOT gate (the first and second logic gates from left to right in FIG. 31) is: add the controlling bit to the target bit to form a modulo 2 addition which is an exclusive OR operation, and get $(e_i + c_i)$ %2, $(e_i + f_i)$ %2, the order of the two CNOT gates can be swapped. The function of the Toffoli gate (the third logic gate from left to right in FIG. 31) is: add both controlling bits to the target bit to get the carry item $c_{[i+1]} = (e_{[i]} \text{ AND } f_{[i]}) \text{ XOR } (e_{[i]} \text{ AND } f_{[i]}) \text{ XOR } (e_{[i]} \text{ AND } f_{[i]})$. That is, to implement $e_i \oplus c_i$ through the first CNOT gate from left to right in FIG. 31, to implement $e_i \oplus e_f$ through the second CNOT gate from left to right in FIG. 31, and to implement $c_{i+1}$ through the third TOFFOLI gate from left to right in FIG. 31, thereby forming the front-stage cascading unit of the quantum adder with two CNOT gates and one TOFFOLI gate.

Example 1: $e_i$ is 1, $f_i$ is 1, and $c_i$ is 1.
The MAJ module starts by adding $e_i$ to $c_i$, the value of $c_i$ becomes 0, then adds $e_i$ to $f_i$, the value of $f_i$ also becomes 0, and finally adds $f_i$ and $c_i$ to $e_i$, the value of $e_i$ becomes 1, that is, the carry of $c_{i+1}$ is 1.

Example 2: $e_i$ is 0, $f_i$ is 1, and $c_i$ is 1.
The MAJ module starts by adding $e_i$ to $c_i$, the value of $c_i$ becomes 1, then adds $e_i$ to $f_i$, the value of $f_i$ also becomes 1, and finally adds $f_i$ and $c_i$ to $e_i$, the value of $e_i$ becomes 1, that is, the carry of $c_{i+1}$ is 1.

Figure 32:
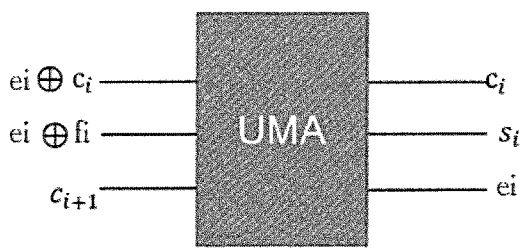
FIG. 32 is a schematic illustration of a UMA module provided in an embodiment of the present disclosure.
Figure 33:
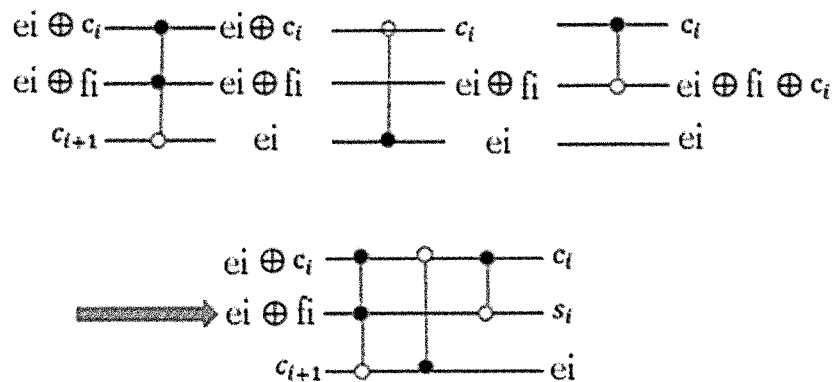
FIG. 33 is a schematic illustration of the UMA module quantum circuit combination process provided in an embodiment of the present disclosure.

FIG. 32 is a schematic illustration of the UMA module provided in an embodiment of the present disclosure. The UMA module is used in the subsequent stage of the cascaded adder. The implementation of a UMA module is similar to that of an MAJ module. FIG. 33 shows a schematic illustration of the UMA module quantum circuit combination process provided in an embodiment of the present disclosure. First, use the Toffoli gate (the first logic gate from left to right in FIG. 33) to restore $c_{i+1}$ to $e_i$, and then use $e_i$ to execute a CNOT gate (the second logic gate from left to right in FIG. 33) on (e+c) %2 as a restoration to restore $(e_i + c_i)$ %2 to $c_i$, and finally, use $c_i$ execute a CNOT gate (the third logic gate from left to right in FIG. 33) on $(e_i+f_i)$ %2, and get the final result of the current bit $s_{[t]}=e_{[t]}$ XOR f[i] XOR c[i].

Example 1: $(e_i+c_i)$ %2 is 0, $(e_i+f_i)$ %2 is 0, $c_{i+1}$ is 1.

Start by adding $(e_i+c_i)$ %2 and $(e_i+f_i)$ %2 to $c_{i+1}$, the value of $c_{i+1}$ becomes 1, and the meaning thereof becomes $e_i$, then add $e_i$ to $(e_i+c_i)$ %2, the value of $(e_i+c_i)$ %2 becomes 1, and the meaning thereof becomes $c_i$, then add $c_i$ to $(e_i+f_i)$ %2, the value of $(e_i+f_i)$ %2 becomes 1, and the meaning thereof becomes $s_i$.

Example 2: $(e_i+c_i)$ %2 is 1, $(e_i+f_i)$ %2 is 1, $c_{i+1}$ is 1.

Start by adding $(e_i+c_i)$ %2 and $(e_i+f_i)$ %2 to $c_{i+1}$, the value of $c_{i+1}$ becomes 0, and the meaning thereof becomes $e_i$, then add $e_i$ to $(e_i+c_i)$ %2, the value of $(e_i+c_i)$ %2 becomes 1, and the meaning thereof becomes $c_i$, then add $c_i$ to $(e_i+f_i)$ %2, the value of $(e_i+f_i)$ %2 becomes 0, and the meaning thereof becomes $s_i$.

As shown in FIG. 29, the last CNOT gate from top to bottom, that is, the CNOT gate between the MAJ module and the UMA module in the entire adder, is used for storing the result of $c_{i+1}$.

Executing, with the target quantum circuit, an addition operation of each sub-quantum state of the two quantum states to be operated, so as to generate and output a target quantum state result.

In this embodiment, by inputting the sub-quantum state s of the two target quantum states, such as |111> and |111>, into the adder (that is, the target quantum circuit), a corresponding binary representation of the operation result of the target quantum state (including the carry term and the result term obtained by directly adding each sub-quantum state) is obtained. Then the binary expression of the result |1110> of the target quantum state is directly output, or further transform it into a decimal result output, completing the addition operation of the two target data.

Compared with the prior art, a method for quantum multiplication operation provided in the present disclosure is used for implementing the basic multiplication operation in the quantum circuit, including obtaining multiplicand data and multiplier data to be operated, and transforming the multiplicand data to the first target quantum state, transforming the multiplier data to the second target quantum state; for each bit in the binary value stored in the second target quantum state, according to the binary value of the current bit, a third target quantum state of the first preset auxiliary qubit as well as the first target quantum state with the stored binary value left-shifted are controlled to execute quantum state evolution corresponding to the addition operation, so as to obtain an evoluted third target quantum state of the stored addition operation result, and output a multiplication result of multiplicating the multiplicand data with the multiplier data. The disclosure fills the gap in the related art with a technology that enables implementation of basic arithmetic operation.

Figure 26:
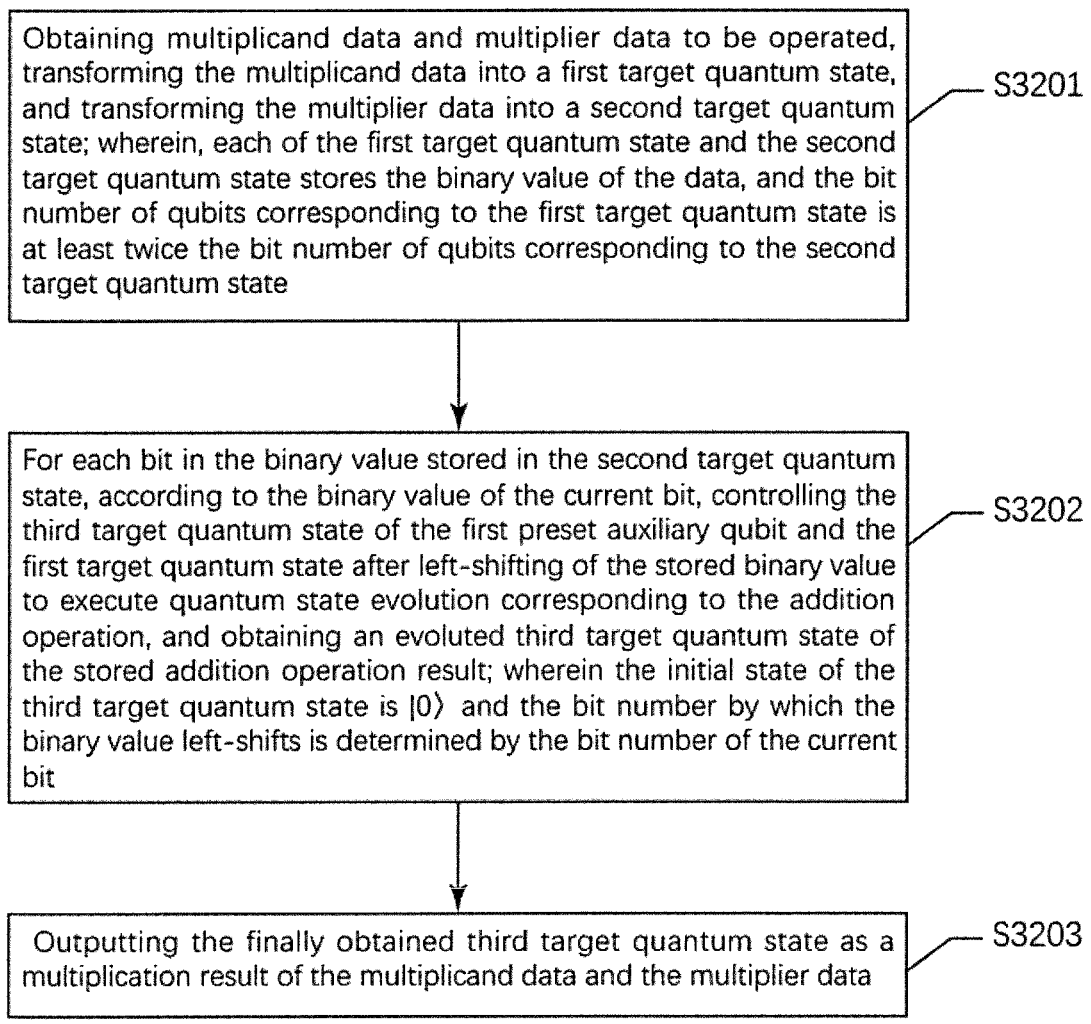
FIG. 26 is a schematic flowchart of a method for quantum multiplication operation provided in an embodiment of the present disclosure.
Figure 34:
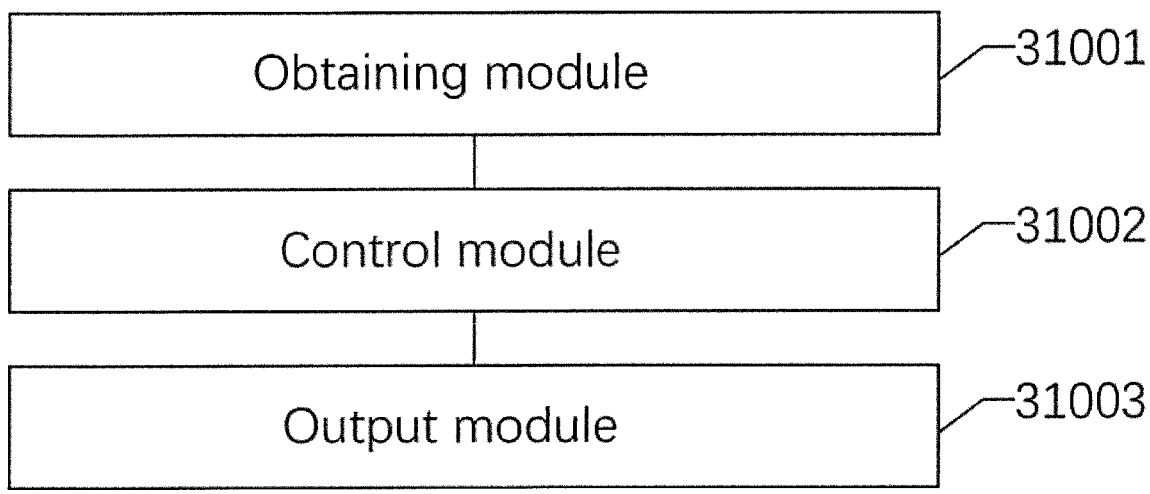
FIG. 34 is a schematic structural illustration of a device for quantum multiplication operation provided in an embodiment of the present disclosure.

Referring to FIG. 34, FIG. 34 is a schematic structural illustration of a device for quantum multiplication operation provided in an embodiment of the present disclosure, corresponding to the process shown in FIG. 26, the device may include:

An obtaining module 31001, configured for: obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state;

Control module 31002, configured for: for each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evoluted third target quantum state of the stored addition operation result; wherein the initial state of the third target quantum state is |0⟩, and the bit number by which the binary value left-shifts is determined by the bit number of the current bit; and Output module 31003, configured for outputting the finally obtained third target quantum state as a multiplication result of the multiplicand data and the multiplier data.

Optionally, the device further includes:

A storage module, configured for obtaining a first sub-quantum state storing the sign bit of the multiplicand data and a second sub-quantum state storing the sign bit of the multiplier data.

An evolution module, configured for: according to the first sub-quantum state and the second sub-quantum state, evolving an initial state of the third sub-quantum state which is to store the sign bit of the multiplication result, into a final state of the third sub-quantum state which has stored the sign bit of the multiplication result.

Optionally, the evolution module includes:

A first execution unit, configured for: executing a CNOT gate on a first sign-bit-qubit corresponding to the first sub-quantum state and a second sign-bit-qubit corresponding to the second sub-quantum state; wherein the first sign-bit-qubit is used as the controlling bit of the CNOT gate, and the second sign-bit-qubit is used as the controlled bit of the CNOT gate;

A second execution unit, configured for: executing a CNOT gate on the current second sign-bit-qubit and a third sign-bit-qubit corresponding to a third sub-quantum state which is to store the sign-bit of the multiplication result, so as to evolve an initial state of the third sub-quantum state which is to store the sign bit of the multiplication result into a final state of the third sub-quantum state which has stored the sign bit of the multiplication result; wherein the second sign-bit qubit is used as the controlling bit of the CNOT gate, the third sign-bit-qubit is used as the controlled bit of the CNOT gate, and the initial state is a |0⟩ state;

A third execution unit, configured for: executing CNOT gate on the current first sign-bit-qubit and the current second sign-bit-qubit to restore the current second sub-quantum state, wherein, the first sign-bit-qubit is used as the controlling bit of the CNOT gate, and the second sign-bit-qubit is used as the controlled bit of the CNOT gate.

Optionally, after the output module, the device further includes: a restore module, configured for restoring the current first target quantum state by using quantum logic gates.

Optionally, the control module includes:

An obtaining unit, configured for: obtaining a first preset auxiliary qubit in the same bit number as the qubit corresponding to the first target quantum state, and initializing a third target quantum state of the first preset auxiliary qubit as |0⟩.

A determining unit, configured for: determining the binary value of the current bit, starting from the first bit in the binary value stored in the second target quantum state.

A fourth execution unit, configured for: in the case of determining that the binary value of the current bit is 1, executing quantum state evolution corresponding to the addition operation on the current third target quantum state of the first preset auxiliary qubit and the current first target quantum state; otherwise, no operation is executed.

A swapping unit, configured for: swapping between the sub-quantum state s contained in the first target quantum state using quantum logic gates, so that the binary value stored in the first target quantum state is left-shifted by one bit;

An incrementing unit, configured for: incrementing the bit number of the current bit by 1, and return to the step of determining the binary value of the current bit, until the last bit in the binary value stored in the second target quantum state is determined.

Optionally, the control module includes:

A determination unit, configured for: according to the bit number of qubits corresponding to the two quantum states to be operated, determining the target module number of the front-cascading modules (MAJ modules) to be cascaded and that of the rear-cascading modules (UMA modules) to be cascaded, wherein the number of the MAJ modules equals to the number of the UMA modules;

A first cascading unit, configured for: according to an addition instruction, cascading the MAJ modules and the UMA modules both in the target module number, to generate a target quantum circuit corresponding to the adder;

A first generating unit, configured for: executing, with the target quantum circuit, an addition operation of each sub-quantum state of the two quantum states to be operated, so as to generate and output a target quantum state result.

Optionally, before the first cascading unit, the device further includes:

An obtaining unit, configured for: obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate;

A construction unit, configured for: according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Optionally, the first cascading unit specifically includes:

A second generating unit, configured for: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

Optionally, the second generating unit specifically includes:

A second cascading unit, configured for: according to the addition instruction, using the carry output item output by the previous MAJ module and the two sub-quantum state input items to be operated as the three input items of the next MAJ module, so as to cascade the MAJ modules in the target module number;

A third cascading unit, configured for: using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

A third generating unit, configured for: adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

Compared with the prior art, a method for quantum multiplication operation provided in the present disclosure is used for implementing the basic multiplication operation in the quantum circuit, including obtaining multiplicand data and multiplier data to be operated, and transforming the multiplicand data to the first target quantum state, transforming the multiplier data to the second target quantum state; for each bit in the binary value stored in the second target quantum state, according to the binary value of the current bit, a third target quantum state of the first preset auxiliary qubit as well as the first target quantum state with the stored binary value left-shifted are controlled to execute quantum state evolution corresponding to the addition operation, so as to obtain an evoluted third target quantum state of the stored addition operation result, and output a multiplication result of mutiplicating the multiplicand data with the multiplier data. The disclosure fills the gap in the related art with a technology that enables implementation of basic arithmetic operation.

An embodiment of the present disclosure also provides a storage medium, wherein a computer program is stored in the storage medium, wherein the computer program is configured to execute the steps in any one of the above method embodiments when running.

Specifically, in this embodiment, the above-mentioned storage medium may be configured to store a computer program for executing the following steps:

S3201: Obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state.

S3202: For each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evolved third target quantum state of the stored addition operation result; wherein the initial state of the third target quantum state is |0⟩, and the bit number by which the binary value left-shifts is determined by the bit number of the current bit.

S3203: Outputting the finally obtained third target quantum state as a multiplication result of the multiplicand data and the multiplier data.

Specifically, in this embodiment, the above-mentioned storage medium may include but not limited to: U disk, read-only memory (Read-Only Memory, ROM for short), random access memory (Random Access Memory, RAM for short), various mobile media that can store computer programs, such as hard disks, magnetic disks, or optical disks.

An embodiment of the present disclosure also provides an electronic device including: a memory having a computer program stored therein, and a processor configured to execute the computer program to perform the method steps in any one of the method embodiments described above.

Specifically, the electronic device may further include a transmission device and an I/O device, wherein the transmission device is connected to the processor, and the I/O device is connected to the processor.

Specifically, in this embodiment, the above-mentioned processor may be configured to execute the following steps through a computer program:

S3201: Obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state.

S3202: For each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evolved third target quantum state of the stored addition operation result; wherein the initial state of the third target quantum state is |0⟩, and the bit number by which the binary value left-shifts is determined by the bit number of the current bit.

S3203: Outputting the finally obtained third target quantum state as a multiplication result of the multiplicand data and the multiplier data.

The above-described embodiments can be summarized as follows.

C31. A method for quantum multiplication operation, characterized by including: obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state; for each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evolved third target quantum state of the stored addition operation result; wherein the initial state of the third target quantum state is |0⟩ , and the bit number by which the binary value left-shifts is determined by the bit number of the current bit; and outputting the finally obtained third target quantum state as a multiplication result of the multiplicand data and the multiplier data.

C32. A method of C31, characterized by further including: obtaining a first sub-quantum state storing the sign bit of the multiplicand data and a second sub-quantum state storing the sign bit of the multiplier data; and according to the first sub-quantum state and the second sub-quantum state, evolving an initial state of the third sub-quantum state which is to store the sign bit of the multiplication result, into a final state of the third sub-quantum state which has stored the sign bit of the multiplication result.

C33. A method of C31 or C32, characterized in that, said "according to the first sub-quantum state and the second sub-quantum state, evolving an initial state of the third sub-quantum state which is to store the sign bit of the multiplication result, into a final state of the third sub-quantum state which has stored the sign bit of the multiplication result" includes: executing a CNOT gate on a first sign-bit-qubit corresponding to the first sub-quantum state and a second sign-bit-qubit corresponding to the second sub-quantum state; wherein the first sign-bit-qubit is used as the controlling bit of the CNOT gate, and the second sign-bit-qubit is used as the controlled bit of the CNOT gate; executing a CNOT gate on the current second sign-bit-qubit and a third sign-bit-qubit corresponding to a third sub-quantum state which is to store the sign bit of the multiplication result, so as to evolve an initial state of the third sub-quantum state which is to store the sign bit of the multiplication result into a final state of the third sub-quantum state which has stored the sign bit of the multiplication result; wherein the second sign-bit qubit is used as the controlling bit of the CNOT gate, the third sign-bit-qubit is used as the controlled bit of the CNOT gate, and the initial state is a |0⟩ state; executing CNOT gate on the current first sign-bit-qubit and the current second sign-bit-qubit to restore the current second sub-quantum state, wherein, the first sign-bit-qubit is used as the controlling bit of the CNOT gate, and the second sign-bit-qubit is used as the controlled bit of the CNOT gate.

C34. A method according to any one of C31-C33, characterized in that, after the operation result stored in the third target quantum state is finally obtained, restore the current first target quantum state using quantum logic gates.

C35. A method according to any one of C31-C34, characterized in that, said "for each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation" includes: obtaining a first preset auxiliary qubit in the same bit number as the qubit corresponding to the first target quantum state, and initializing a third target quantum state of the first preset auxiliary qubit as |0⟩; determining the binary value of the current bit, starting from the first bit in the binary value stored in the second target quantum state; in the case of determining that the binary value of the current bit is 1, executing quantum state evolution corresponding to the addition operation on the current third target quantum state of the first preset auxiliary qubit and the current first target quantum state; otherwise, no operation is executed; swapping between the sub-quantum state s contained in the first target quantum state using quantum logic gates, so that the binary value stored in the first target quantum state is left-shifted by one bit; incrementing the bit number of the current bit by 1, and return to the step of determining the binary value of the current bit, until the last bit in the binary value stored in the second target quantum state is determined.

C36. A method according to any one of C31-C35, characterized in that said "executing quantum state evolution corresponding to the addition operation" includes: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules; according to an addition instruction, cascading the MAJ modules and the UMA modules both in the target module number, to generate a target quantum circuit corresponding to the adder; executing, with the target quantum circuit, an addition operation of each sub-quantum state of the two quantum states to be operated, so as to generate and output a target quantum state result.

C37. A method according to any one of C31-C36, characterized in that, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the method further includes, before the step "according to an addition instruction, cascading the MAJ modules and the UMA modules both in the target module number, to generate a target quantum circuit corresponding to the adder": obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

C38. A method according to any one of C31-C37, characterized in that, the MAJ module and the UMA module each includes three input items and three output items, and said step "according to an addition instruction, cascading the MAJ modules and the UMA modules both in the target module number, to generate a target quantum circuit corresponding to the adder" specifically includes: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

C39. The method according to any one of C31-C38, wherein the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, said step "according to an addition instruction, using three output items of an MAJ cascading module as three input items of a corresponding UMA cascading module, so as to cascade the MAJ cascading module with the corresponding UMA cascading module to generate a target quantum circuit corresponding to the adder" specifically includes: according to the addition instruction, using the carry output item output by the previous MAJ module and the two sub-quantum state input items to be operated as the three input items of the next MAJ module, so as to cascade the MAJ modules in the target module number; using two intermediate result output items of an MAJ module as two input items of a corresponding UMA module, obtaining a previous UMA module preceding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module; and adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

C310. A device for quantum multiplication operation, characterized in that the device includes: an obtaining module, configured for obtaining multiplicand data and multiplier data to be operated, transforming the multiplicand data into a first target quantum state, and transforming the multiplier data into a second target quantum state; wherein, each of the first target quantum state and the second target quantum state stores the binary value of the data, and the bit number of qubits corresponding to the first target quantum state is at least twice the bit number of qubits corresponding to the second target quantum state; a control module, configured for: for each bit in the binary value stored in the second target quantum state, according to the binary value of the current bit, controlling the third target quantum state of the first preset auxiliary qubit and the first target quantum state after left-shifting of the stored binary value to execute quantum state evolution corresponding to the addition operation, and obtaining an evolved third target quantum state of the stored addition operation result; wherein the initial state of the third target quantum state is 10), and the bit number by which the binary value left-shifts is determined by the bit number of the current bit; and an output module, configured for outputting the finally obtained third target quantum state as a multiplication result of the multiplicand data and the multiplier data.

C311. An electronic device including a memory having a computer program stored therein, and a processor, configured to execute the computer program to perform the method of any one of C31-C39.

C312. A storage medium, characterized in that a computer program is stored in the storage medium, wherein the computer program is configured to execute any one of the methods in C31-C39 when running.

Compared with the prior art, a method for quantum multiplication operation provided in the present disclosure is used for implementing the basic multiplication operation in the quantum circuit, including obtaining multiplicand data and multiplier data to be operated, and transforming the multiplicand data to the first target quantum state, transforming the multiplier data to the second target quantum state; for each bit in the binary value stored in the second target quantum state, according to the binary value of the current bit, a third target quantum state of the first preset auxiliary qubit as well as the first target quantum state with the stored binary value left-shifted are controlled to execute quantum state evolution corresponding to the addition operation, so as to obtain an evolved third target quantum state of the stored addition operation result, and output a multiplication result of multiplicating the multiplicand data with the multiplier data. The disclosure fills the gap in the related art with a technology that enables implementation of basic arithmetic operation.

Figure 35:
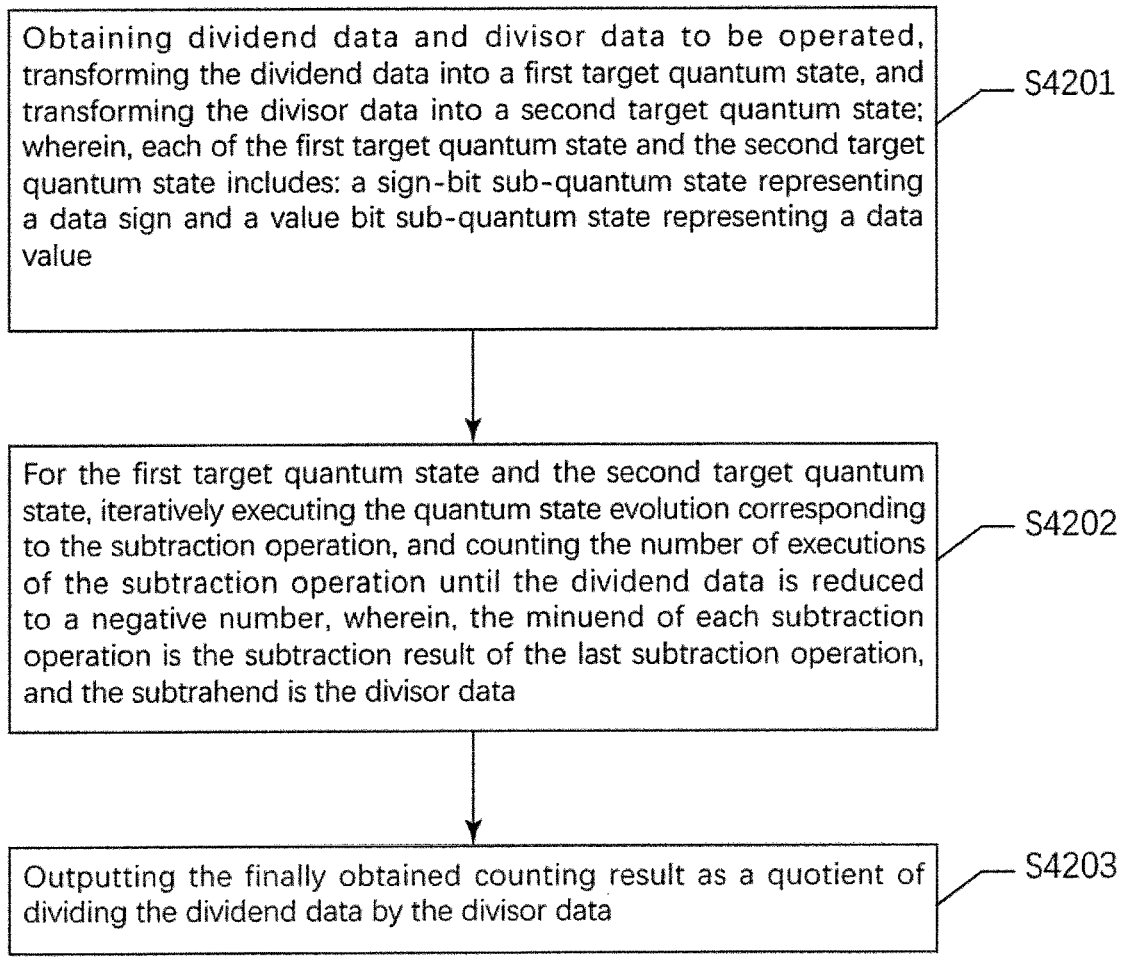
FIG. 35 is a schematic flowchart of a method for quantum division operation provided in an embodiment of the present disclosure.

Referring to FIG. 35, FIG. 35 is a schematic flowchart of a method for quantum division operation provided in an embodiment of the present disclosure, which may include the following steps:

S4201. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing a data sign and a value bit sub-quantum state representing a data value;

Specifically, the existing amplitude encoding method can be used for transforming the decimal data to be operated into a binary quantum state representation. For example, the dividend data is 7, the signed binary expression thereof is 0111, the highest bit is 0 for positive numbers, and 1 for negative numbers; the divisor data is 4, and the signed binary expression thereof is 011. It is to be noted that, in this embodiment, the highest bits of the first target quantum state and the second target quantum state are both 0, that is, both the dividend and the divisor participating in the operation are positive numbers.

Obtain at least 4 qubits "a.sign", "a2", "a1", and "a0". Encode 7 to the first target quantum state |0111⟩ of "a.sign, a2, a1, a0", and set the amplitude of the quantum state to 1. Here, |0111⟩ =|0⟩|1⟩|1⟩|1⟩, where |0⟩, |1⟩, |1⟩, |1⟩ are called sub-quantum states of |0111⟩, one sub-quantum state corresponding to one qubit, and from right to left means from high to low: the highest bit corresponds to a.sign, the third bit corresponds to a2, the second bit corresponds to a1, the lowest bit corresponds to a0, the highest bit |0⟩ represents the sign-bit sub-quantum state, and the rest represent the value bit sub-quantum state s. In order to unify the operation dimension, 4 more qubits b.sign, b2, b1, b0 are additionally obtained, and 4 is encoded into the second target quantum state |0100⟩ of b.sign, b2, b1, b0, the amplitude of which is also 1.

S4202. For the first target quantum state and the second target quantum state, iteratively executing the quantum state evolution corresponding to the subtraction operation, and counting the number of executions of the subtraction operation until the dividend data is reduced to a negative number, wherein, the minuend of each subtraction operation is the subtraction result of the last subtraction operation, and the subtrahend is the divisor data;

Specifically, the number of executions of the subtraction operation refers to the number of quantum state evolutions corresponding to the subtraction operations executed on the first target quantum state and the second target quantum state, that is, the number of iterations.

In a specific implementation, the quantum state evolution corresponding to the subtraction operation may be executed on the current first target quantum state and the second target quantum state, so as to obtain the first target quantum state including the subtraction operation result;

For the third target quantum state of the current first preset auxiliary qubit and the fourth target quantum state of the current second preset auxiliary qubit, execute the quantum state evolution corresponding to the subtraction operation, so as to increment the value included in the current third target quantum state by 1; wherein, the initial value included in the third target quantum state and the value included in the fourth target quantum state are both −1;

Measuring the sign-bit sub-quantum state of the first target quantum state currently including the subtraction operation result, and determining whether the value of the sign bit of the first target quantum state currently including the subtraction operation result is 0;

In the case that the value of the sign bit of the first target quantum state currently including the subtraction operation result is 0, return to the step of executing the quantum state evolution corresponding to the subtraction operation for the current first target quantum state and the current second target quantum state, until it is determined that the value of the sign bit of the first target quantum state currently including the subtraction operation result is 1.

For Example: the current first target quantum state and the second target quantum state are respectively |0111⟩ and |0100⟩. Executing quantum state evolution corresponding to subtraction operation on the |0111⟩ and the |0100⟩, to subtract the value 0100 included in |0100⟩ from the value 0111 included in |0111⟩, to obtain the first target quantum state |0011⟩ including the subtraction result 0011, while the second target quantum state |0100⟩ remains unchanged;

Obtain the 4 bits "r.sign, r2, r1, r0" of the first preset auxiliary qubit, the current third target quantum state of "r.sign, r2, r1, r0" is the initial state, which can be set as |1001⟩. That is, the initial value included therein is −1. Also, obtain 4 bits "d.sign, d2, d1, d0" of the second preset auxiliary qubit, and the current fourth target quantum state of "d.sign, d2, d1, d0" is also |1001⟩;

Here, the quantum state of a qubit is usually initialized as |0⟩, and by applying a quantum logic gate operation such as the X gate to the corresponding qubit to invert the |0⟩ state, a |1⟩ state may be obtained;

Then, the quantum state evolution corresponding to the subtraction operation is executed on the current third target quantum state |1001⟩ and the current fourth target quantum state |1001⟩, so as to subtract the value 1001 included in |1001⟩ from the value 1001 included in |1001⟩ to obtain the third target quantum state |0000⟩ including the subtraction result 0, while the fourth target quantum state |1001⟩ remains unchanged, thereby realizing incrementing by 1 for the value −1 of the original third target quantum state |1001⟩;

By applying a measurement operation to the qubit "a.sign" corresponding to the sign-bit sub-quantum state of the first target quantum state, it is measured the sign-bit sub-quantum state of the current first target quantum state |00011⟩ that includes the subtraction operation result to be |0⟩, that is, the value of the sign-bit is 0. Return to the step of executing the quantum state evolution corresponding to the subtraction operation for the current first target quantum state and the current second target quantum state:

At this time, for the current first target quantum state is |0011⟩ and the current second target quantum state |0100⟩, continue to execute the quantum state evolution corresponding to the subtraction operation, to obtain the first target quantum state |1001⟩ and the second target quantum state |0100⟩;

For the current third target quantum state |0000⟩, and the current fourth target quantum state |1001⟩, continue to execute the quantum state evolution corresponding to the subtraction operation, and get: the third target quantum state |0001⟩, and the fourth target quantum state |1001⟩, thereby the value 0 of the original third target quantum state |0000⟩ continues to increment by 1;

It is measured that the sign-bit sub-quantum state of the current first target quantum state |1001⟩ is 1⟩, that is, the value of the sign bit is 1, indicating that the dividend 7 is reduced to a negative number after two subtractions, and the iteration ends. It can be seen that the final number of iterations is 1, and the third target quantum state plays the role of counting.

S4203. Outputting the finally obtained counting result as a quotient of dividing the dividend data by the divisor data.

Specifically, the finally obtained third target quantum state may be output, wherein the value contained in the third target quantum state is a quotient of dividing the dividend data by the divisor data.

Continuing to take the above as an example, the final third target quantum state obtained after the iteration is |0001⟩, the value contained therein is 0001, as the quotient of dividing the dividend 7 by the divisor 4, the third target quantum state |0001⟩ can be directly output, or the third target quantum state can be further transformed to the decimal value 1 for outputting.

In practical applications, the remainder of the division operation can also be calculated according to user requirements. Specifically, the sign-bit sub-quantum state of the second target quantum state can be inverted, and the quantum state evolution corresponding to the subtraction operation can be executed on the current first target quantum state and the second target quantum state after the sign bit is inverted, to obtain the remainder of dividing the dividend data by the divisor data.

Continuing to take the above as an example, the finally obtained first target quantum state is |1001⟩, the second target quantum state is |0100⟩, the third target quantum state is |0001⟩, and the fourth target quantum state is |1001⟩. At this time, the sign-bit sub-quantum state of the second target quantum state |0⟩ is inverted, and the inverted second target quantum state is |1100⟩. For the current first target quantum state |1001⟩ and the inverted second target quantum state |1100⟩, the quantum state evolution corresponding to the subtraction operation is executed, and the evolved first target quantum state is |0011⟩, the evolved second target quantum state is |1100⟩, where |0011⟩ contains the binary value 0011 (decimal value 3) is the remainder of dividing the dividend 7 by the divisor 4.

Figure 36:
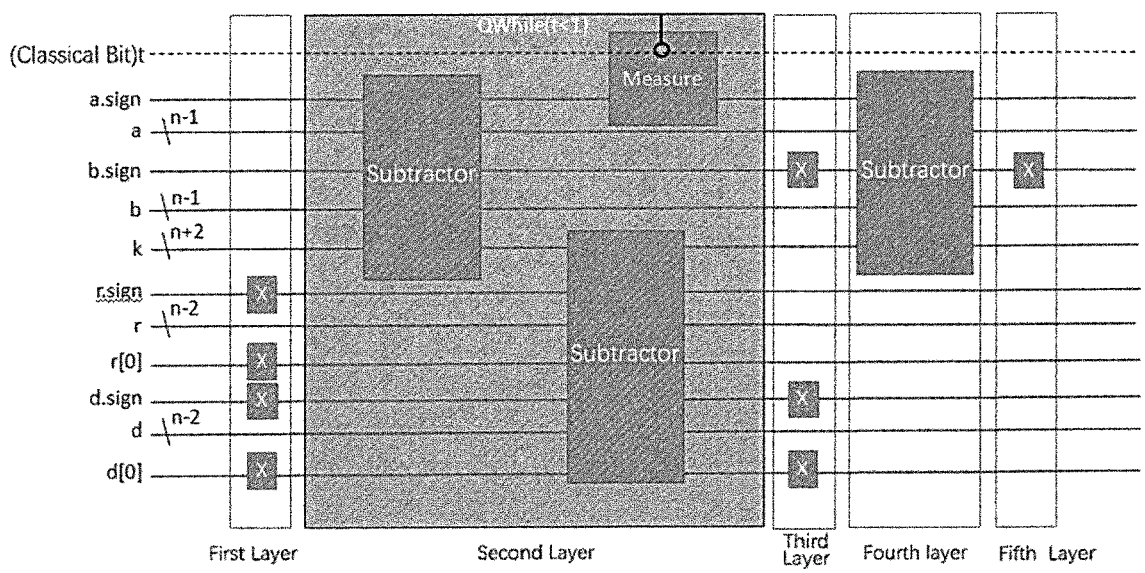
FIG. 36 is a schematic illustration of a quantum circuit of a method for quantum division operation provided in an embodiment of the present disclosure.

For Example: FIG. 36 is a schematic illustration of a quantum circuit for executing a quantum division operation. As shown in FIG. 36, "t" is the classical bit for storing the measurement result, "a.sign" and "a" are qubits for encoding the sign and value of the dividend data;

"b.sign" and "b" are qubits for encoding the sign and value of the divisor data;

"r.sign", "r", and "r[0]" form the first preset auxiliary qubits, where "r.sign" is the qubit for encoding the sign of the quotient, "r" and "r[0]" are the qubits for encoding the value of the quotient, "r[0]" is the lowest bit;

"d.sign", "d", and "d[0]" form the second preset auxiliary qubits, where "d.sign" is the qubit for encoding the sign of the quotient, "d" and "d[0]" are the qubits for encoding the value of the quotient, "d[0]" is the lowest bit;

"k" is the auxiliary qubit required by the subtractor module, a total of n+2 bits; the subtractor module is a functional module that executes the quantum state evolution corresponding to the subtraction operation; "Measure" is a measurement operation; and "Qwhile" represents the quantum iterative operation in the second layer, that is, when the classical bit t storing the storage measurement result is less than 1, the aforementioned iterative operation is executed until t reaches 1 and the iteration ends. "X" represents the quantum logic gate X, and the execution timing of the quantum circuit is from the first layer to the fifth layer.

In practical applications, where either of the dividend or divisor is a negative number, the preset sign-bit-qubit may further be obtained, to execute a preset quantum logic gate operation on the qubit corresponding to the sign-bit sub-quantum state of the first target quantum state, the qubit corresponding to the sign-bit sub-quantum state of the second target quantum state, the first preset auxiliary qubit and the preset sign-bit-qubit, so as to finally obtain the sign value represented by the sign-bit sub-quantum state in the third target quantum state.

Figure 37:
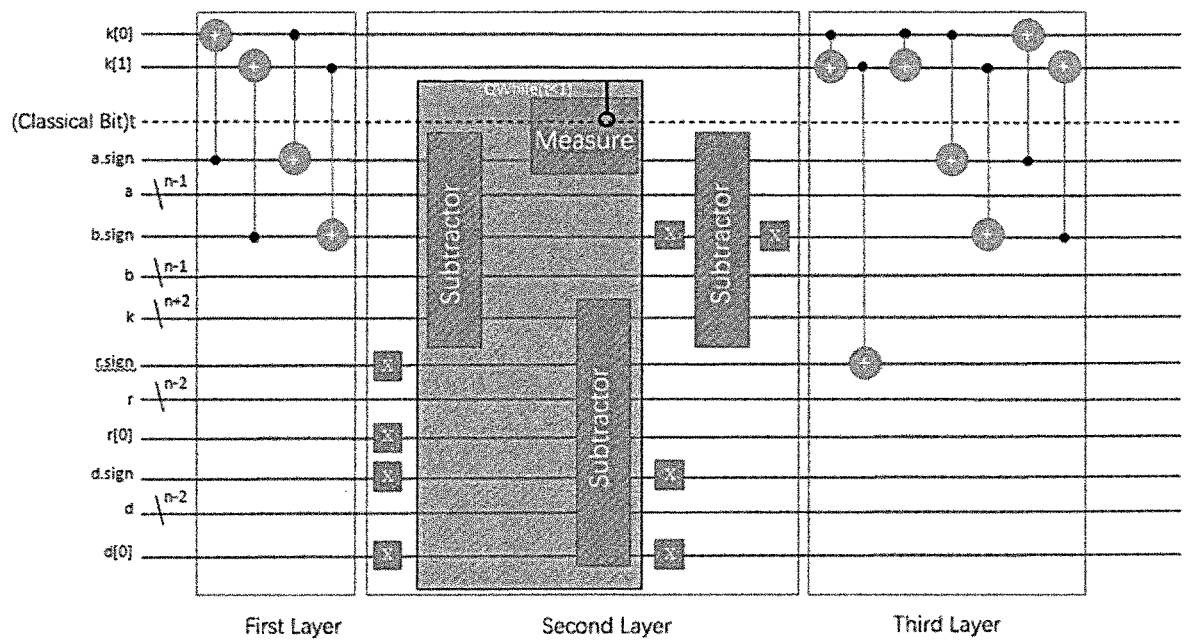
FIG. 37 is a schematic illustration of a quantum circuit of a method for quantum division operation provided by another embodiment of the present disclosure.

For Example: FIG. 37 is a schematic illustration of a quantum circuit for a quantum division operation, which supports sign bit operations. On the basis of the quantum circuit shown in FIG. 36, sign-bit-qubits $k_{[0]}$ and $k_{[1]}$ are added. Here, the circle icons connected with a vertical line represent a quantum logic gate CNOT gate, the qubit corresponding to the time line where the big circle is located is the controlled bit, and the qubit corresponding to the time line where the solid point is located is the controlling bit.

By applying a series of CNOT gates as shown in FIG. 37 to $k_{[0]}$, $k_{[1]}$, a.sign, b.sign, r.sign, a sign-bit sub-quantum state including the sign value of the quotient can finally be obtained on r.sign.

The specific implementation of the quantum state evolution corresponding to the subtraction operation is described in detail below.

Specifically, the quantum state evolution corresponding to the subtraction operation can be executed through the subtractor, which can include:

S4301. For the two quantum states to be operated, i.e., the minuend quantum state including the minuend data and the subtrahend quantum state including the subtrahend data respectively, obtaining the quantum state of the third preset auxiliary qubit; according to the sign-bit sub-quantum state in the minuend quantum state and the quantum state of the third preset auxiliary qubit, control the minuend quantum state to execute quantum state evolution corresponding to the complement operation so as to obtain the first complement quantum state, wherein the first complement quantum state is a quantum state including the complement of the minuend data;

As can be seen from the foregoing embodiments, the two quantum states to be operated have the following groups: one consisting of the first target quantum state and the second target quantum state; one consisting of the third target quantum state and the fourth target quantum state; and one consisting of the first target quantum state and the second target quantum state after the sign-bit-inversion. Here, the former can be called the minuend quantum state, and the data contained therein is called the minuend in the subtraction operation, and the latter can be called the subtrahend quantum state, and the data contained therein is called the subtrahend.

This embodiment is mainly used for implementing the function of the subtractor. The biggest difference between the subtractor and the adder in the following text is that, the subtractor may produce a negative number. Therefore, a binary handling way is used in which a sign bit is added to both the subtrahend and the minuend so as to represent the positive and negative sign of the value, and use the complement to execute the operation. The complement of positive numbers remains unchanged, while negative numbers are bitwise inverted and increment by 1 except for the sign bit. In a corresponding instance of the quantum circuit, the sign bit is used for controlling whether to execute the complement operation, the X gate is used for inversion, and the increment by 1 can be realized through the adder. In the case of complement, after the operation is completed, and the target value is obtained after execution of a further complement operation on the result. The minuend data and the subtrahend data to be operated are obtained, and the minuend data and the subtrahend data are transformed respectively into a first target quantum state and a second target quantum state. Here, each of the first target quantum state and the second target quantum state includes: a sign-bit sub-quantum state representing the data sign and a value bit sub-quantum state representing the data value.

Specifically, according to the sign-bit sub-quantum state in the minuend quantum state and the quantum state of the third preset auxiliary qubit, by controlling the minuend quantum state to execute quantum state evolution corresponding to the complement operation, a CNOT gate operation may be executed on the first sign-bit-qubit corresponding to the sign-bit sub-quantum state in the minuend quantum state, and on the third preset auxiliary qubit, wherein the first sign-bit-qubit is a controlling bit, and the third preset auxiliary qubit is a controlled bit. Moreover, it is reasonable and feasible to substitute the CNOT gate with other existing quantum logic gates or combinations of logic gates that are equivalent.

According to the quantum state of the third preset auxiliary qubit after execution of the CNOT gate operation, control whether the current minuend quantum state executes the quantum state evolution corresponding to the complement operation;

If yes, invert the non-sign-bit sub-quantum state of the current minuend quantum state, and for the inverted minuend quantum state and the quantum state |1⟩ of the fourth preset auxiliary qubit, execute quantum state evolution corresponding to the addition operation, to obtain the evolved first complement quantum state, otherwise, the minuend quantum state is used as the first complement quantum state. Here, the quantum state evolution corresponding to the complement operation is controlled to be executed only when the quantum state of the third preset auxiliary qubit after execution of the CNOT gate operation can be |1⟩, otherwise it will not be executed.

Execute a CNOT gate operation on the current first sign-bit-qubit and the third preset auxiliary qubit to restore the quantum state of the current third preset auxiliary qubit; wherein, the first sign-bit-qubit is a controlling bit, and the third preset auxiliary qubit is a controlled bit.

For Example: the minuend quantum state is assumed to be |0011⟩. The sign-bit sub-quantum state of |0011⟩ is the highest bit sub-quantum state, that is, the |0⟩ state, the value of this bit is 0, the corresponding first sign-bit-qubit is set to g.sign, and the third preset auxiliary qubit is the preset qubit $q_1$, the initial |0⟩ state.

Execute the CNOT gate operation on g.sign and $q_1$, g.sign is used as the controlling bit, $q_1$ is used as the controlled bit, and the quantum state of the g.sign bit is a |0⟩ state. After the CNOT gate operation, the quantum state |0⟩ of the controlled bit $q_1$ remains unchanged.

Since the quantum state of $q_1$ after execution of the CNOT gate operation is a |0⟩ state, the quantum state evolution corresponding to the complement operation is not executed on the minuend quantum state. The principle is that when the minuend is a positive number, there is no need to complement it in the subtraction operation, or in other words, its complement is itself, i.e., the |0011⟩ can be directly used as the first complement quantum state.

Finally, the CNOT gate can be executed again on the current g.sign and $q_1$. The quantum state of the g.sign bit is a |0⟩ state. After the CNOT gate operation, the quantum state |0⟩ of the controlled bit $q_1$ remains unchanged, and $q_1$ is restored to the state |0⟩, thereby releasing information stored in the third auxiliary qubit. It can be seen that the value 0011 contained in the first complement quantum state is the complement of the minuend 0011.

Figure 38:
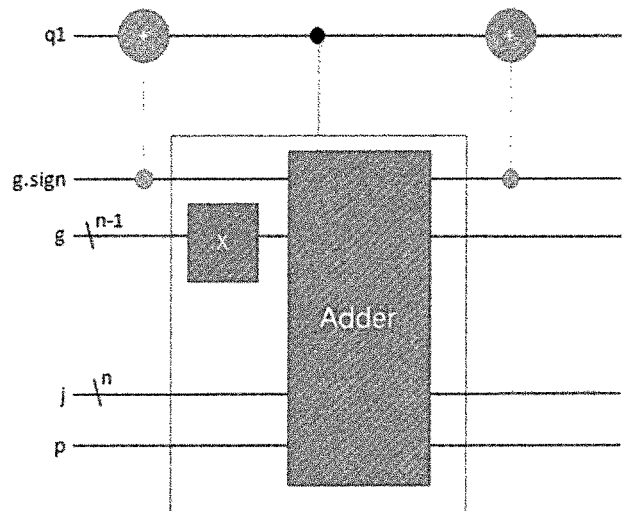
FIG. 38 is a schematic illustration of a quantum circuit for complement operation provided in an embodiment of the present disclosure.

As shown in FIG. 38, $q_1$ is the third preset auxiliary qubit, which is used for controlling whether to execute complement operation; the first target quantum state is g, and g.sign is the sign-bit sub-quantum state in the first target quantum state, the remaining of g is the value bit sub-quantum state representing the data value, j is the fourth preset auxiliary qubit, that is, an auxiliary qubit set to a value of 1, and p is an auxiliary qubit used by the adder (the fifth preset auxiliary qubit described below). Corresponding to FIG. 36, the above k is n+2 bits, i.e., it includes: n bits of j, 1 bit of p, and 1 bit of $q_1$.

The quantum circuit shown in FIG. 38 realizes the quantum circuit of the complement operation on g. First, the CNOT gate operation is executed on g.sign and $q_1$, so that $q_1$ temporarily represents g.sign, and $q_1$ is used for controlling whether to execute the complement operation. After finding the complement, restore $q_1$, thereby controlling the minuend quantum state to execute the quantum state evolution corresponding the complement operation to obtain the first complement quantum state.

Specifically, according to the sign-bit sub-quantum state of g, the first preset auxiliary qubit $q_1$ is used for controlling whether to execute the complement operation. If g is a negative number, the complement operation of the negative number is executed. The complement of a negative number is to increment by 1 after the bitwise inversion except the sign bit. If the operation of bitwise inversion except the sign bit is realized by logic gates, it is only necessary to execute X gates on all the value bits. Since increment by 1 is needed after inversion, therefore, by adding j and g, the value of j is set to 1. The "p" is the auxiliary qubit of the adder, upon adding g and j after inverting the value bits, what is stored on g is the value after the complement, then restore $q_1$ for the next use.

Example: when "g" is a negative number, "g.sign" is 1, and $q_1$ is also 1, and operations such as inversion need to be executed, and when "g" is positive, "g.sign" is 0, and $q_1$ is also 0, then there is no need to further execute a complement operation.

S4302. For the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state including the complement of the subtrahend data;

Specifically, the X gate operation can be executed on the second sign-bit-qubit corresponding to the sign-bit sub-quantum state in the subtrahend quantum state, to obtain the inverted sign-bit sub-quantum state; wherein, it is also reasonable and feasible to substitute the X gate with other existing quantum logic gates or combinations of quantum logic gates that are equivalent;

Similarly, continue to execute the CNOT gate operation on the current second sign-bit-qubit and the third preset auxiliary qubit, wherein the second sign-bit-qubit is a controlling bit, and the third preset auxiliary qubit is a controlled bit;

According to the current quantum state of the third preset auxiliary qubit after execution of the CNOT gate operation, control whether the current subtrahend quantum state executes the quantum state evolution corresponding to the complement operation;

if yes, invert the non-sign-bit sub-quantum state of the current subtrahend quantum state, and execute quantum state evolution corresponding to the addition operation on the subtrahend quantum state after the inversion and the quantum state |1⟩ of the fourth preset auxiliary qubit, to obtain the evolved second complement quantum state, otherwise, use the current subtrahend quantum state as the second complement quantum state;

Execute a CNOT gate operation on the current second sign-bit-qubit and the third preset auxiliary qubit to restore the current quantum state of the third preset auxiliary qubit; wherein, the second sign-bit-qubit is a controlling bit, and the third preset auxiliary qubit is a controlled bit.

For Example: the minuend quantum state is assumed to be |0100⟩. The sign-bit sub-quantum state of |0100⟩ is the highest bit sub-quantum state, that is, the |0⟩ state, the value of this bit is 0, the corresponding second sign-bit-qubit is set to "h.sign", and the current third auxiliary qubit is restored to the state |0⟩.

First, X gate may be executed on "h.sign", and invert the corresponding sign-bit sub-quantum state |1⟩ into |0⟩, and the subtrahend quantum state becomes |1100⟩.

Continue to execute the CNOT gate operation on "h.sign" and $q_1$, where "h.sign" is used as the controlling bit, $q_1$ is used as the controlled bit, the quantum state of the current h.sign bit is a |1⟩ state, after the CNOT gate operation, the quantum state |0⟩ of the controlled bit $q_1$ is inverted as a |1⟩ state.

The quantum state of $q_1$ after execution of the CNOT gate operation is |1⟩, and the quantum state evolution corresponding to the complement operation is executed on the current subtrahend quantum state |1100⟩. An implementation of the quantum state evolution corresponding to the complement operation is as follows:

Invert the non-sign-bit sub-quantum state of the current subtrahend quantum state |1100⟩, and execute quantum state evolution corresponding to the addition operation on the inverted subtrahend quantum state |1011⟩ and the quantum state |1⟩ of the fourth preset auxiliary qubit, to obtain the evolved second complement quantum state |1100⟩.

Here, the non-sign-bit sub-quantum state |100⟩ of |1100⟩ can be inverted by execution of a X gate; in order to keep the dimensions consistent, the fourth preset auxiliary qubit is a preset 4-bit qubit "j3, j2, j1, j0". The quantum state |1⟩ of the fourth preset auxiliary qubit is actually written as |0001⟩, the two are equivalent.

Finally, the CNOT gate can be executed again on the current h.sign and $q_1$. The quantum state of the "h.sign" bit is a |1⟩ state. After the CNOT gate operation, the quantum state |1⟩ of the controlled bit $q_1$ is inverted into |0⟩, thereby restoring $q_1$ to the initial |0⟩ state again, releasing the storage space of $q_1$. It can be seen that the value 1100 contained in the second complement quantum state is the complement of the subtrahend 1100 after executing the X gate on "h.sign".

Figure 39:
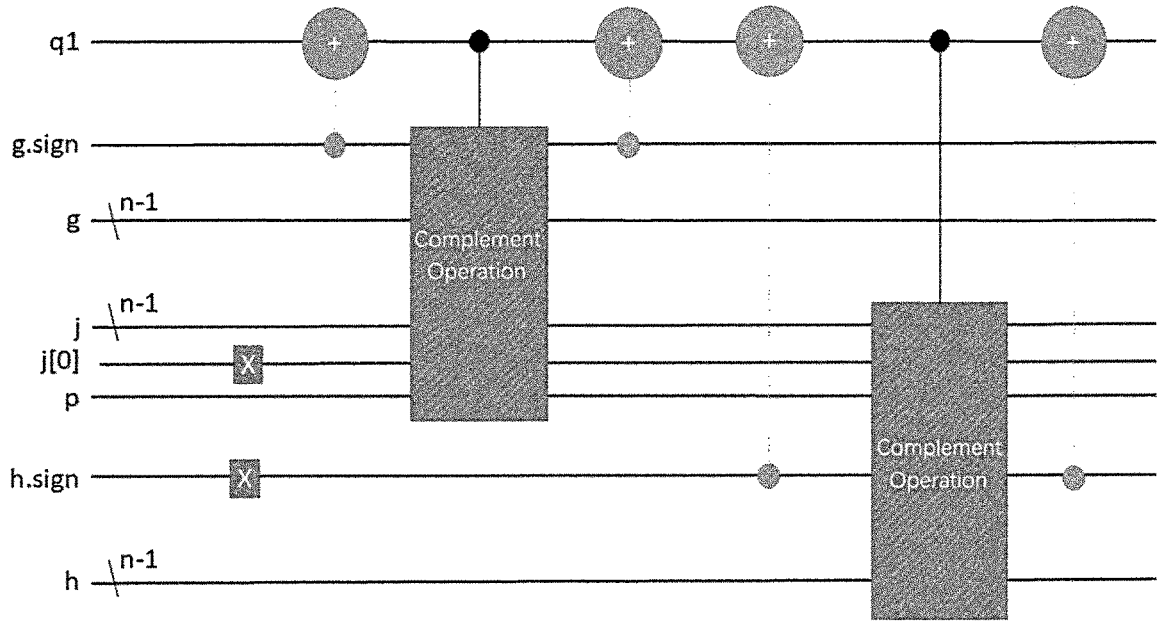
FIG. 39 is a schematic illustration of the first half of the quantum circuit corresponding to the subtractor provided in an embodiment of the present disclosure.

In this embodiment, similarly for the second target quantum state h: initially, the X gate is executed on $j_{[0]}$ to set the value to 1, and the X gate is executed on the sign-bit sub-quantum state "h.sign" in the second target quantum state to turn subtraction into addition. As shown in FIG. 39, FIG. 39 is a schematic illustration of the quantum circuit for the quantum state evolution corresponding to the complement operation executed on g and h, referring to a similar pattern to the above to execute the quantum state evolution corresponding to the complement operation on the second target quantum state "h", to obtain the second complement quantum state.

S4303. For the first complement quantum state and the second complement quantum state, executing quantum state evolution corresponding to the addition operation, so as to evolve the first complement quantum state into a fifth target quantum state including a sum of a complement of the minuend data and a complement of the subtrahend data;

For Example: for the first complement quantum state |0011⟩ and the second complement quantum state |1100⟩, the quantum state evolution corresponding to the addition operation is executed, and the first complement quantum state |0011⟩ is evolved into the fifth target quantum state |1111⟩.

In this embodiment, after the complement is obtained, the addition operation is executed on g and h. After the addition, the previous operation is restored, and the value stored in g is the desired value. Substituting the first complement quantum state and the second complement quantum state into the quantum circuit of the adder, to execute a quantum state evolution corresponding to the addition operation, thereby evolving the first complement quantum state to a third target quantum state including the sum of the complement of the minuend data and the complement of the subtrahend data.

S4304. According to the sign-bit sub-quantum state in the fifth target quantum state and the quantum state of the third preset auxiliary qubit, control the fifth target quantum state to execute the quantum state evolution corresponding to the complement operation, so as to obtain the evolved sixth target quantum state which is output as the subtraction result of subtracting the subtrahend data from the minuend data; wherein, the sixth target quantum state is a quantum state including a complement of the sum of the complement;

For Example: according to the sign-bit sub-quantum state |1⟩ in the current fifth target quantum state |1111⟩ and the current quantum state |0⟩ of the third preset auxiliary qubit, control the fifth target quantum state |1111⟩ to execute the quantum state evolution corresponding to the complement operation, and obtain the evolved sixth target quantum state |1001⟩ including the value 1001 (decimal −1), which is the subtraction result of subtracting the subtrahend 0100 (decimal 4) contained in the subtrahend quantum state |0100⟩ from the minuend 0011 (decimal 3) contained in the minuend quantum state |0011⟩.

It is to be noted that the quantum state evolution corresponding to the complement operation can be in the same way as the above. After the evolution, the quantum state of the second preset auxiliary qubit is still restored to |0⟩ to facilitate subsequent computing.

S4305. According to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit-inversion for the sign-bit sub-quantum state in the current subtrahend quantum state, so as to restore the current subtrahend quantum state.

For Example: the current subtrahend quantum state is the second complement quantum state |1100⟩, and the current quantum state of the third preset auxiliary qubit is |0⟩. Continue to follow a similar pattern to the above to control |1100⟩ to execute the quantum state evolution corresponding to the complement operation, and then obtain the evolved quantum state of |1100⟩, and then use the X-gate operation to invert the sub-quantum state of its sign bit, and restore it to the initial subtrahend quantum state |0100⟩.

Figure 40:
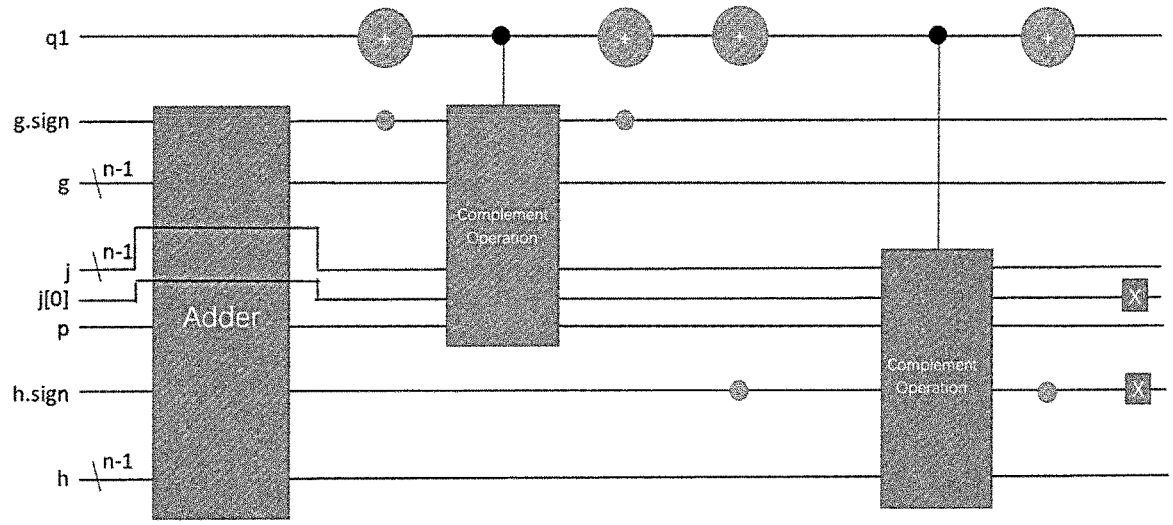
FIG. 40 is a schematic illustration of the second half of the quantum circuit corresponding to the subtractor provided in an embodiment of the present disclosure.
Figure 41:
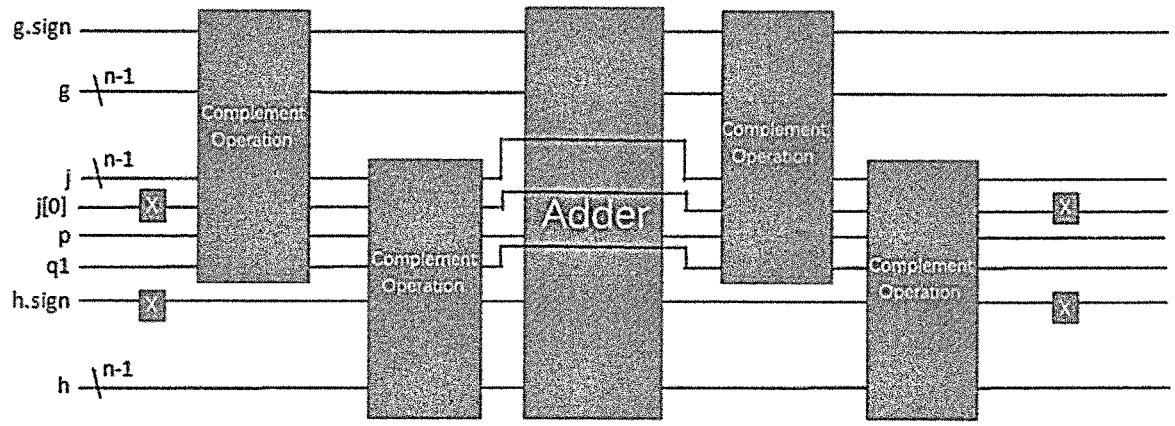
FIG. 41 is a schematic illustration of a quantum circuit corresponding to a subtractor provided in an embodiment of the present disclosure.

In this embodiment, after the addition operation, the quantum state evolution corresponding to the complement operation is further executed on the third target quantum state of the sum of the complement of the minuend data and the complement of the subtrahend data. As shown in FIG. 40, first, the purpose of executing an X gate on $j_{[0]}$ is to set the value of $j_{[0]}$ to 1, which is convenient for the +1 operation in the complement. The reason for executing the X gate operation on the sign bit of h is to transform g−h to g+(−h). Then, we execute the complement operation on both g and h. After the execution is completed, add the complements of g and h. After obtaining the result, we execute a further complement operation on g and h to restore to the normal value, and finally restore the initial operation, that is, to restore the auxiliary qubits, which is to execute X gate twice. Thus, the quantum circuit diagram of the entire subtractor as shown in FIG. 41 is formed, which is a simple functional example.

The specific implementation of the quantum state evolution corresponding to the addition operation is described in detail below.

Specifically, the quantum state evolution corresponding to the addition operation can be executed through the adder, which may include:

S4401, according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules;

It can be seen from the foregoing that the two quantum states to be operated may be: the first complement quantum state and the second complement quantum state; the inverted minuend quantum state and the quantum state |1⟩ of the fourth preset auxiliary qubit.

Figure 42:
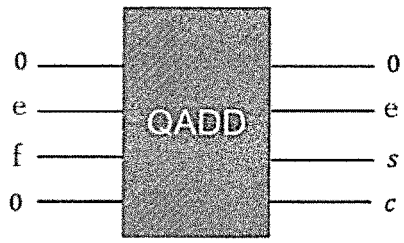
FIG. 42 is a schematic illustration of an adder provided in an embodiment of the present disclosure.

For Example: as shown in FIG. 42, the first qubit in the circuit is the fifth preset auxiliary qubit, which is initially a |0⟩ state and will eventually return to a |0⟩ state, "e" and "f" are the quantum states corresponding to the data to be added, each corresponding to a group of qubits. "c" represents the final carry item, corresponding to the preset carry auxiliary qubit, and "s" is the output bit that does not include a carry bit. It is generally required that the bit number of qubits corresponding to "e" equals to that corresponding to "f", and the bit number of "s" equal to those of "e" and "f".

Figure 43:
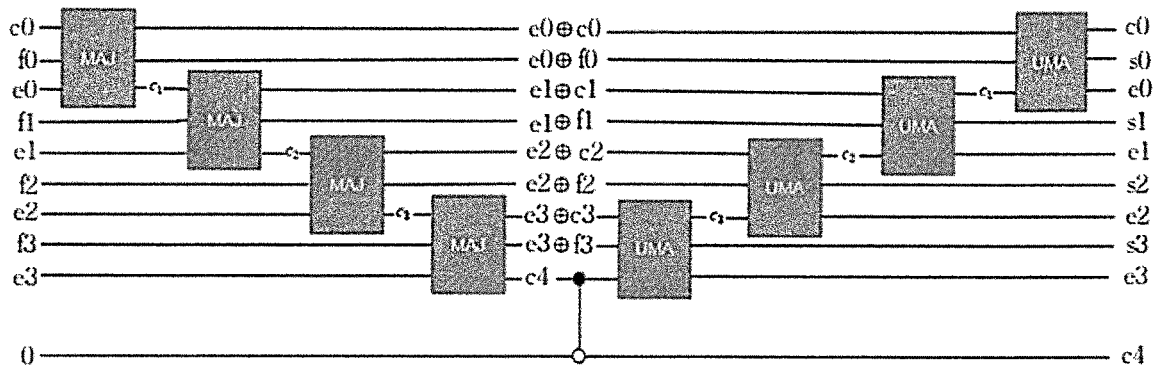
FIG. 43 is a schematic illustration of an adder quantum circuit provided in an embodiment of the present disclosure.

For Example: as shown in FIG. 43, $e_{[i]}$ and $f_{[i]}$ are respectively the i-th bit of the quantum state corresponding to the two addends, and $c_{[i]}$ is the previous-stage carry.

$$s_{[i]} = e_{[i]} \text{ XOR } f_{[i]} \text{ XOR } c_{[i]},$$

$$c_{[i+1]} = (e_{[i]} \text{ AND } f_{[i]}) \text{XOR} (e_{[i]} \text{ AND } f_{[i]}) \text{XOR} (e_{[i]} \text{ AND } f_{[i]}),$$

Here, the first qubit is the fifth preset auxiliary qubit, corresponding to $c_0$ in the quantum circuit. The first MAJ module includes three input quantum states and three corresponding output quantum states, the three input quantum states being $c_0$, $e_0$, and $f_0$, where $e_0$ is the 0th-bit quantum state of the first quantum state to be operated, $f_0$ is the 0th quantum state of the second quantum state to be operated, $c_0$ is the quantum state of the fifth preset auxiliary qubit, and the initial value is 0, that is to say there is no carry. The three output quantum states are respectively $e_0 \oplus c_0$, $e_0 \oplus f_0$ and $c_1$, where $c_1$ is the carry after the addition of $e_0$ and $f_0$. Similarly, the three input quantum states of the next MAJ module are $c_1$, $e_1$, and $f_1$, and the three output quantum states are respectively $e_1 \oplus c_1$, $e_1 \oplus f_1$, and $c_2$, and so on to the last MAJ module.

For the first UMA module, it includes three input quantum states and three corresponding output quantum states, where the three output quantum states of the MAJ module correspond to the three input quantum states of the UMA module, and the three output quantum states are respectively $c_0$, $s_0$, $e_0$, where $s_0$ is the carry-free result of adding $e_0$ and $f_0$. Similarly, $s_1$ is the carry-free result of adding $e_1$ and $f_1$, and so on, the $c_4$ is the final carry item. It is to be noted that, in practical applications, where there is no need to calculate the final carry, the qubit corresponding to $c_4$ does not have to be provided in the quantum circuit.

Moreover, the number of the MAJ modules and the number of UMA modules can be determined according to the number of sub-quantum state s contained in any quantum state to be operated, one sub-quantum state corresponding to one qubit, wherein the number of the MAJ modules is equal to the number of UMA modules. What is shown in the figure is only an example, 4 qubits are required for encoding each of "e" and "f", and the number of MAJ modules and that of UMA modules are both 4. The MAJ module and the UMA module constitute the front and rear cascading units of the adder. The MAJ module can be used for extracting the carry term of any step and pass it to the next stage to calculate the final carry term. The UMA module not only extracts the information of "c" and transmits it to the previous-stage UMA, but also calculates the "s" (result item) of each stage and recovers the information of "e".

For Example: When 4 (corresponding encoding is expressed in a 3-qubit quantum state as 100)+2 (corresponding encoding is expressed in a 3-qubit quantum state as 010)=6 (corresponding encoding is expressed in a 3-qubit quantum state as 110). At this time, the bit number of qubits encoding the operation result is the same as the bit number of qubits encoding "e" or the bit number of qubits used for encoding "f", and the number of the MAJ modules and the number of UMA modules are both 3.

For Example: When 4 (corresponding encoding is expressed in a 3-qubit quantum state as 100)+7 (corresponding encoding is expressed in a 3-qubit quantum state as 111)=11 (corresponding encoding is expressed in a 3-qubit quantum state as 011). However, it can be understood that the binary number corresponding to 11 is 1011, and the bit where the leftmost 1 is located is a carry item, which can be represented by an auxiliary qubit. At this time, the bit number of qubits encoding the operation result is greater than the bit number of qubits encoding "e" or the bit number of qubits used for encoding "f", and the number of the MAJ modules and the number of UMA modules are both 3.

For Example: when 2 (corresponding encoding is expressed in a 2-qubit quantum state as 10)+4 (corresponding encoding is expressed in a 3-qubit quantum state as 100)=6 (corresponding encoding is expressed in a 3-qubit quantum state as 110). At this time, the numerical item "3" encoding the numerical value of "6" equals to the number of quantum states of the qubit encoding "b", and the number of the MAJ modules and the number of UMA modules are both 3.

S4402. According to the addition instruction, cascading the MAJ modules and UMA modules in the target module number, to generate a target quantum circuit corresponding to the adder;

Here, the MAJ module and the UMA module each includes three input items and three output items, and according to an addition instruction, the three output items of an MAJ cascading module can be used as three inputs of a corresponding UMA cascading module, to cascade the MAJ cascading module with the corresponding UMA cascading module to generate a target quantum circuit corresponding to an adder, wherein the MAJ cascading module is determined by cascading between MAJ modules in the target module number, and the UMA cascading module is determined by cascading between UMAmodules in the target module number.

Specifically, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated;

Then, according to the addition instruction, using the carry output item output by the previous MAJ module and the two sub-quantum state input items to be operated as the three input items of the next MAJ module, so as to cascade the MAJ modules in the target module number;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder. If the carry item is not needed, the CNOT gate and the carry auxiliary qubit does not have to be provided.

In this embodiment, as shown in FIG. 43, according to the figure, use the three output bits of the MAJ module as the three input bits of the UMA module, thereby cascading the same number of MAJ modules and UMA modules to generate a target quantum circuit corresponding to an adder.

Here, the hollow circles and solid circles connected in the circuit diagram represent CNOT gate operations, the hollow circles correspond to qubits as controlling bits, and the solid circles correspond to those as controlled bits.

Here, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, and the embodiment further includes, before said step "cascading the MAJ modules in the target module number with the UMA modules in the target module number, so as to generate a target quantum circuit corresponding to the adder": obtaining operation qubits corresponding to the two CNOT quantum logic gates and one TOFFOLI quantum logic gate, the control relationship between the operation qubits and the timing relationship between the two CNOT quantum logic gates and one TOFFOLI quantum logic gate; according to the operation qubits, the control relationship and the timing relationship, use the two CNOT quantum logic gates and one TOFFOLI quantum logic gate to construct and generate the MAJ quantum circuit or the UMA quantum circuit as a corresponding MAJ module or a corresponding UMA module.

Figure 44:
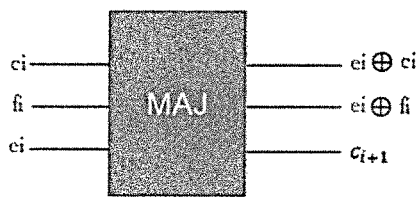
FIG. 44 is a schematic illustration of the MAJ module provided in an embodiment of the present disclosure.
Figure 45:
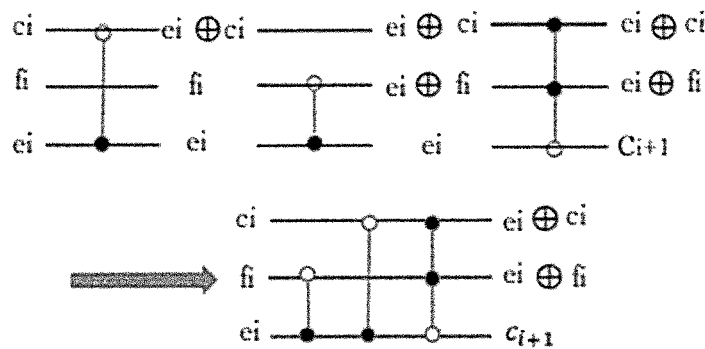
FIG. 45 is a schematic illustration of the MAJ module quantum circuit combination process provided in an embodiment of the present disclosure.

In this embodiment, the MAJ module and the UMA module constitute the front and rear cascading units of the adder. As shown in FIG. 44, the MAJ module is used for extracting the carry item after each stage of addition and pass it to the next stage, so as to calculate the final carry item. Here, as shown in FIG. 45, the MAJ module may be mainly composed of three logic gates, namely two CNOT gates and one Toffoli gate. The role of the CNOT gate (the first and second logic gates from left to right in FIG. 45) is to add the controlling bit to the target bit to form a modulo 2 addition, which is an exclusive OR operation, and get $(e_i+c_i)\%2$, $(e_i+f_i)\%2$, the order of the two CNOT gates can be swapped. The function of the Toffoli gate (the third logic gate from left to right in FIG. 45) is to add both controlling bits to the target bit to get the carry item $c_{[i+1]}=(e_{[i]}$ AND $f_{[i]})$ XOR $(e_{[i]}$ AND $f_{[i]})$ XOR $(e_{[i]}$ AND $f_{[i]})$. That is, to implement $e_i \oplus c_i$ through the first CNOT gate from left to right in FIG. 45, to implement $e_i \oplus f_i$ through the second CNOT gate from left to right in FIG. 45, and to implement $c_{i+1}$ through the third TOFFOLI gate from left to right in FIG. 45, thereby forming the front-stage cascading unit of the quantum adder with two CNOT gates and one TOFFOLI gate.

Example 1: $e_i$ is 1, $f_i$ is 1, and $c_i$ is 1.

The MAJ module starts by adding $e_i$ to $c_i$, the value of $c_i$ becomes 0, then adds $e_i$ to $f_i$, the value of $f_i$ also becomes 0, and finally adds $f_i$ and $c_i$ to $e_i$, the value of $e_i$ becomes 1, that is, the carry of $c_{i+1}$ is 1.

Example 2: $e_i$ is 0, $f_i$ is 1, and $c_i$ is 1.

The MAJ module starts by adding $e_i$ to $c_i$, the value of $c_i$ becomes 1, then adds $e_i$ to $f_i$, the value of $f_i$ also becomes 1, and finally adds $f_i$ and $c_i$ to $e_i$, the value of $e_i$ becomes 1, that is, the carry of $c_{i+1}$ is 1.

Figure 46:
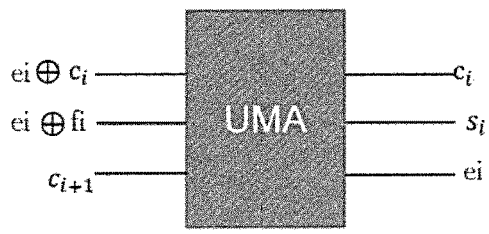
FIG. 46 is a schematic illustration of a UMA module provided in an embodiment of the present disclosure.
Figure 47:
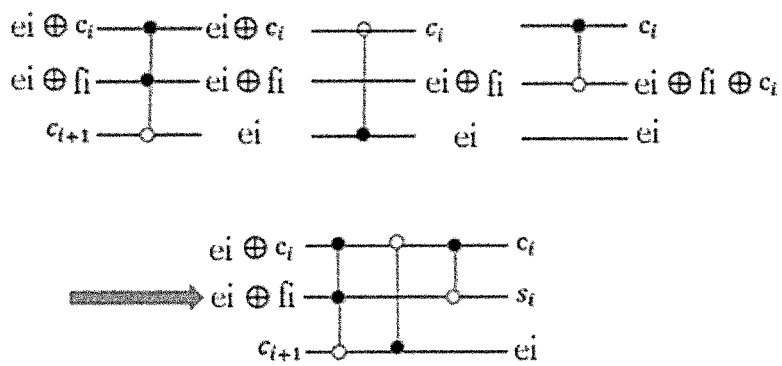
FIG. 47 is a schematic illustration of the UMA module quantum circuit combination process provided in an embodiment of the present disclosure.

As shown in FIG. 46, the UMA module is used as the rear-stage of the cascaded adder. The implementation of a UMA module is similar to that of an MAJ module. As shown in FIG. 47, the Toffoli gate (the first logic gate from left to right in FIG. 47) is first used for restoring $c_{i+1}$ to $e_i$, and then use $e_i$ to restore (e+c) %2 with the CNOT gate (the second logic gate from left to right in FIG. 47), and ($e_i + c_i$%2 is restored to $c_i$, and finally, use $c_i$ execute a CNOT gate (the third logic gate from left to right in FIG. 47) on ($e_i + f_i$) %2, getting the final result of the current bit $s_{[i]} = e_{[i]}$ XOR $f_{[i]}$ XOR $c_{[i]}$.

Example 1: ($e_i + c_i$) %2 is 0, ($e_i + f_i$) %2 is 0, $c_{i+1}$ is 1.

Start by adding ($e_i + c_i$) %2 and ($e_i + f_i$) %2 to $c_{i+1}$, the value of $c_{i+1}$ becomes 1, and the meaning thereof becomes $e_i$, then add $e_i$ to ($e_i + c_i$) %2, the value of ($e_i + c_i$) %2 becomes 1, and the meaning thereof becomes $c_i$, then add $c_i$ to ($e_i + f_i$) %2, the value of ($e_i + f_i$) %2 becomes 1, and the meaning thereof becomes $s_i$.

Example 2: ($e_i + c_i$) %2 is 1, ($e_i + f_i$) %2 is 1, $c_{i+1}$ is 1.

Start by adding ($e_i + c_i$) %2 and ($e_i + f_i$) %2 to $c_{i+1}$, the value of $c_{i+1}$ becomes 0, and the meaning thereof becomes $e_i$, then add $e_i$ to ($e_i + c_i$) %2, the value of ($e_i + c_i$) %2 becomes 1, and the meaning thereof becomes $c_i$, then add $c_i$ to ($e_i + f_i$) %2, the value of ($e_i + f_i$) %2 becomes 0, and the meaning thereof becomes $s_i$.

As shown in FIG. 43, the last CNOT gate from top to bottom, that is, the CNOT gate between the MAJ module and the UMA module in the entire adder, is used for storing the result of $c_{i+1}$.

S4403. Execute an addition operation on each sub-quantum state of the two quantum states to be operated through the target quantum circuit, generate a target quantum state result, and output it.

In this embodiment, by inputting the two quantum states to be operated, such as |111> and |111>, into the adder (that is, the target quantum circuit), the corresponding binary representation of the operation result of the target quantum state (including carry term and the result term obtained by direct addition of each sub-quantum state). Then the binary expression of the result |1110> of the target quantum state is directly output, or is further transformed into a decimal result 14 and output to complete the addition operation of the two target data.

It can be seen that the method for quantum division operation provided in the present disclosure is used for implementing the basic arithmetic operation in the quantum circuit, obtaining the dividend data and the divisor data to be operated, transforming the dividend data into a first target quantum state, and transforming the divisor data into a second target quantum state, for the first target quantum state and the second target quantum state, iteratively executing quantum state evolution corresponding to a subtraction operation, counting the number of executions of the sub- traction operation until the dividend data is reduced to a negative number, and using a finally obtained counting result as a quotient of dividing the dividend data by the divisor data, transforming it into a decimal representation and output it, thereby realizing a basic arithmetic operation that can be used in quantum circuits, filling the gap in the related art.

Figure 48:
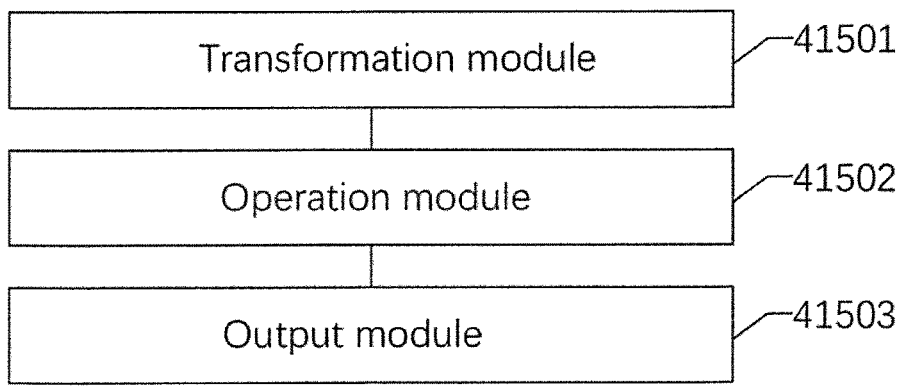
FIG. 48 is a schematic structural illustration of a device for quantum division operation provided in an embodiment of the present disclosure.

Referring to FIG. 48, FIG. 48 is a schematic structural illustration of a device for quantum division operation provided in an embodiment of the present disclosure, which may include:

A transformation module 41501, configured for: obtaining, by a processor, dividend data and divisor data to be operated, transforming the dividend data into a first target quantum state, and transforming the divisor data into a second target quantum state; wherein, each of the first target quantum state and the second target quantum state includes: a sign-bit sub-quantum state representing the data sign, and a value bit sub-quantum state representing the data value;

An operation module 41502, configured for: for the first target quantum state and the second target quantum state, iteratively executing the quantum state evolution corresponding to the subtraction operation, and counting the number of executions of the subtraction operation until the dividend data is reduced to a negative number, wherein, the minuend of each subtraction operation is the subtraction result of the last subtraction operation, and the subtrahend is the divisor data;

An output module 41503, configured for: outputting the finally obtained counting result as a quotient of dividing the dividend data by the divisor data.

Specifically, the operation module is specifically configured for:

For a current first target quantum state and the second target quantum state, executing quantum state evolution corresponding to the subtraction operation, to obtain the first target quantum state including a subtraction operation result;

For a third target quantum state of a current first preset auxiliary qubit and a fourth target quantum state of a current second preset auxiliary qubit, executing quantum state evolution corresponding to the subtraction operation, to increment a value contained in the current third target quantum state by 1; wherein an initial value contained in the third target quantum state and a value contained in the fourth target quantum state are both −1;

Measuring a sign-bit sub-quantum state of the first target quantum state currently including the subtraction operation result, and determining whether a value of the sign bit of the first target quantum state that currently contains the subtraction operation result is 0;

In the case that the value of the sign bit of the first target quantum state that currently contains the subtraction operation result is 0, returning and executing the step "for a current first target quantum state and the second target quantum state, executing quantum state evolution corresponding to the subtraction operation", until it is determined that the value of the sign bit of the first target quantum state currently including the subtraction operation result is 1.

Specifically, the output module is specifically configured for:
outputting a finally obtained third target quantum state, wherein the third target quantum state contains an integer-bit binary value of a quotient of dividing the dividend data by the divisor data.

Specifically, the device further includes:
A first execution module, configured for: inverting the sign-bit sub-quantum state of the second target quantum state, executing quantum state evolution corresponding to subtraction operation on the current first target quantum state and the second target quantum state with its sign bit inverted, to obtain the remainder of dividing the dividend data by the divisor data.

Specifically, the device further includes:
A second execution module, configured for: obtaining a preset sign-bit-qubit, for a qubit corresponding to a sign-bit sub-quantum state of the first target quantum state, a qubit corresponding to a sign-bit sub-quantum state of the second target quantum state, the first preset auxiliary qubit, and the preset sign bit qubit: executing a preset quantum logic gate operation to finally obtain the sign value represented by the sign-bit sub-quantum state in the three-target quantum state.

Specifically, the operation module includes:
A first complement operation unit, configured for: for two quantum states to be operated, i.e, a minuend quantum state including the minuend data and a subtrahend quantum state including the subtrahend data, obtaining a quantum state of a third preset auxiliary qubit, and according to a sign-bit sub-quantum state of the minuend quantum state and the quantum state of the third preset auxiliary qubit, controlling the minuend quantum state to execute quantum state evolution corresponding to the complement operation so as to obtain a first complement quantum state; wherein the first complement quantum state is a quantum state including the complement of the minuend data;

A second complement operation unit, configured for: for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state including the complement of the subtrahend data;

An addition operation unit, configured for: for the first complement quantum state and the second complement quantum state, executing quantum state evolution corresponding to the addition operation, so as to evolve the first complement quantum state into a fifth target quantum state including a sum of a complement of the minuend data and a complement of the subtrahend data;

A third complement operation unit, configured for: according to the sign-bit sub-quantum state in the fifth target quantum state as well as the quantum state of the third preset auxiliary qubit, controlling the fifth target quantum state to execute the quantum state evolution corresponding to the complement operation, so as to obtain an evoluted sixth target quantum state which is output as the subtraction operation result of subtracting the subtrahend data from the minuend data, wherein the sixth target quantum state is a quantum state including a complement of the sum of the complement;

A fourth complement operation unit, configured for: according to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit-inversion for the sign-bit sub-quantum state in the current subtrahend quantum state, so as to restore the current subtrahend quantum state.

Specifically, the first complement operation unit is configured for:
Executing a CNOT gate operation on the first sign-bit-qubit corresponding to the sign-bit sub-quantum state in the minuend quantum state and the third preset auxiliary qubit, wherein the first sign-bit-qubit is a controlling bit and the third preset auxiliary qubit is a controlled bit;

According to the quantum state of the third preset auxiliary qubit after execution of the CNOT gate operation, controlling whether the current minuend quantum state executes the quantum state evolution corresponding to the complement operation:

If yes, inverting the non-sign-bit sub-quantum state of the current minuend quantum state, and for the inverted minuend quantum state and the fourth preset auxiliary qubit quantum state |1⟩, executing quantum state evolution corresponding to the addition operation to obtain the evolved first complement quantum state; otherwise, using the minuend quantum state as the first complement quantum state;

Executing CNOT gate operation on the current first sign-bit-qubit and the third preset auxiliary qubit to restore the current quantum state of the third preset auxiliary qubit; wherein the first sign-bit-qubit is a controlling bit, and the third preset auxiliary qubit is a controlled bit.

Specifically, the second complement operation unit is specifically configured for:
For the second sign-bit-qubit corresponding to the sign-bit sub-quantum state in the subtrahend quantum state, executing an X-gate operation to obtain the inverted sign-bit sub-quantum state;

Executing a CNOT gate operation on the current second sign-bit-qubit and the third preset auxiliary qubit, wherein the second sign-bit-qubit is a controlling bit, and the third preset auxiliary qubit is a controlled bit;

According to the current quantum state of the third preset auxiliary qubit after execution of the CNOT gate operation, controlling whether the current subtrahend quantum state executes the quantum state evolution corresponding to the complement operation;

If yes, inverting the non-sign-bit sub-quantum state of the current subtrahend quantum state, and for the inverted subtrahend quantum state and the fourth preset auxiliary qubit quantum state |1⟩, executing quantum state evolution corresponding to the addition operation to obtain the evolved second complement quantum state; otherwise, using the current subtrahend quantum state as the second complement quantum state;

Executing a CNOT gate operation on the current second sign-bit-qubit and the third preset auxiliary qubit to restore the current quantum state of the third preset auxiliary qubit; wherein the second sign-bit-qubit is a controlling bit, and the third preset auxiliary qubit is a controlled bit.

Specifically, the addition operation unit includes:
A determination subunit, configured for: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules;

A cascading subunit, configured for: according to an addition instruction, cascading the MAJ modules and the UMA modules both in the target module number, to generate a target quantum circuit corresponding to the adder;

An operation subunit, configured for: executing, with the target quantum circuit, an addition operation of each sub-quantum state of the two quantum states to be operated, so as to generate and output a target quantum state result.

Specifically, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate; the addition operation unit further includes:

An obtaining subunit, configured for obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate;

A constructing subunit, configured for: according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Specifically, the MAJ module and the UMA module each includes three input items and three output items, and the cascade subunit is specifically configured for:

According to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

Specifically, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated; the cascading subunit is specifically configured for:

According to the addition instruction, using the carry output item output by the previous MAJ module and the two sub-quantum state input items to be operated as the three input items of the next MAJ module, so as to cascade the MAJ modules in the target module number;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

It can be seen that by obtaining the dividend data and the divisor data to be operated, transforming the dividend data into a first target quantum state, and transforming the divisor data into a second target quantum state, for the first target quantum state and the second target quantum state, iteratively executing quantum state evolution corresponding to a subtraction operation, counting the number of executions of the subtraction operation until the dividend data is reduced to a negative number, and using a finally obtained counting result as a quotient of dividing the dividend data by the divisor data, transforming it into a decimal representation and output it: a basic arithmetic operation that can be used in quantum circuits is realized, filling the gap in the related art.

Yet another embodiment of the present disclosure provides an electronic device, including a memory having a computer program stored therein, and a processor, configured to execute the computer program to perform the following method:

S1. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing the data sign and a value bit sub-quantum state representing the data value;

S2. For the first target quantum state and the second target quantum state, iteratively executing the quantum state evolution corresponding to the subtraction operation, and counting the number of executions of the subtraction operation until the dividend data is reduced to a negative number; Here, the minuend of each subtraction operation is the subtraction result of the last subtraction operation, and the subtrahend is the divisor data;

S3. Output the finally obtained counting result as a quotient of dividing the dividend data by the divisor data.

Yet another embodiment of the present disclosure provides a storage medium, in which a computer program is stored, wherein the computer program is configured to execute the following method when running:

S1. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing the data sign, and a value bit sub-quantum state representing the data value;

S2. For the first target quantum state and the second target quantum state, iteratively executing the quantum state evolution corresponding to the subtraction operation, and counting the number of executions of the subtraction operation until the dividend data is reduced to a negative number, wherein, the minuend of each subtraction operation is the subtraction result of the last subtraction operation, and the subtrahend is the divisor data;

S3. Outputting the finally obtained counting result as a quotient of dividing the dividend data by the divisor data.

The above-described embodiments can be summarized as follows.

C41. A method for quantum division operation, characterized by including: obtaining dividend data and divisor data to be operated, transforming the dividend data into a first target quantum state, and transforming the divisor data into a second target quantum state; wherein each of the first target quantum state and the second target quantum state includes: a sign-bit sub-quantum state representing a data sign, and a value bit sub-quantum state representing a data value;

For the first target quantum state and the second target quantum state, iteratively executing quantum state evolution corresponding to a subtraction operation, counting the number of executions of the subtraction operation until the dividend data is reduced to a negative number, wherein a subtraction result of the preceding subtraction operation is used as a minuend of each execution of the subtraction operation, and the divisor data is used as a subtrahend of each execution of the subtraction operation; and outputting a finally obtained counting result as a quotient of dividing the dividend data by the divisor data;

C42. A method of C41, characterized in that, said "for the first target quantum state and the second target quantum state, iteratively executing quantum state evolution corresponding to a subtraction operation, counting the number of executions of the subtraction operation until the dividend data is reduced to a negative number" includes: for a current first target quantum state and the second target quantum state, executing quantum state evolution corresponding to the subtraction operation, to obtain the first target quantum state including a subtraction operation result; for a third target quantum state of a current first preset auxiliary qubit and a fourth target quantum state of a current second preset auxiliary qubit, executing quantum state evolution corresponding to the subtraction operation, to increment a value contained in the current third target quantum state by 1; wherein an initial value contained in the third target quantum state and a value contained in the fourth target quantum state are both −1; measuring a sign-bit sub-quantum state of the first target quantum state currently including the subtraction operation result, and determining whether a value of the sign bit of the first target quantum state that currently contains the subtraction operation result is 0; in the case that the value of the sign bit of the first target quantum state that currently contains the subtraction operation result is 0, returning and executing the step "for a current first target quantum state and the second target quantum state, executing quantum state evolution corresponding to the subtraction operation", until it is determined that the value of the sign bit of the first target quantum state currently including the subtraction operation result is 1.

C43. A method of C41 or C42, characterized in that said "outputting the finally obtained counting result as a quotient of dividing the dividend data by the divisor data" includes: outputting a finally obtained third target quantum state, wherein the third target quantum state contains an integer-bit binary value of a quotient of dividing the dividend data by the divisor data.

C44. A method according to any one of C41-C43, characterized by further including:

Inverting the sign-bit sub-quantum state of the second target quantum state, executing quantum state evolution corresponding to subtraction operation on the current first target quantum state and the second target quantum state with its sign bit inverted, to obtain the remainder of dividing the dividend data by the divisor data.

C45. A method according to any one of C41-C44, characterized by further including: obtaining a preset sign-bit-qubit, for a qubit corresponding to a sign-bit sub-quantum state of the first target quantum state, a qubit corresponding to a sign-bit sub-quantum state of the second target quantum state, the first preset auxiliary qubit, and the preset sign bit qubit: executing a preset quantum logic gate operation to finally obtain the sign value represented by the sign-bit sub-quantum state in the three-target quantum state.

C46. A method according to any one of C41-C45, characterized in that said executing the quantum state evolution corresponding to the subtraction operation further includes: for two quantum states to be operated, i.e, a minuend quantum state including the minuend data and a subtrahend quantum state including the subtrahend data, obtaining a quantum state of a third preset auxiliary qubit, and according to a sign-bit sub-quantum state of the minuend quantum state and the quantum state of the third preset auxiliary qubit, controlling the minuend quantum state to execute quantum state evolution corresponding to the complement operation so as to obtain a first complement quantum state; wherein the first complement quantum state is a quantum state including the complement of the minuend data; for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state including the complement of the subtrahend data; for the first complement quantum state and the second complement quantum state, executing quantum state evolution corresponding to the addition operation, so as to evolve the first complement quantum state into a fifth target quantum state including a sum of a complement of the minuend data and a complement of the subtrahend data; according to the sign-bit sub-quantum state in the fifth target quantum state as well as the quantum state of the third preset auxiliary qubit, controlling the fifth target quantum state to execute the quantum state evolution corresponding to the complement operation, so as to obtain an evoluted sixth target quantum state which is output as the subtraction operation result of subtracting the subtrahend data from the minuend data, wherein the sixth target quantum state is a quantum state including a complement of the sum of the complement; and according to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit-invertion for the sign-bit sub-quantum state in the current subtrahend quantum state, so as to restore the current subtrahend quantum state.

C47. A method according to any one of C41-C46, characterized in that, said "according to a sign-bit sub-quantum state of the minuend quantum state and the quantum state of the third preset auxiliary qubit, controlling the minuend quantum state to execute quantum state evolution corresponding to the complement operation" includes: executing a CNOT gate operation on the first sign-bit-qubit corresponding to the sign-bit sub-quantum state in the minuend quantum state and the third preset auxiliary qubit, wherein the first sign-bit-qubit is a controlling bit and the third preset auxiliary qubit is a controlled bit; according to the quantum state of the third preset auxiliary qubit after execution of the CNOT gate operation, controlling whether the current minuend quantum state executes the quantum state evolution corresponding to the complement operation: if yes, inverting the non-sign-bit sub-quantum state of the current minuend quantum state, and for the inverted minuend quantum state and the fourth preset auxiliary qubit quantum state |1⟩, executing quantum state evolution corresponding to the addition operation to obtain the evolved first complement quantum state; otherwise, using the minuend quantum state as the first complement quantum state; and executing CNOT gate operation on the current first sign-bit-qubit and the third preset auxiliary qubit to restore the current quantum state of the third preset auxiliary qubit; wherein the first sign-bit-qubit is a controlling bit, and the third preset auxiliary qubit is a controlled bit.

C48. A method according to any one of C41-C47, characterized in that, said "for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation" includes: for the second sign-bit-qubit corresponding to the sign-bit sub-quantum state in the subtrahend quantum state, executing an X-gate operation to obtain the inverted sign-bit sub-quantum state; executing a CNOT gate operation on the current second sign-bit-qubit and the third preset auxiliary qubit, wherein the second sign-bit-qubit is a controlling bit, and the third preset auxiliary qubit is a controlled bit; according to the current quantum state of the third preset auxiliary qubit after execution of the CNOT gate operation, controlling whether the current subtrahend quantum state executes the quantum state evolution corresponding to the complement operation; if yes, inverting the non-sign-bit sub-quantum state of the current subtrahend quantum state, and for the inverted subtrahend quantum state and the fourth preset auxiliary qubit quantum state |1⟩, executing quantum state evolution corresponding to the addition operation to obtain the evolved second complement quantum state; otherwise, using the current subtrahend quantum state as the second complement quantum state; executing a CNOT gate operation on the current second sign-bit-qubit and the third preset auxiliary qubit to restore the current quantum state of the third preset auxiliary qubit; wherein the second sign-bit-qubit is a controlling bit, and the third preset auxiliary qubit is a controlled bit.

C49. A method according to any one of C41-C48, characterized in that said "executing quantum state evolution corresponding to the addition operation" includes: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules; according to an addition instruction, cascading the MAJ modules and the UMA modules both in the target module number, to generate a target quantum circuit corresponding to the adder; executing, with the target quantum circuit, an addition operation of each sub-quantum state of the two quantum states to be operated, so as to generate and output a target quantum state result.

C410. A method according to any one of C41-C49, characterized in that, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, the method further includes, before the step "according to an addition instruction, cascading the MAJ modules and the UMA modules both in the target module number, to generate a target quantum circuit corresponding to the adder": obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

C411. A method according to any one of C41-C410, characterized in that the MAJ module and the UMA module each includes three input items and three output items, said step "according to an addition instruction, cascading the MAJ modules and the UMA modules both in the target module number, to generate a target quantum circuit corresponding to the adder" specifically includes: according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

C412. A method according to any one of C41-C411, characterized in that, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, said step "according to an addition instruction, using three output items of an MAJ cascading module as three input items of a corresponding UMA cascading module, so as to cascade the MAJ cascading module with the corresponding UMA cascading module to generate a target quantum circuit corresponding to the adder" specifically includes: according to the addition instruction, using the carry output item output by the previous MAJ module and the two sub-quantum state input items to be operated as the three input items of the next MAJ module, so as to cascade the MAJ modules in the target module number; using two intermediate result output items of an MAJ module as two input items of a corresponding UMA module, obtaining a previous UMA module preceding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module; and adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

C413. A device for quantum division operation, characterized by including: a transformation module, configured for obtaining, by a processor, dividend data and divisor data to be operated, transforming the dividend data into a first target quantum state, and transforming, by the processor, the divisor data into a second target quantum state; wherein each of the first target quantum state and the second target quantum state includes: a sign-bit sub-quantum state representing a data sign, and a value bit sub-quantum state representing a data value; an operation module, for the first target quantum state and the second target quantum state, iteratively executing, by the processor quantum state evolution corresponding to a subtraction operation, and counting, by the processor, the number of executions of the subtraction operation until the dividend data is reduced to a negative number, wherein a subtraction result of the preceding subtraction operation is used as a minuend of each execution of the subtraction operation, and the divisor data is used as a subtrahend of each execution of the subtraction operation; and an output module, configured for outputting, by the processor, a finally obtained counting result as a quotient of dividing the dividend data by the divisor data.

C414. An electronic device, including a memory having a computer program stored therein, and a processor, configured to execute the computer program to perform the method of any one of C41-C412.

C415. A storage medium, characterized in that a computer program is stored in the storage medium, wherein the computer program is configured to execute the method described in any one of C41-C412 when running.

Compared with the prior art, the method for quantum division operation provided in the present disclosure obtains the dividend data and the divisor data to be operated, transforms the dividend data into the first target quantum state, and transforms the divisor data into the second quantum state. For the first target quantum state and the second target quantum state, iteratively execute the quantum state evolution corresponding to the subtraction operation, and count the number of executions of the subtraction operation until the dividend data is reduced to a negative number; the final counting result is output as the quotient of dividing the dividend data by the divisor data, thereby realizing the basic arithmetic operations that can be used in quantum circuits, and fill in the gaps in related art.

Figure 49:
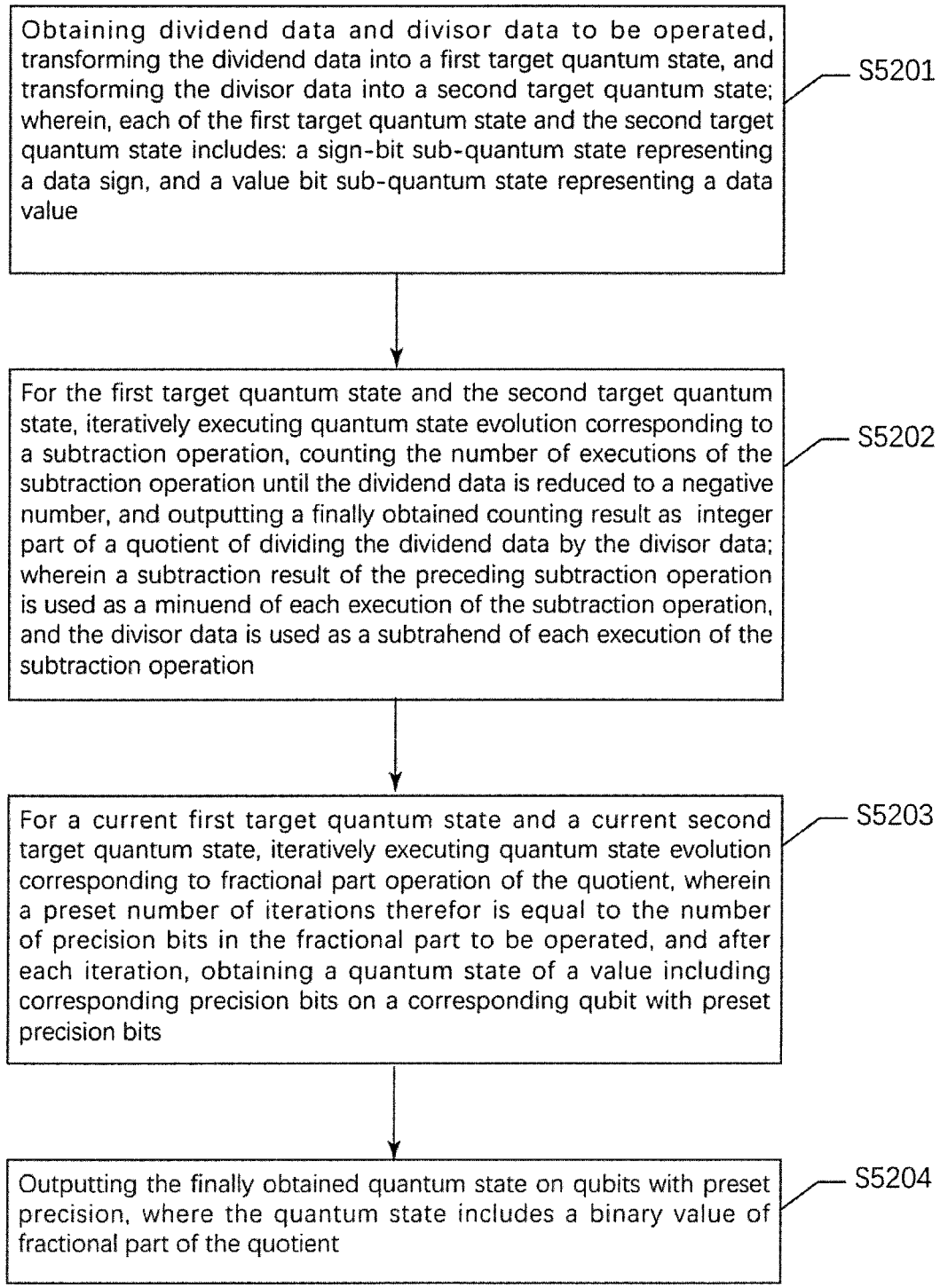
FIG. 49 is a schematic flowchart of a method for quantum division operation with precision provided in an embodiment of the present disclosure.

Referring to FIG. 49, FIG. 49 is a schematic flowchart of a method for quantum division operation with precision provided in an embodiment of the present disclosure, which may include the following steps:

S5201. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing a data sign, and a value bit sub-quantum state representing a data value;

Specifically, the existing amplitude encoding method can be used for transforming the decimal data to be operated into a binary quantum state representation. For example, the dividend data is 7, the signed binary expression thereof is 0111, the highest bit is 0 for positive numbers, and 1 for negative numbers; the divisor data is 4, and the signed binary expression thereof is 011. It is to be noted that, in this embodiment, the highest bits of the first target quantum state and the second target quantum state are both 0, that is, both the dividend and the divisor participating in the operation are positive numbers.

It is possible to obtain 5 qubits "a.sign", "a3", "a2", "a1", and "a0". Encode 7 to the first target quantum state $|00111\rangle$ . of "a.sign, a3, a2, a1, a0", and set the amplitude of the quantum state to 1. Here, $|00111\rangle = |0\rangle|0\rangle|1\rangle|1\rangle|1\rangle$, where $|0\rangle$ , $|0\rangle$ , $|1\rangle$ , $|1\rangle$ , $|1\rangle$ are called sub-quantum state s of $|00111\rangle$ , one sub-quantum state corresponding to one qubit, and from right to left means from high to low: the highest bit corresponds to a.sign, the fourth bit corresponds to a3, the third bit corresponds to a2, the second bit corresponds to a1, the lowest bit corresponds to a0, the highest bit $|0\rangle$ represents the sign-bit sub-quantum state, and the rest represent the value bit sub-quantum state s. In order to unify the operation dimension, 5 more qubits b.sign, b3, b2, b1, b0 are additionally obtained, and 4 is encoded into the second target quantum state $|00100\rangle$ of b.sign, b3, b2, b1, b0, the amplitude of which is also 1.

S5202. For the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation.

Specifically, the number of executions of the subtraction operation here refers to the number of quantum state evolutions corresponding to the subtraction operation executed on the first target quantum state and the second target quantum state, that is, the number of iterations.

In a specific implementation, the quantum state evolution corresponding to the subtraction operation may be executed on the current first target quantum state and the second target quantum state, so as to obtain the first target quantum state including the subtraction operation result;

For the third target quantum state of the current first preset auxiliary qubit and the fourth target quantum state of the current second preset auxiliary qubit, execute the quantum state evolution corresponding to the subtraction operation, so as to increment the value included in the current third target quantum state by 1; wherein, the initial value included in the third target quantum state and the value included in the fourth target quantum state are both −1;

Measuring the sign-bit sub-quantum state of the first target quantum state currently including the subtraction operation result, and determining whether the value of the sign bit of the first target quantum state currently including the subtraction operation result is 0;

In the case that the value of the sign bit of the first target quantum state currently including the subtraction operation result is 0, return to the step of executing the quantum state evolution corresponding to the subtraction operation for the current first target quantum state and the current second target quantum state, until it is determined that the value of the sign bit of the first target quantum state currently including the subtraction operation result is 1.

For Example: the current first target quantum state and the current second target quantum state are |00111⟩ and |00100⟩. Perform the quantum state evolution corresponding to the subtraction operation on |00111⟩ and |00100⟩ to subtract the value 00111 included in |00111⟩ from the value 00100 included in |00100⟩, and obtain the first target quantum state |00011⟩ including the subtraction operation result 00011, while the second target quantum state |00100⟩ remains unchanged;

Obtain 4 bits "r.sign, r2, r1, r0" of the first preset auxiliary qubit, the current third target quantum state of "r.sign, r2, r1, r0" is the initial state, which can be set as |1001⟩. That is, the initial value included therein is −1. Also, obtain 4 bits "d.sign, d2, d1, d0" of the second preset auxiliary qubit, and the current fourth target quantum state of "d.sign, d2, d1, d0" is also |1001⟩;

Here, the quantum state of a qubit is usually initialized as |0⟩, and by applying a quantum logic gate operation such as the X gate to the corresponding qubit to invert the |0⟩ state, a |1⟩ state may be obtained;

Then, the quantum state evolution corresponding to the subtraction operation is executed on the current third target quantum state |1001⟩ and the current fourth target quantum state |1001⟩, so as to subtract the value 1001 included in |1001⟩ from the value 1001 included in |1001⟩ to obtain the third target quantum state |0000⟩ including the subtraction result 0, while the fourth target quantum state |1001⟩ remains unchanged, thereby realizing incrementing by 1 for the value −1 of the original third target quantum state |1001⟩;

By applying a measurement operation to the qubit "a3" corresponding to the sign-bit sub-quantum state of the first target quantum state, it is measured the sign-bit sub-quantum state of the current first target quantum state |00011⟩ that includes the subtraction operation result to be |0⟩, that is, the value of the sign-bit is 0. Return to the step of executing the quantum state evolution corresponding to the subtraction operation for the current first target quantum state and the current second target quantum state:

At this time, for the current first target quantum state is |00011⟩ and the current second target quantum state |00100⟩, continue to execute the quantum state evolution corresponding to the subtraction operation, to obtain the first target quantum state |10001⟩ and the second target quantum state |00100⟩;

For the current third target quantum state |0000⟩, and the current fourth target quantum state |1001⟩, continue to execute the quantum state evolution corresponding to the subtraction operation, and get: the third target quantum state |0001⟩, and the fourth target quantum state |1001⟩, thereby the value 0 of the original third target quantum state |0000⟩ continues to increment by 1;

It is measured that the sign-bit sub-quantum state of the current first target quantum state |10001⟩ is |1⟩, that is, the value of the sign bit is 1, indicating that the dividend 7 is reduced to a negative number after two subtractions, and the iteration ends. It can be seen that the final number of iterations is 1, and the third target quantum state plays the role of counting.

Specifically, the finally obtained third target quantum state may be output, wherein the value contained in the third target quantum state is a quotient of dividing the dividend data by the divisor data.

Still referring to the above example, the third target quantum state finally obtained after the iteration is |0001⟩, including the value 0001, which are the integer part s of the quotient of dividing the dividend 7 by the divisor 4. The third target quantum state |0001⟩ may be output directly, alternatively, the value contained in the third target quantum state may be transformed into the decimal value 1 and output.

S5203. For a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits;

Specifically, said "for a current first target quantum state and a current second target quantum state, iteratively executing quantum state evolution corresponding to fractional part operation of the quotient" may include:

S52031, inverting the sign-bit sub-quantum state of the current second target quantum state, executing the quantum state evolution corresponding to the subtraction operation for the current first target quantum state and the second target quantum state with its sign bit inverted, so as to evolve the current first target quantum state to a quantum state including a binary value of a remainder of dividing said dividend data by said divisor data;

S52032, left-shifting sub-quantum state of each bit of the current first target quantum state by one bit, and re-inverting the sign-bit sub-quantum state of the current second target quantum state; for the first target quantum state that has been left-shifted by one bit and the second target quantum state that has been re-inverted, iteratively executing quantum state evolution corresponding to the subtraction operation, counting the number of executions of the subtraction operation until the first target quantum state that has been left-shifted by one bit is reduced to a negative number, and obtaining a fractional part quantum state including a binary value of the counting result on a preset intermediate bit qubit;

S52033, swapping a sub-quantum state of the last bit of the fractional part quantum state with the initial quantum state |0⟩ of the corresponding preset precision bit qubit, and outputting a quantum state on the preset precision bit qubit after swapping;

S52034, returning to execute the step of "inverting the sign-bit sub-quantum state of the current second target quantum state, executing the quantum state evolution corresponding to the subtraction operation for the current first target quantum state and the second target quantum state with its sign bit inverted", until a preset number of iterations required for the quantum state evolution corresponding to the iterative execution of the fractional part operation of the quotient is reached, wherein the preset number of iterations is equal to the number of precision bits in the fractional part to be operated.

For Example: for the first target quantum state |10001⟩, the second target quantum state |00100⟩, the third target quantum state |0001⟩, and the fourth target quantum state |1001⟩, the fractional part of the quotients retain a 3-bit precision.

The First Iteration: Step 1: Invert the sign-bit sub-quantum state |0⟩ of the second target quantum state, the inverted second target quantum state is |10100⟩. For the current first target quantum state |10001⟩ and the inverted second target quantum state |10100⟩, executing quantum state evolution corresponding to the subtraction operation, the evolved first target quantum state is 100011⟩, and the evolved second target quantum state is |10100⟩; in fact, the binary value 00011 (decimal value 3) contained in |00011⟩ is the remainder of dividing the dividend 7 by the divisor 4.

Step 2: Left-shift the first target quantum state |00011⟩ integrally by one bit to become |00110⟩, and then invert the sign bit of the second target quantum state |00100⟩ to restore it to |10100⟩, and then iteratively execute the quantum state evolution corresponding to the subtraction operation on |00110⟩ and |00100⟩, and count the number of iterations here until |00110⟩ is reduced to a negative number, and save the counting result to the fractional part quantum state of the preset intermediate qubits cc.sign, cc2, cc1, cc0, and finally get: the first target quantum state |10010⟩, the second target quantum state |00100⟩, and the fractional part quantum state |0001⟩;

It is to be noted that the principle is the same as the abovementioned "for the first target quantum state and the second target quantum state, iteratively executing quantum state evolution corresponding to a subtraction operation, counting the number of executions of the subtraction operation until the dividend data is reduced to a negative number", which is actually to execute division operation on |00110⟩ and |00100⟩.

Step 3: Use the SWAP gate to swap a sub-quantum state |1⟩ of the last bit of the fractional part quantum state |0001⟩ with the initial quantum state |0⟩ of the corresponding preset precision bit qubit f2, and output the quantum state |1⟩ of f2 after swapping, the fractional part quantum state becomes |0000⟩; wherein, the preset precision bit qubits can be set to 3 bits as f2, f1, f0, in the first iteration, a sub-quantum state of the last bit of the fractional part quantum state is output to f2, and the second iteration is output to f1, the third iteration is output to f0.

The second iteration: the current first target quantum state |10010⟩, the current second target quantum state |00100⟩, and the current fractional part quantum state |0000⟩, return to step 1-step 3, swap the sub-quantum state of the last bit of the fractional part quantum state with the initial quantum state |0⟩ of f1, and output the quantum state of f1 after swapping, and finally obtain: the current first target quantum state |10100⟩, the current second target quantum state |00100⟩, the quantum state |1⟩ of f2, and the fractional part quantum state |0000⟩.

The third iteration: the current first target quantum state |10100⟩, the current second target quantum state |00100⟩, and the current fractional part quantum state |0000⟩, return to execute step 1-step 3, swap the sub-quantum state of the last bit of the fractional part quantum state with the initial quantum state |0⟩ of f1, and output the quantum state of f0 after swapping, and finally obtain: the current first target quantum state |10100⟩, the current second target quantum state |00100⟩, the quantum state |0⟩ of f0, and the fractional part quantum state |0000⟩.

Figure 50:
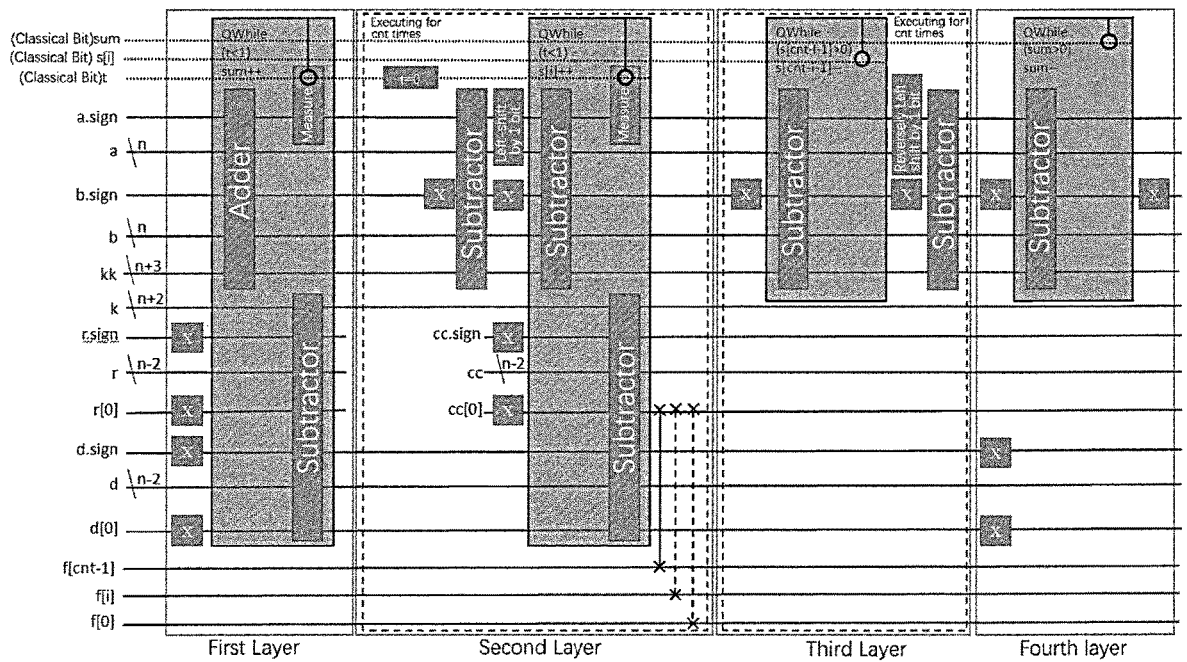
FIG. 50 is a schematic illustration of a quantum circuit of a method for quantum division operation with precision provided in an embodiment of the present disclosure.

For Example: FIG. 50 is a schematic illustration of a quantum circuit for executing quantum division with precision. As shown in FIG. 50, t is the classical bit for storing the measurement result, a.sign and a are qubits for encoding the sign and value of the dividend data, corresponding to the first target quantum state;

b.sign, b is the qubit for encoding the sign and value of the divisor data, corresponding to the second target quantum state;

r.sign, r, r[0] form the first preset auxiliary qubits; r.sign is the qubit for encoding the sign of the quotient; r, r[0] are the qubits for encoding the value of the quotient, r[0] is the lowest bit;

d.sign, d, d[0] form the second preset auxiliary qubit, d.sign encodes the sign bit, and d encodes the value bit, wherein, d[0] is the lowest bit; the second preset auxiliary qubit corresponds to the fourth target quantum state whose initial state of is 0 state; use the X gate to invert the sign-bit sub-quantum state corresponding to d.sign and the value bit sub-quantum state corresponding to d[0], to obtain the fourth target quantum state including a value of −1, which is used for increment-by-one operations in the subtractor to play the role of counting;

kk is the auxiliary qubit required by the subtractor module in the upper half of the circuit, a total of n+3 bits, and k is the auxiliary qubit required by the subtractor module in the lower half of the circuit, a total of n+2 bits, the n+2 bits uses in total the first (n+2) auxiliary qubits in kk. The difference in the figure shows that kk actually contains k; f[cnt-1], f[i], f[0] represent preset precision bit qubits;

The subtractor module is a functional module that executes the quantum state evolution corresponding to the subtraction operation. X represents the quantum logic gate X gate, and Qwhile represents the quantum iterative operation. The execution timing of the quantum circuit is from the first layer to the fifth layer:

The first layer: the measurement operation in Qwhile is used for measuring the value of a.sign and store it in the classical bit t. When t<1, execute the iterative operation in Qwhile, and execute sum++, and store the sum value in the corresponding classical bit (the initial value of sum is 0), and the iteration ends when t reaches 1;

The second layer: the number of iterations of the second layer is cnt times, and cnt is the fractional part precision of the required quotient. In each iteration of the second layer, this layer Qwhile also needs to execute corresponding iterations. The t=0 module means that t is set to 0; cc.sign, cc, cc[0] represent the preset intermediate bit qubits, where ec.sign represents the sign bit; the measurement operation in this layer Qwhile is used for measuring the value of a.sign and store it on the classical bit t, when t<1 execute the iterative operation in Qwhile, and execute s[i]++, store the value of s[i] on the corresponding classical bit (the initial value of s[i] is 0, i=0, 1, 2 . . . indicates the i-th iteration of the second layer), and the iteration in Qwhile ends when t reaches 1; a solid vertical line and two dashed vertical line icons at the bottom right of the second layer represent a quantum logic gate SWAP gate;

The third layer: the number of iterations of the third layer is cnt times, when s[cnt−i−1]>0, execute the iterative operation of the subtractor in this layer Qwhile, and execute s[cnt−i−1]−− until s[cnt−i−1] it is less than or equal to 0 and the iteration in Qwhile ends; the operation of inverse left shift by one bit is the inverse operation of left shift by one bit;

The fourth layer: when sum>0, execute the iterative operation of the subtractor in this layer Qwhile, and execute sum - -, until the sum is less than or equal to 0 and end the iteration in Qwhile; the two X gates at the bottom left of the fourth layer are used for inverting the quantum states of d.sign and d[0] again to implement restoration to the initial state.

Further, after the third and fourth layers of operations, s[i] and sum can be restored to the initial value 0, and a.sign, a, b.sign, b, d.sign, d[0] can be restored to the initial state, the integer part s of the quotient are obtained on r, and the fractional part of the preset precision of the quotient are obtained on f, and the quantum state of the auxiliary qubits will be restored so that they can be reused.

S5204. Outputting the finally obtained quantum state on qubits with preset precision, where the quantum state includes a binary value of fractional part of the quotient.

Continuing to take the above as an example, after three iterations, the quantum states of the 3-bit preset precision bit qubits f2, f1, and f0 are finally obtained as $|1\rangle|1\rangle|0\rangle = |110\rangle$, i.e., the binary value of the fractional part of the quotient is 110 (0.75 in decimal). The integer binary value of the quotient obtained from the above computing is 0001 (1 in decimal), thereby obtaining the final quotient 1.75 of the dividend 7 divided by the divisor 4.

In practical applications, where either of the dividend and/or divisor is a negative number, the preset sign-bit-qubit may further be obtained, to execute a preset quantum logic gate operation on the qubit corresponding to the sign-bit sub-quantum state of the first target quantum state, the qubit corresponding to the sign-bit sub-quantum state of the second target quantum state, the first preset auxiliary qubit and the preset sign-bit-qubit, so as to finally obtain the sign value represented by the sign-bit sub-quantum state in the third target quantum state.

Figure 51:
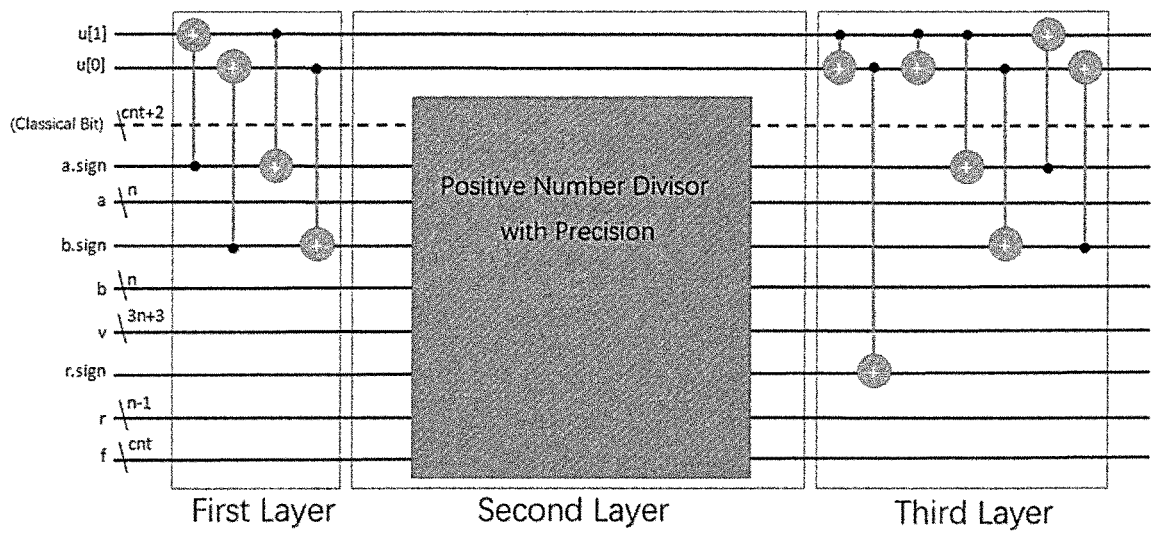
FIG. 51 is a schematic illustration of a quantum circuit of a method for quantum division operation with precision provided by another embodiment of the present disclosure.

For Example: FIG. 51 is a schematic illustration of a quantum circuit for a quantum division operation with precision, which supports sign bit operations. Here, the positive number divider with precision is the quantum circuit shown in FIG. 50, and the sign-bit-qubits $u_{[0]}$, $u_{[1]}$ are added. The circle icons connected with a vertical line represent a quantum logic gate CNOT gate, the qubit corresponding to the time line where the big circle is located is the controlled bit, and the qubit corresponding to the time line where the solid point is located is the controlling bit; The classical bits have a total of cnt+2 bits, including in FIG. 50: 1 bit of sum, ent bits of s[i], 1 bit of t. "v" is a auxiliary qubit including total of 3n+3 bits, including in FIG. 50: n+3 bits of kk, n bits of d.sign and d, and n bits of cc.sign and cc.

By applying a series of CNOT gates as shown in FIG. 51 to $u_{[0]}$, $u_{[1]}$, a.sign, b.sign, r.sign, a sign-bit sub-quantum state including the sign value of the quotient can finally be obtained on r.sign.

The specific implementation of the quantum state evolution corresponding to the subtraction operation is described in detail below.

Specifically, the quantum state evolution corresponding to the subtraction operation can be executed through the subtractor, which can include:

S5301. For the two quantum states to be operated, i.e., the minuend quantum state including the minuend data and the subtrahend quantum state including the subtrahend data respectively, obtaining the quantum state of the third preset auxiliary qubit; according to the sign-bit sub-quantum state in the minuend quantum state and the quantum state of the third preset auxiliary qubit, control the minuend quantum state to execute quantum state evolution corresponding to the complement operation so as to obtain the first complement quantum state, wherein the first complement quantum state is a quantum state including the complement of the minuend data;

As can be seen from the foregoing embodiments, the two quantum states to be operated have the following groups: one consisting of the first target quantum state and the second target quantum state; one consisting of the third target quantum state and the fourth target quantum state; and one consisting of the first target quantum state and the second target quantum state after the sign-bit-inversion. Here, the former can be called the minuend quantum state, and the data contained therein is called the minuend in the subtraction operation, and the latter can be called the subtrahend quantum state, and the data contained therein is called the subtrahend.

This embodiment is mainly used for implementing the function of the subtractor. The biggest difference between the subtractor and the adder in the following text is that, the subtractor may produce a negative number. Therefore, a binary handling way is used in which a sign bit is added to both the subtrahend and the minuend so as to represent the positive and negative sign of the value, and use the complement to execute the operation. The complement of positive numbers remains unchanged, while negative numbers are bitwise inverted and increment by 1 except for the sign bit. In a corresponding instance of the quantum circuit, the sign bit is used for controlling whether to execute the complement operation, the X gate is used for inversion, and the increment by 1 can be realized through the adder. In the case of complement, after the operation is completed, and the target value is obtained after execution of a further complement operation on the result. The minuend data and the subtrahend data to be operated are obtained, and the minuend data and the subtrahend data are transformed respectively into a first target quantum state and a second target quantum state. Here, the target quantum state includes: a sign-bit sub-quantum state representing the data sign and a value bit sub-quantum state representing the data value.

Specifically, according to the sign-bit sub-quantum state in the minuend quantum state and the quantum state of the third preset auxiliary qubit, by controlling the minuend quantum state to execute quantum state evolution corresponding to the complement operation, a CNOT gate operation may be executed on the first sign-bit-qubit corresponding to the sign-bit sub-quantum state in the minuend quantum state, and on the third preset auxiliary qubit, wherein the first sign-bit-qubit is a controlling bit, and the third preset auxiliary qubit is a controlled bit. Moreover, it is reasonable and feasible to substitute the CNOT gate with other existing quantum logic gates or combinations of logic gates that are equivalent.

According to the quantum state of the third preset auxiliary qubit after execution of the CNOT gate operation, control whether the current minuend quantum state executes the quantum state evolution corresponding to the complement operation;

If yes, invert the non-sign-bit sub-quantum state of the current minuend quantum state, and for the inverted minuend quantum state and the quantum state $|1\rangle$ of the fourth preset auxiliary qubit, execute quantum state evolution corresponding to the addition operation, to obtain the evolved first complement quantum state, otherwise, the minuend quantum state is used as the first complement quantum state. Here, the quantum state evolution corresponding to the complement operation is controlled to be executed only when the quantum state of the third preset auxiliary qubit after execution of the CNOT gate operation can be $|1\rangle$, otherwise it will not be executed.

Execute a CNOT gate operation on the current first sign-bit-qubit and the third preset auxiliary qubit to restore the quantum state of the current third preset auxiliary qubit; wherein, the first sign-bit-qubit is a controlling bit, and the third preset auxiliary qubit is a controlled bit.

For Example: the minuend quantum state is assumed to be $|0011\rangle$. The sign-bit sub-quantum state of $|0011\rangle$ is the highest bit sub-quantum state, that is, the $|0\rangle$ state, the value of this bit is 0, the corresponding first sign-bit-qubit is set to g.sign, and the third preset auxiliary qubit is the preset qubit $q_1$, which is initially $|0\rangle$ state.

Execute the CNOT gate operation on g.sign and $q_1$, g.sign is used as the controlling bit, q1 is used as the controlled bit, and the quantum state of the g.sign bit is a $|0\rangle$ state. After the CNOT gate operation, the quantum state $|0\rangle$ of the controlled bit $q_1$ remains unchanged.

Since the quantum state of $q_1$ after execution of the CNOT gate operation is a $|0\rangle$ state, the quantum state evolution corresponding to the complement operation is not executed on the minuend quantum state. The principle is that when the minuend is a positive number, there is no need to complement it in the subtraction operation, or in other words, its complement is itself, i.e. the $|0011\rangle$ can be directly used as the first complement quantum state.

Finally, the CNOT gate can be executed again on the current g.sign and $q_1$. The quantum state of the g.sign bit is a $|0\rangle$ state. After the CNOT gate operation, the quantum state $|0\rangle$ of the controlled bit q1 remains unchanged, and $q_1$ is restored to the $|0\rangle$ state, thereby releasing information stored in the third auxiliary qubit. It can be seen that the value 0011 contained in the first complement quantum state is the complement of the minuend 0011.

Figure 52:
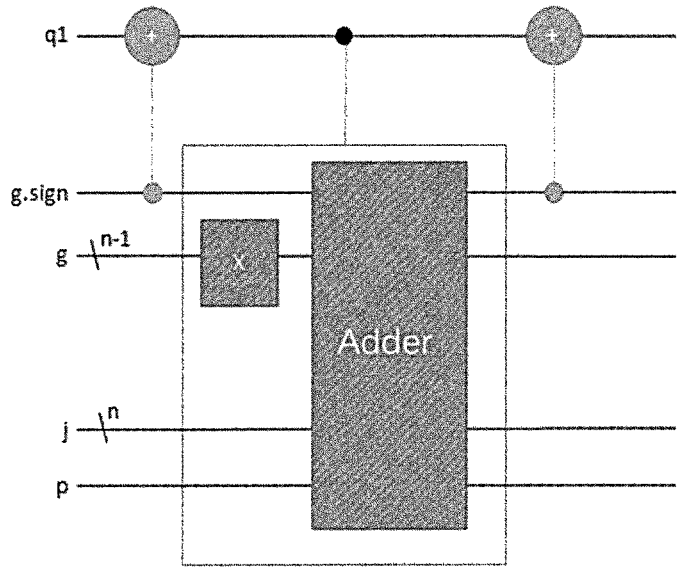
FIG. 52 is a schematic illustration of a quantum circuit for complement operation provided in an embodiment of the present disclosure.

As shown in FIG. 52, $q_1$ is the third preset auxiliary qubit, which is used for controlling whether to execute complement operation; the first target quantum state is g, and g.sign is the sign-bit sub-quantum state in the first target quantum state, the remaining of g is the value bit sub-quantum state representing the data value, j is the fourth preset auxiliary qubit, that is, an auxiliary qubit set to a value of 1, and p is an auxiliary qubit used by the adder (the fifth preset auxiliary qubit described below). Corresponding to FIG. 50, the above k is n+2 bits, i.e., it includes: n bits of j, 1 bit of p, and 1 bit of $q_1$.

The quantum circuit shown in FIG. 52 realizes the quantum circuit that executes the complement operation on g, first executes the CNOT gate operation on g.sign and $q_1$, so that $q_1$ temporarily represents g.sign, and uses $q_1$ to control whether to execute the computing Complement, after finding the complement, restore $q_1$, thereby controlling the minuend quantum state to execute the quantum state evolution corresponding to the complement operation to obtain the first complement quantum state.

Specifically, according to the sign-bit sub-quantum state of g, the first preset auxiliary qubit $q_1$ is used for controlling whether to execute the complement operation. If g is a negative number, the complement operation of the negative number is executed. The complement of a negative number is to increment by 1 after the bitwise inversion except the sign bit. If the operation of bitwise inversion except the sign bit is realized by logic gates, it is only necessary to execute X gates on all the value bits. Since increment by 1 is needed after inversion, therefore, by adding j and g, the value of j is set to 1. The "p" is the auxiliary qubit of the adder, upon adding g and j after inverting the value bits, what is stored on g is the value after the complement, then restore $q_1$ for the next use.

Example: when g is a negative number, g.sign is 1, and $q_1$ is also 1, and operations such as inversion need to be executed, and when g is positive, g.sign is 0, and $q_1$ is also 0, then there is no need to further execute a complement operation.

S5302. Executing the quantum state evolution corresponding to sign-bit-inversion on the sign-bit sub-quantum state in the subtrahend quantum state, and according to the sign-bit sub-quantum state after inversion and the quantum state of the third preset auxiliary qubit, controlling the current subtraction quantum state to execute the quantum state evolution corresponding to the complement operation to obtain the second complement quantum state; wherein, the second complement quantum state is a quantum state that includes the complement of the subtrahend data;

Specifically, the X gate operation can be executed on the second sign-bit-qubit corresponding to the sign-bit sub-quantum state in the subtrahend quantum state, to obtain the inverted sign-bit sub-quantum state; wherein, it is also reasonable and feasible to substitute the X gate with other existing quantum logic gates or combinations of quantum logic gates that are equivalent;

Similarly, continue to execute the CNOT gate operation on the current second sign-bit-qubit and the third preset auxiliary qubit, wherein the second sign-bit-qubit is a controlling bit, and the third preset auxiliary qubit is a controlled bit;

According to the current quantum state of the third preset auxiliary qubit after execution of the CNOT gate operation, control whether the current subtrahend quantum state executes the quantum state evolution corresponding to the complement operation;

if yes, invert the non-sign-bit sub-quantum state of the current subtrahend quantum state, and execute quantum state evolution corresponding to the addition operation on the subtrahend quantum state after the inversion and the quantum state $|1\rangle$ of the fourth preset auxiliary qubit, to obtain the evolved second complement quantum state, otherwise, use the current subtrahend quantum state as the second complement quantum state;

Execute a CNOT gate operation on the current second sign-bit-qubit and the third preset auxiliary qubit to restore the current quantum state of the third preset auxiliary qubit; wherein, the second sign-bit-qubit is a controlling bit, and the third preset auxiliary qubit is a controlled bit.

For Example: the minuend quantum state is assumed to be $|0100\rangle$. The sign-bit sub-quantum state of $|0100\rangle$ is the highest bit sub-quantum state, that is, the $|0\rangle$ state, the value of this bit is 0, the corresponding second sign-bit-qubit is set to "h.sign", and the current third auxiliary qubit is restored to the state |0⟩.

First, X gate may be executed on "h.sign", and invert the corresponding sign-bit sub-quantum state |1⟩ into |0⟩, and the subtrahend quantum state becomes |1100⟩.

Continue to execute the CNOT gate operation on "h.sign" and $q_1$, where "h.sign" is used as the controlling bit, $q_1$ is used as the controlled bit, the quantum state of the current h.sign bit is a |1⟩ state, after the CNOT gate operation, the quantum state |0⟩ of the controlled bit $q_1$ is inverted as a |1⟩ state.

The quantum state of $q_1$ after execution of the CNOT gate operation is |1⟩, and the quantum state evolution corresponding to the complement operation is executed on the current subtrahend quantum state |1100⟩. An implementation of the quantum state evolution corresponding to the complement operation is as follows:

Invert the non-sign-bit sub-quantum state of the current subtrahend quantum state |1100⟩, and execute quantum state evolution corresponding to the addition operation on the inverted subtrahend quantum state |1011⟩ and the quantum state |1⟩ of the fourth preset auxiliary qubit, to obtain the evolved second complement quantum state |1100⟩.

Here, the non-sign-bit sub-quantum state |100⟩ of |1100⟩ can be inverted by execution of a X gate; in order to keep the dimensions consistent, the fourth preset auxiliary qubit is a preset 4-bit qubit "j3, j2, j1, j0". The quantum state |1⟩ of the fourth preset auxiliary qubit is actually written as |0001⟩, the two are equivalent.

Finally, the CNOT gate can be executed again on the current h.sign and $q_1$. The quantum state of the "h.sign" bit is a |1⟩ state. After the CNOT gate operation, the quantum state |1⟩ of the controlled bit $q_1$ is inverted into |0⟩, thereby restoring $q_1$ to the initial |0⟩ state again, releasing the storage space of $q_1$. It can be seen that the value 1100 contained in the second complement quantum state is the complement of the subtrahend 1100 after executing the X gate on "h.sign".

Figure 53:
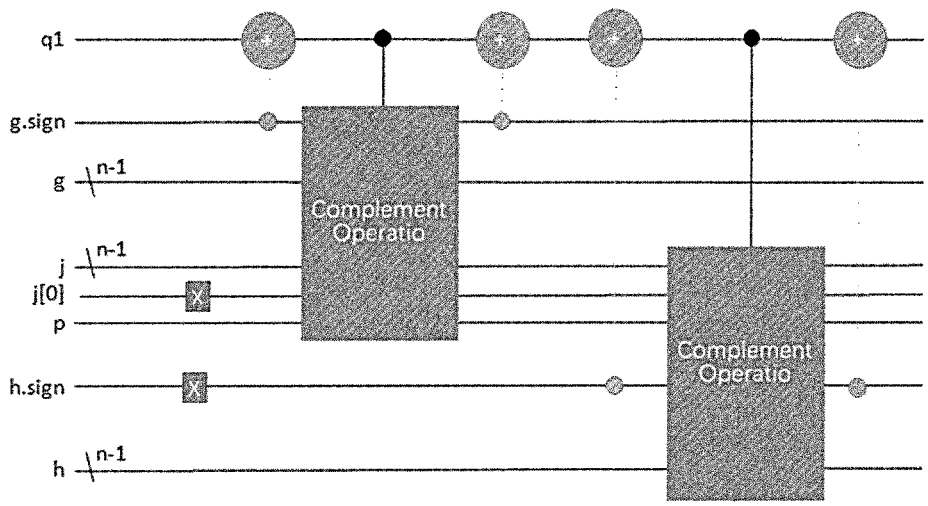
FIG. 53 is a schematic illustration of the first half of the quantum circuit corresponding to the subtractor provided in an embodiment of the present disclosure.

In this embodiment, similarly for the second target quantum state h: initially, the X gate is executed on $j_{[0]}$ to set the value to 1, and the X gate is executed on the sign-bit sub-quantum state "h.sign" in the second target quantum state to turn subtraction into addition. As shown in FIG. 53, FIG. 53 is a schematic illustration of the quantum circuit for the quantum state evolution corresponding to the complement operation executed on g and h, referring to a similar pattern to the above to execute the quantum state evolution corresponding to the complement operation on the second target quantum state "h", to obtain the second complement quantum state.

S5303. For the first complement quantum state and the second complement quantum state, executing quantum state evolution corresponding to the addition operation, so as to evolve the first complement quantum state into a fifth target quantum state including a sum of a complement of the minuend data and a complement of the subtrahend data;

For Example: for the first complement quantum state |0011⟩ and the second complement quantum state |1100⟩, the quantum state evolution corresponding to the addition operation is executed, and the first complement quantum state |0011⟩ is evolved into the fifth target quantum state |1111⟩.

In this embodiment, after the complement is obtained, the addition operation is executed on g and h. After the addition, the previous operation is restored, and the value stored in g is the desired value. Substituting the first complement quantum state and the second complement quantum state into the quantum circuit of the adder, to execute a quantum state evolution corresponding to the addition operation, thereby evolving the first complement quantum state to a third target quantum state including the sum of the complement of the minuend data and the complement of the subtrahend data.

S5304. According to the sign-bit sub-quantum state in the fifth target quantum state and the quantum state of the third preset auxiliary qubit, control the fifth target quantum state to execute the quantum state evolution corresponding to the complement operation, so as to obtain the evolved sixth target quantum state which is output as the subtraction result of subtracting the subtrahend data from the minuend data; wherein, the sixth target quantum state is a quantum state including a complement of the sum of the complement;

For Example: according to the sign-bit sub-quantum state |1⟩ in the current fifth target quantum state |1111⟩ and the current quantum state |0⟩ of the third preset auxiliary qubit, control the fifth target quantum state |1111⟩ to execute the quantum state evolution corresponding to the complement operation, and obtain the evolved sixth target quantum state |1001⟩ including the value 1001 (decimal −1), which is the subtraction result of subtracting the subtrahend 0100 (decimal 4) contained in the subtrahend quantum state |0100⟩ from the minuend 0011 (decimal 3) contained in the minuend quantum state |0011⟩.

It is to be noted that the quantum state evolution corresponding to the complement operation can be in the same way as the above. After the evolution, the quantum state of the third preset auxiliary qubit is still restored to |0⟩ to facilitate subsequent computing.

S5305. According to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit-inversion for the sign-bit sub-quantum state in the current subtrahend quantum state, so as to restore the current subtrahend quantum state.

For Example: the current subtrahend quantum state is the second complement quantum state |1100⟩, and the current quantum state of the third preset auxiliary qubit is |0⟩. Continue to follow a similar pattern to the above to control |1100⟩ to execute the quantum state evolution corresponding to the complement operation, and then obtain the evolved quantum state of |1100⟩, and then use the X-gate operation to invert the sub-quantum state of its sign bit, and restore it to the initial subtrahend quantum state |0100⟩.

Figure 54:
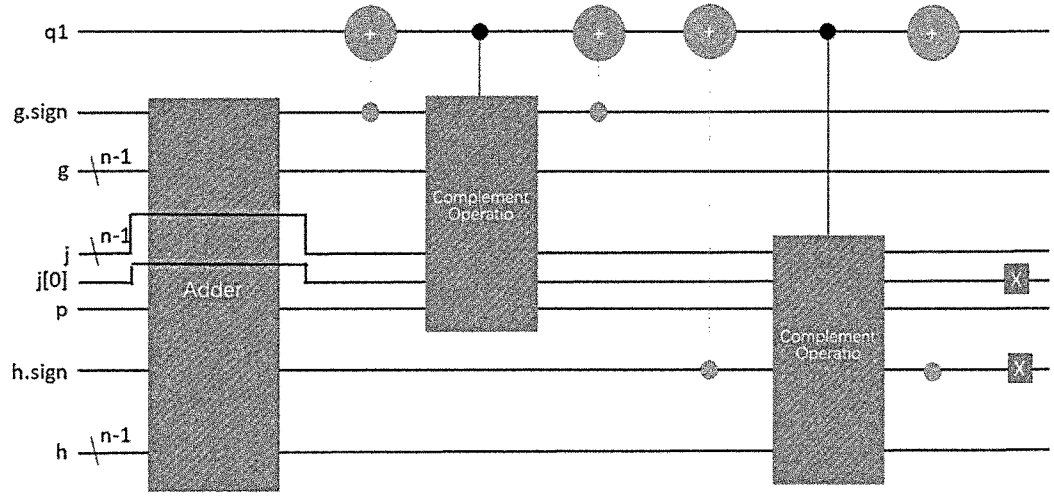
FIG. 54 is a schematic illustration of the second half of the quantum circuit corresponding to the subtractor provided in an embodiment of the present disclosure.
Figure 55:
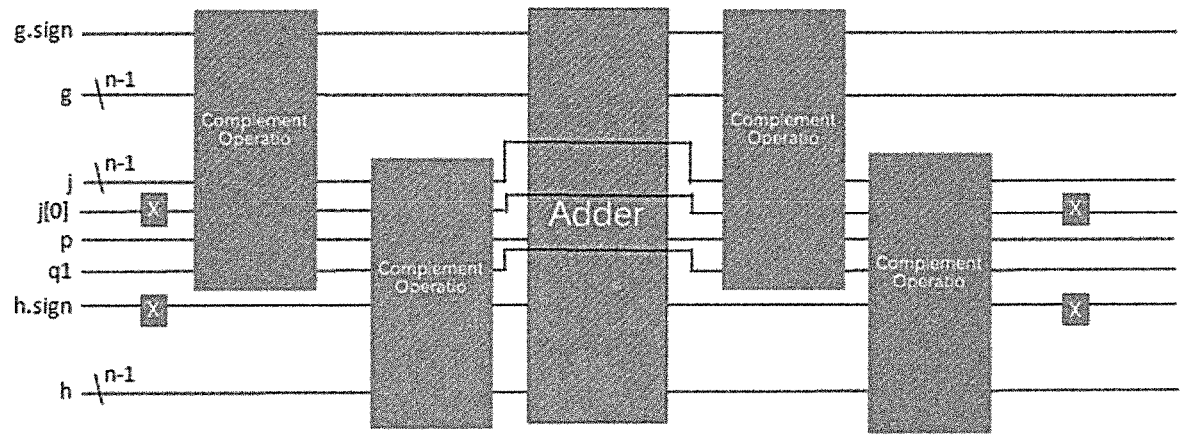
FIG. 55 is a schematic illustration of a quantum circuit corresponding to a subtractor provided in an embodiment of the present disclosure.

In this embodiment, after the addition operation, the quantum state evolution corresponding to the complement operation is further executed on the third target quantum state of the sum of the complement of the minuend data and the complement of the subtrahend data. As shown in FIG. 54, first, the purpose of executing an X gate on $j_{[0]}$ is to set the value of $j_{[0]}$ to 1, which is convenient for the +1 operation in the complement. The reason for executing the X gate operation on the sign bit of h is to transform g−h to g+(−h). Then, we execute the complement operation on both g and h. After the execution is completed, add the complements of g and h. After obtaining the result, we execute a further complement operation on g and h to restore to the normal value, and finally restore the initial operation, that is, to restore the auxiliary qubits, which is to execute X gate twice. Thus, the quantum circuit diagram of the entire subtractor as shown in FIG. 55 is formed, which is a simple functional example.

The specific implementation of the quantum state evolution corresponding to the addition operation is described in detail below.

Specifically, the quantum state evolution corresponding to the addition operation can be executed through the adder, which may include:

S5401, according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules;

It can be seen from the foregoing that the two quantum states to be operated may be: the first complement quantum state and the second complement quantum state; the inverted minuend quantum state and the quantum state |1⟩ of the fourth preset auxiliary qubit.

Figure 56:
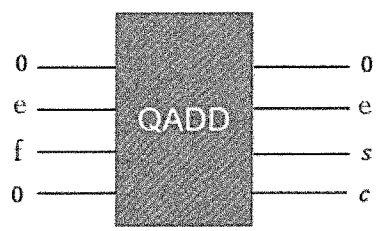
FIG. 56 is a schematic illustration of an adder provided in an embodiment of the present disclosure.

For Example: as shown in FIG. 56, the first qubit in the circuit is the fifth preset auxiliary qubit, which is initially a |0⟩ state and will eventually return to a |0⟩ state, "e" and "f" are the quantum states corresponding to the data to be added, each corresponding to a group of qubits. "c" represents the final carry item, corresponding to the preset carry auxiliary qubit, and "s" is the output bit that does not include a carry bit. It is generally required that the bit number of qubits corresponding to "e" equals to that corresponding to "f", and the bit number of "s" equal to those of "e" and "f".

Figure 57:
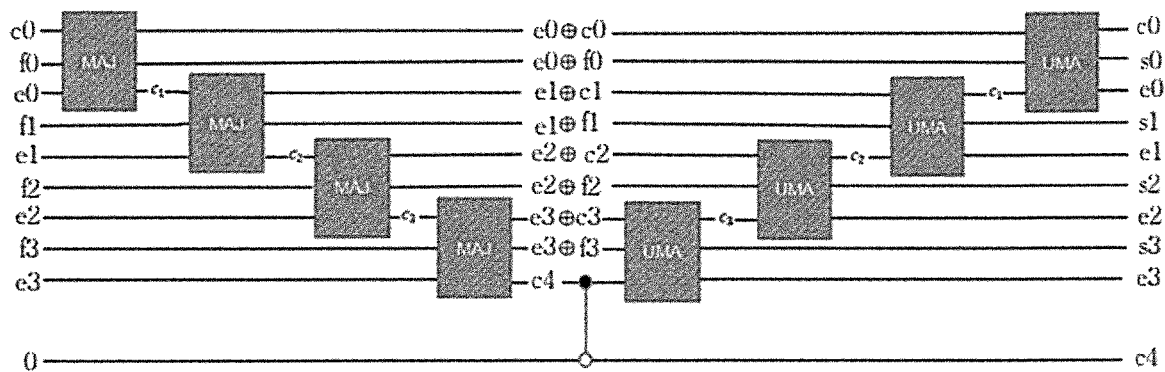
FIG. 57 is a schematic illustration of an adder quantum circuit provided in an embodiment of the present disclosure.

For Example: as shown in FIG. 57, $e_{[i]}$ and $f_{[i]}$ are respectively the i-th bit of the quantum state corresponding to the two addends, and $c_{[i]}$ is the previous-stage carry.

$$s_{[i]} = e_{[i]} \text{ XOR } f_{[i]} \text{ XOR } c_{[i]},$$

$$c_{[i+1]} = (e_{[i]} \text{ AND } f_{[i]}) \text{XOR}(e_{[i]} \text{ AND } f_{[i]}) \text{XOR}(e_{[i]} \text{ AND } f_{[i]}),$$

Here, the first qubit is the fifth preset auxiliary qubit, corresponding to $c_0$ in the quantum circuit. The first MAJ module includes three input quantum states and three corresponding output quantum states, the three input quantum states being $c_0$, $e_0$, and $f_0$, where $e_0$ is the 0th-bit quantum state of the first quantum state to be operated, $f_0$ is the 0th quantum state of the second quantum state to be operated, $c_0$ is the quantum state of the fifth preset auxiliary qubit, and the initial value is 0, that is to say there is no carry. The three output quantum states are respectively $e_0 \oplus c_0$, $e_0 \oplus f_0$, and $c_1$, where $c_1$ is the carry after the addition of $e_0$ and $f_0$. Similarly, the three input quantum states of the next MAJ module are $c_1$, $e_1$, and $f_1$, and the three output quantum states are respectively $e_1 \oplus c_1$, $e_1 \oplus f_1$, and $c_2$, and so on to the last MAJ module.

For the first UMA module, it includes three input quantum states and three corresponding output quantum states, where the three output quantum states of the MAJ module correspond to the three input quantum states of the UMA module, and the three output quantum states are respectively $c_0$, $s_0$, $e_0$, where $s_0$ is the carry-free result of adding $e_0$ and $f_0$. Similarly, $s_1$ is the carry-free result of adding $e_1$ and $f_1$, and so on, the $c_4$ is the final carry item. It is to be noted that, in practical applications, where there is no need to calculate the final carry, the qubit corresponding to $c_4$ does not have to be provided in the quantum circuit.

Moreover, the number of the MAJ modules and the number of UMA modules can be determined according to the number of sub-quantum state s contained in any quantum state to be operated, one sub-quantum state corresponding to one qubit, wherein the number of the MAJ modules is equal to the number of UMA modules. What is shown in the figure is only an example, 4 qubits are required for encoding each of "e" and "f", and the number of MAJ modules and that of UMA modules are both 4. The MAJ module and the UMA module constitute the front and rear cascading units of the adder. The MAJ module can be used for extracting the carry term of any step and pass it to the next stage to calculate the final carry term. The UMA module not only extracts the information of "c" and transmits it to the previous-stage UMA, but also calculates the "s" (result item) of each stage and recovers the information of "e".

For Example: When 4 (corresponding encoding is expressed in a 3-qubit quantum state as 100)+2 (corresponding encoding is expressed in a 3-qubit quantum state as 010)=6 (corresponding encoding is expressed in a 3-qubit quantum state as 110). At this time, the bit number of qubits encoding the operation result is the same as the bit number of qubits encoding "e" or the bit number of qubits used for encoding "f", and the number of the MAJ modules and the number of UMA modules are both 3.

For Example: When 4 (corresponding encoding is expressed in a 3-qubit quantum state as 100)+7 (corresponding encoding is expressed in a 3-qubit quantum state as 111)=11 (corresponding encoding is expressed in a 3-qubit quantum state as 011). However, it can be understood that the binary number corresponding to 11 is 1011, and the bit where the leftmost 1 is located is a carry item, which can be represented by an auxiliary qubit. At this time, the bit number of qubits encoding the operation result is greater than the bit number of qubits encoding "e" or the bit number of qubits used for encoding "f", and the number of the MAJ modules and the number of UMA modules are both 3.

For Example: when 2 (corresponding encoding is expressed in a 2-qubit quantum state as 10)+4 (corresponding encoding is expressed in a 3-qubit quantum state as 100)=6 (corresponding encoding is expressed in a 3-qubit quantum state as 110). At this time, the numerical item "3" encoding the numerical value of "6" equals to the number of quantum states of the qubit encoding "b", and the number of the MAJ modules and the number of UMA modules are both 3.

S5402. According to the addition instruction, cascading the MAJ modules and UMA modules in the target module number, to generate a target quantum circuit corresponding to the adder;

Here, the MAJ module and the UMA module each includes three input items and three output items, and according to an addition instruction, the three output items of an MAJ cascading module can be used as three inputs of a corresponding UMA cascading module, to cascade the MAJ cascading module with the corresponding UMA cascading module to generate a target quantum circuit corresponding to an adder, wherein the MAJ cascading module is determined by cascading between MAJ modules in the target module number, and the UMA cascading module is determined by cascading between UMAmodules in the target module number.

Specifically, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated;

Then, according to the addition instruction, using the carry output item output by the previous MAJ module and the two sub-quantum state input items to be operated as the three input items of the next MAJ module, so as to cascade the MAJ modules in the target module number;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder. If the carry item is not needed, the CNOT gate and the carry auxiliary qubit does not have to be provided.

In this embodiment, as shown in FIG. 57, according to the figure, use the three output bits of the MAJ module as the three input bits of the UMA module, thereby cascading the same number of MAJ modules and UMA modules to generate a target quantum circuit corresponding to an adder. Here, the hollow circles and solid circles connected in the circuit diagram represent CNOT gate operations, the hollow circles correspond to qubits as controlling bits, and the solid circles correspond to those as controlled bits.

Here, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, and the embodiment further includes, before said step "cascading the MAJ modules in the target module number with the UMA modules in the target module number, so as to generate a target quantum circuit corresponding to the adder": obtaining operation qubits corresponding to the two CNOT quantum logic gates and one TOFFOLI quantum logic gate, the control relationship between the operation qubits and the timing relationship between the two CNOT quantum logic gates and one TOFFOLI quantum logic gate; according to the operation qubits, the control relationship and the timing relationship, use the two CNOT quantum logic gates and one TOFFOLI quantum logic gate to construct and generate the MAJ quantum circuit or the UMA quantum circuit as a corresponding MAJ module or a corresponding UMA module.

Figure 58:
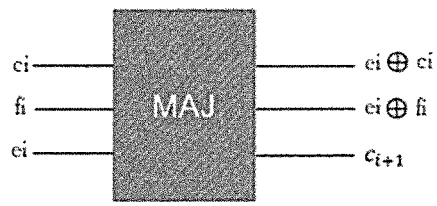
FIG. 58 is a schematic illustration of the MAJ module provided in an embodiment of the present disclosure.
Figure 59:
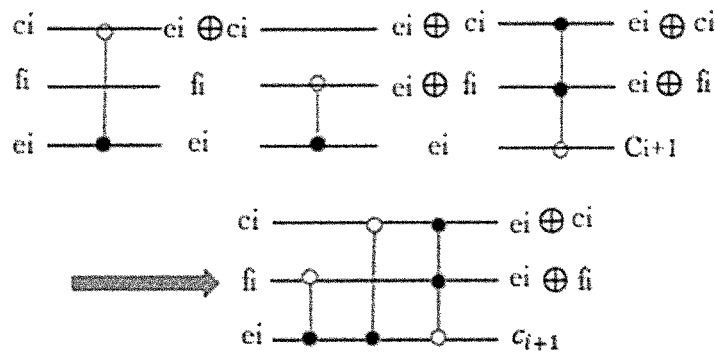
FIG. 59 is a schematic illustration of the MAJ module quantum circuit combination process provided in an embodiment of the present disclosure.

In this embodiment, the MAJ module and the UMA module constitute the front and rear cascading units of the adder. As shown in FIG. 58, the MAJ module is used for extracting the carry item after each stage of addition and pass it to the next stage, so as to calculate the final carry item. Here, as shown in FIG. 59, the MAJ module may be mainly composed of three logic gates, namely two CNOT gates and one Toffoli gate. The role of the CNOT gate (the first and second logic gates from left to right in FIG. 59) is to add the controlling bit to the target bit to form a modulo 2 addition, which is an exclusive OR operation, and get $(e_i+c_i)\%2$, $(e_i+f_i)\%2$, the order of the two CNOT gates can be swapped. The function of the Toffoli gate (the third logic gate from left to right in FIG. 12) is to add both controlling bits to the target bit to get the carry item $c_{[i+1]}=(e_{[i]} \text{ AND } f_{[i]})$ XOR $(e_{[i]} \text{ AND } f_{[i]})$ XOR $(e_{[i]} \text{ AND } f_{[i]})$. That is, to implement $e_i \oplus c_i$ through the first CNOT gate from left to right in FIG. 59, to implement $e_i \oplus f_i$ through the second CNOT gate from left to right in FIG. 59, and to implement $c_{i+1}$ through the third TOFFOLI gate from left to right in FIG. 59, thereby forming the front-stage cascading unit of the quantum adder with two CNOT gates and one TOFFOLI gate.

Example 1: $e_i$ is 1, $f_i$ is 1, and $c_i$ is 1.

The MAJ module starts by adding $e_i$ to $c_i$, the value of $c_i$ becomes 0, then adds $e_i$ to $f_i$, the value of $f_i$ also becomes 0, and finally adds $f_i$ and $c_i$ to $e_i$, the value of $e_i$ becomes 1, that is, the carry of $c_{i+1}$ is 1.

Example 2: $e_i$ is 0, $f_i$ is 1, and $c_i$ is 1.

The MAJ module starts by adding $e_i$ to $c_i$, the value of $c_i$ becomes 1, then adds $e_i$ to $f_i$, the value of $f_i$ also becomes 1, and finally adds $f_i$ and $c_i$ to $e_i$, the value of $e_i$ becomes 1, that is, the carry of $c_{i+1}$ is 1.

Figure 60:
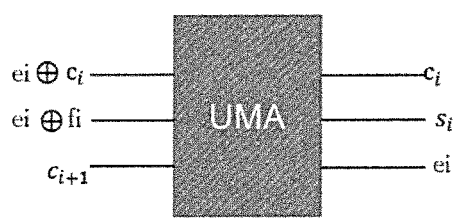
FIG. 60 is a schematic illustration of a UMA module provided in an embodiment of the present disclosure.
Figure 61:
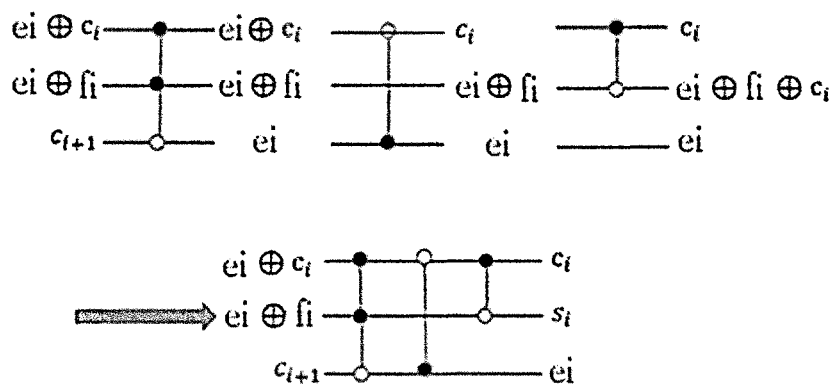
FIG. 61 is a schematic illustration of the UMA module quantum circuit combination process provided in an embodiment of the present disclosure.

As shown in FIG. 60, the UMA module is used as the rear-stage of the cascaded adder. The implementation of a UMA module is similar to that of an MAJ module. As shown in FIG. 61, the Toffoli gate (the first logic gate from left to right in FIG. 61) is first used for restoring $c_{i+1}$ to $e_i$, and then use $e_i$ to restore $(e+c)\%2$ with the CNOT gate (the second logic gate from left to right in FIG. 61), and $(e_i+c_i \text{ y }\%2$ is restored to $c_i$, and finally, use $c_i$ to execute a CNOT gate (the third logic gate from left to right in FIG. 61) on $(e_i+f_i)\%2$, getting the final result of the current bit $s_{[i]}=e_{[i]}$ XOR $f_{[i]}$ XOR $c_{[i]}$.

Example 1: $(e_i+c_i)\%2$ is 0, $(e_i+f_i)\%2$ is 0, $c_{i+1}$ is 1.

Start by adding $(e_i+c_i)\%2$ and $(e_i+f_i)\%2$ to $c_{i+1}$, the value of $c_{i+1}$ becomes 1, and the meaning thereof becomes $e_i$, then add $e_i$ to $(e_i+c_i)\%2$, the value of $(e_i+c_i)\%2$ becomes 1, and the meaning thereof becomes $c_i$, then add $c_i$ to $(e_i+f_i)\%2$, the value of $(e_i+f_i)\%2$ becomes 1, and the meaning thereof becomes $s_i$.

Example 2: $(e_i+c_i)\%2$ is 1, $(e_i+f_i)\%2$ is 1, $c_{i+1}$ is 1.

Start by adding $(e_i+c_i)\%2$ and $(e_i+f_i)\%2$ to $c_{i+1}$, the value of $c_{i+1}$ becomes 0, and the meaning thereof becomes $e_i$, then add $e_i$ to $(e_i+c_i)\%2$, the value of $(e_i+c_i)\%2$ becomes 1, and the meaning thereof becomes $c_i$, then add $c_i$ to $(e_i+f_i)\%2$, the value of $(e_i+f_i)\%2$ becomes 0, and the meaning thereof becomes $s_i$.

As shown in FIG. 57, the last CNOT gate from top to bottom, that is, the CNOT gate between the MAJ module and the UMA module in the entire adder, is used for storing the result of $c_{i+1}$.

S5403. Execute an addition operation on each sub-quantum state of the two quantum states to be operated through the target quantum circuit, generate a target quantum state result, and output it.

In this embodiment, by inputting the two quantum states to be operated, such as |111> and |111>, into the adder (that is, the target quantum circuit), the corresponding binary representation of the operation result of the target quantum state (including carry term and the result term obtained by direct addition of each sub-quantum state). Then the binary expression of the result |1110> of the target quantum state is directly output, or is further transformed into a decimal result 14 and output to complete the addition operation of the two target data.

It can be seen that, by obtaining dividend data and divisor data to be operated, transforming the dividend data into a first target quantum state, and transforming the divisor data into a second target quantum state; for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; for a current first target quantum state and a current second target quantum state, iteratively executing quantum state evolution corresponding to fractional part operation of the quotient; and outputting a finally obtained quantum state on a qubit with preset precision bits: the disclosure realizes a basic arithmetic operation that can be used in quantum circuits, and fills the gap in the related art.

Figure 62:
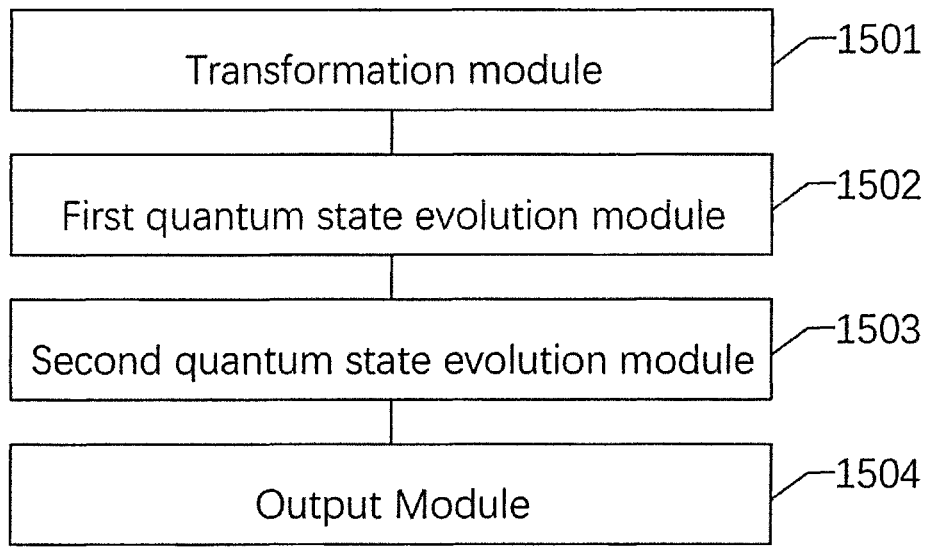
FIG. 62 is a schematic structural illustration of a device of quantum division operation with precision provided in an embodiment of the present disclosure.

Referring to FIG. 62, FIG. 62 is a schematic structural illustration of A device of quantum division operation with precision provided in an embodiment of the present disclosure, which may include:

A transformation module 51501, configured for: obtaining, by a processor, dividend data and divisor data to be operated, transforming the dividend data into a first target quantum state, and transforming the divisor data into a second target quantum state; wherein each of the first target quantum state and the second target quantum state includes: a sign-bit sub-quantum state representing a data sign, and a value bit sub-quantum state representing a data value.

A first quantum state evolution module 51502, configured for: for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation;

A second quantum state evolution module 51503, configured for: for a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits;

An output module 51504, configured for: outputting a finally obtained quantum state on a qubit with preset precision bits, wherein the quantum state includes binary values for fractional part of the quotient.

Specifically, the first quantum state evolution module is configured for:

For a current first target quantum state and the second target quantum state, executing quantum state evolution corresponding to the subtraction operation, to obtain the first target quantum state including a subtraction operation result;

For a third target quantum state of a current first preset auxiliary qubit and a fourth target quantum state of a current second preset auxiliary qubit, executing quantum state evolution corresponding to the subtraction operation, to increment a value contained in the current third target quantum state by 1; wherein an initial value contained in the third target quantum state and a value contained in the fourth target quantum state are both −1;

Measuring a sign-bit sub-quantum state of the first target quantum state currently including the subtraction operation result, and determining whether a value of the sign bit of the first target quantum state that currently contains the subtraction operation result is 0;

In the case that the value of the sign bit of the first target quantum state that currently contains the subtraction operation result is 0, returning and executing the step "for a current first target quantum state and the second target quantum state, executing quantum state evolution corresponding to the subtraction operation", until it is determined that the value of the sign bit of the first target quantum state currently including the subtraction operation result is 1.

Specifically, the output module is configured for:

Outputting a finally obtained third target quantum state, wherein the third target quantum state contains an integer-bit binary value of a quotient of dividing the dividend data by the divisor data.

Specifically, the second quantum state evolution module is configured for:

Inverting the sign-bit sub-quantum state of the current second target quantum state, executing the quantum state evolution corresponding to the subtraction operation for the current first target quantum state and the second target quantum state with its sign bit inverted, so as to evolve the current first target quantum state to a quantum state including a binary value of a remainder of dividing said dividend data by said divisor data;

Left-shifting sub-quantum state of each bit of the current first target quantum state by one bit, and re-inverting the sign-bit sub-quantum state of the current second target quantum state; for the first target quantum state that has been left-shifted by one bit and the second target quantum state that has been re-inverted, iteratively executing quantum state evolution corresponding to the subtraction operation, counting the number of executions of the subtraction operation until the first target quantum state that has been left-shifted by one bit is reduced to a negative number, and obtaining a fractional part quantum state including a binary value of the counting result on a preset intermediate bit qubit;

Swapping a sub-quantum state of the last bit of the fractional part quantum state with the initial quantum state |0⟩ of the corresponding preset precision bit qubit, and outputting a quantum state on the preset precision bit qubit after swapping;

Returning to execute the step of "inverting the sign-bit sub-quantum state of the current second target quantum state, executing the quantum state evolution corresponding to the subtraction operation for the current first target quantum state and the second target quantum state with its sign bit inverted", until a preset number of iterations required for the quantum state evolution corresponding to the iterative execution of the fractional part operation of the quotient is reached, wherein the preset number of iterations is equal to the number of precision bits in the fractional part to be operated.

Specifically, the device further includes:

An execution module, configured for: obtaining a preset sign-bit-qubit, and executing a preset quantum logic gate operation for a qubit corresponding to the sign-bit sub-quantum state of the first target quantum state, a qubit corresponding to the sign-bit sub-quantum state of the second target quantum state, the first preset auxiliary qubit and the preset sign-bit-qubit, so as to finally obtain a sign value represented by a sign-bit-qubit sub-quantum state in the third target quantum state.

Specifically, the operation module includes:

A first complement operation unit, configured for: for two quantum states to be operated, i.e, a minuend quantum state including the minuend data and a subtrahend quantum state including the subtrahend data, obtaining a quantum state of a third preset auxiliary qubit, and according to a sign-bit sub-quantum state of the minuend quantum state and the quantum state of the third preset auxiliary qubit, controlling the minuend quantum state to execute quantum state evolution corresponding to the complement operation so as to obtain a first complement quantum state; wherein the first complement quantum state is a quantum state including the complement of the minuend data;

A second complement operation unit, configured for: for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state including the complement of the subtrahend data;

An addition operation unit, configured for: for the first complement quantum state and the second complement quantum state, executing quantum state evolution corresponding to the addition operation, so as to evolve the first complement quantum state into a fifth target quantum state including a sum of a complement of the minuend data and a complement of the subtrahend data;

A third complement operation unit, configured for: according to the sign-bit sub-quantum state in the fifth target quantum state as well as the quantum state of the third preset auxiliary qubit, controlling the fifth target quantum state to execute the quantum state evolution corresponding to the complement operation, so as to obtain an evoluted sixth target quantum state which is output as the subtraction operation result of subtracting the subtrahend data from the minuend data, wherein the sixth target quantum state is a quantum state including a complement of the sum of the complement;

A fourth complement operation unit, configured for: according to the sign-bit sub-quantum state in the current subtrahend quantum state and the quantum state of the current third preset auxiliary qubit, controlling the current subtrahend quantum state to execute the quantum state evolution corresponding to the complement operation, and executing quantum state evolution corresponding to sign-bit-inversion for the sign-bit sub-quantum state in the current subtrahend quantum state, so as to restore the current subtrahend quantum state.

Specifically, the first complement operation unit is configured for:

Executing a CNOT gate operation on the first sign-bit-qubit corresponding to the sign-bit sub-quantum state in the minuend quantum state and the third preset auxiliary qubit, wherein the first sign-bit-qubit is a controlling bit and the third preset auxiliary qubit is a controlled bit;

According to the quantum state of the third preset auxiliary qubit after execution of the CNOT gate operation, controlling whether the current minuend quantum state executes the quantum state evolution corresponding to the complement operation:

If yes, inverting the non-sign-bit sub-quantum state of the current minuend quantum state, and for the inverted minuend quantum state and the fourth preset auxiliary qubit quantum state $|1\rangle$, executing quantum state evolution corresponding to the addition operation to obtain the evolved first complement quantum state; otherwise, using the minuend quantum state as the first complement quantum state;

Executing CNOT gate operation on the current first sign-bit-qubit and the third preset auxiliary qubit to restore the current quantum state of the third preset auxiliary qubit; wherein the first sign-bit-qubit is a controlling bit, and the third preset auxiliary qubit is a controlled bit.

Specifically, the second complement operation unit is specifically configured for:

For the second sign-bit-qubit corresponding to the sign-bit sub-quantum state in the subtrahend quantum state, executing an X-gate operation to obtain the inverted sign-bit sub-quantum state;

Executing a CNOT gate operation on the current second sign-bit-qubit and the third preset auxiliary qubit, wherein the second sign-bit-qubit is a controlling bit, and the third preset auxiliary qubit is a controlled bit;

According to the current quantum state of the third preset auxiliary qubit after execution of the CNOT gate operation, controlling whether the current subtrahend quantum state executes the quantum state evolution corresponding to the complement operation;

If yes, inverting the non-sign-bit sub-quantum state of the current subtrahend quantum state, and for the inverted subtrahend quantum state and the fourth preset auxiliary qubit quantum state $|1\rangle$, executing quantum state evolution corresponding to the addition operation to obtain the evolved second complement quantum state; otherwise, using the current subtrahend quantum state as the second complement quantum state;

Executing a CNOT gate operation on the current second sign-bit-qubit and the third preset auxiliary qubit to restore the current quantum state of the third preset auxiliary qubit; wherein the second sign-bit-qubit is a controlling bit, and the third preset auxiliary qubit is a controlled bit.

Specifically, the addition operation unit includes:

A determination subunit, configured for: according to the bit number of qubits corresponding to the two quantum states to be operated, determining a target module number of the front-cascading modules (MAJ module) to be cascaded and a target module number of the rear-cascading modules (UMA module) to be cascaded, wherein the number of the MAJ modules equals to the number of the UMA modules;

A cascading subunit, configured for: according to an addition instruction, cascading the MAJ modules and the UMA modules both in the target module number, to generate a target quantum circuit corresponding to the adder;

An operation subunit, configured for: executing, with the target quantum circuit, an addition operation of each sub-quantum state of the two quantum states to be operated, so as to generate and output a target quantum state result.

Specifically, the MAJ module is an MAJ quantum circuit, the UMA module is a UMA quantum circuit, and each of the MAJ quantum circuit and the UMA quantum circuit includes two CNOT quantum logic gates and one TOFFOLI quantum logic gate, The addition operation unit further includes:

An obtaining subunit, configured for obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate;

A constructing subunit, configured for: according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

Specifically, the MAJ module and the UMA module each includes three input items and three output items, and the cascade subunit is specifically configured for:

According to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

Specifically, the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated; the cascading subunit is specifically configured for:

According to the addition instruction, using the carry output item output by the previous MAJ module and the two sub-quantum state input items to be operated as the three input items of the next MAJ module, so as to cascade the MAJ modules in the target module number;

Using two intermediate result output items of an MAJ module as two input items of a corresponding UMA module, obtaining a previous UMA module preceeding the corresponding UMA module, and using the result carry output item of the previous UMA module as an input item of the corresponding UMA module, so as to cascade MAJ modules in the target module number and the UMA modules in the target module number to generate the initial quantum circuit, wherein the carry output item of the last MAJ module is used as an input item to the corresponding first UMA module;

Adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

It can be seen that, by obtaining dividend data and divisor data to be operated, transforming the dividend data into a first target quantum state, and transforming the divisor data into a second target quantum state; for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; for a current first target quantum state and a current second target quantum state, iteratively executing quantum state evolution corresponding to fractional part operation of the quotient; and outputting a finally obtained quantum state on a qubit with preset precision bits: the disclosure realizes a basic arithmetic operation that can be used in quantum circuits, and fills the gap in the related art.

Yet another embodiment of the present disclosure provides an electronic device, including a memory having a computer program stored therein, and a processor, configured to execute the computer program to perform the following method:

S1. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing the data sign and a value bit sub-quantum state representing the data value;

S2. For the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation;

S3. For a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits;

S4. Outputting the finally obtained quantum state on qubits with preset precision, where the quantum state includes a binary value of fractional part of the quotient.

Yet another embodiment of the present disclosure provides a storage medium, in which a computer program is stored, wherein the computer program is configured to execute the following method when running:

S1. Obtaining dividend data and divisor data to be operated, transforming the dividend data into a first target quantum state, and transforming the divisor data into a second target quantum state; wherein, each of the first target quantum state and the second target quantum state includes: a sign-bit sub-quantum state representing a data sign, and a value bit sub-quantum state representing a data value;

S2. For the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation;

S3. For a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits;

S4. Outputting the finally obtained quantum state on qubits with preset precision, where the quantum state includes a binary value of fractional part of the quotient.

The structure, features and effects of the present disclosure have been described in detail above based on the embodiments shown in the drawings. The above descriptions are only preferred embodiments of the present disclosure, and the present disclosure does not limit the scope of implementation to what is shown in the drawings. Any changes made according to the idea of the present disclosure or modifications to equivalent embodiments that are equivalent changes still within the spirit covered by the description and illustrations, shall fall into the protection scope of the present disclosure.

The invention claimed is:

1. A method for quantum division operation with precision in a quantum computer, the method comprising:

obtaining dividend data and divisor data to be operated, transforming the dividend data into a first target quantum state, and transforming the divisor data into a second target quantum state; wherein each of the first target quantum state and the second target quantum state comprises: a sign-bit sub-quantum state representing a data sign, and a value bit sub-quantum state representing a data value;

for the first target quantum state and the second target quantum state, iteratively executing quantum state evolution corresponding to a subtraction operation, counting the number of executions of the subtraction operation until the dividend data is reduced to a negative number, and outputting a finally obtained counting result as integer part of a quotient of dividing the dividend data by the divisor data; wherein a subtraction result of the preceding subtraction operation is used as a minuend of each execution of the subtraction operation, and the divisor data is used as a subtrahend of each execution of the subtraction operation;

for a current first target quantum state and a current second target quantum state, iteratively executing quantum state evolution corresponding to fractional part operation of the quotient, wherein a preset number of iterations therefor is equal to the number of precision bits in the fractional part to be operated, and after each iteration, obtaining a quantum state of a value including corresponding precision bits on a corresponding qubit with preset precision bits; and outputting a finally obtained quantum state on a qubit with the preset precision bits, wherein the quantum state comprises binary values for fractional part of the quotient, wherein said executing the quantum state evolution corresponding to the subtraction operation further comprises:

for two quantum states to be operated, i.e, a minuend quantum state including a minuend data and a subtrahend quantum state including a subtrahend data, obtaining a quantum state of a third preset auxiliary qubit, and according to a sign-bit sub-quantum state of the minuend quantum state and the quantum state of the third preset auxiliary qubit, controlling the minuend quantum state to execute quantum state evolution corresponding to a complement operation so as to obtain a first complement quantum state; wherein the first complement quantum state is a quantum state comprising a complement of the minuend data;

for the sign-bit sub-quantum state in the subtrahend quantum state, executing first quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation so as to obtain a second complement quantum state; wherein the second complement quantum state is a quantum state comprising a complement of the subtrahend data;

for the first complement quantum state and the second complement quantum state, executing second quantum state evolution corresponding to an addition operation, so as to evolve the first complement quantum state into a fifth target quantum state comprising a sum of a complement of the minuend data and a complement of the subtrahend data;

according to the sign-bit sub-quantum state in the fifth target quantum state as well as the quantum state of the third preset auxiliary qubit, controlling the fifth target quantum state to execute the quantum state evolution corresponding to the complement operation, so as to obtain an evoluted sixth target quantum state which is output as the subtraction operation result of subtracting the subtrahend data from the minuend data, wherein the evoluted sixth target quantum state is a quantum state including a complement of the sum of the complement of the minuend data; and according to the sign-bit sub-quantum state in the current subtrahend quantum state and the quantum state of a current third preset auxiliary qubit, controlling the current subtrahend quantum state to execute the quantum state evolution corresponding to the complement operation, and executing quantum state evolution corresponding to sign-bit-inversion for the sign-bit sub-quantum state in the current subtrahend quantum state, so as to restore the current subtrahend quantum state, and wherein said "executing quantum state evolution corresponding to the addition operation" comprises:

according to a bit number of qubits corresponding to the two quantum states to be operated, determining a target module number of front-cascading modules (MAJ module) to be cascaded and a target module number of rear-cascading modules (UMA module) to be cascaded, wherein the number of the MAJ modules equals to the number of the UMA modules;

according to an addition instruction, cascading the MAJ modules and the UMA modules both in the target module number, to generate a target quantum circuit corresponding to an adder; and executing, with the target quantum circuit, an addition operation of each sub-quantum state of the two quantum states to be operated, so as to generate and output a target quantum state result.

2. The method of claim 1, wherein said "for the first target quantum state and the second target quantum state, iteratively executing quantum state evolution corresponding to a subtraction operation, counting the number of executions of the subtraction operation until the dividend data is reduced to a negative number" comprises:

for the current first target quantum state and the second target quantum state, executing quantum state evolution corresponding to the subtraction operation, to obtain the first target quantum state including a subtraction operation result;

for a third target quantum state of a current first preset auxiliary qubit and a fourth target quantum state of a current second preset auxiliary qubit, executing quantum state evolution corresponding to the subtraction operation, to increment a value contained in a current third target quantum state by 1; wherein an initial value contained in the third target quantum state and a value contained in the fourth target quantum state are both −1;

measuring a sign-bit sub-quantum state of the first target quantum state currently including the subtraction operation result, and determining whether a value of a sign bit of the first target quantum state that currently contains the subtraction operation result is 0;

in the case that the value of the sign bit of the first target quantum state that currently contains the subtraction operation result is 0, returning and executing the step "for a current first target quantum state and the second target quantum state, executing quantum state evolution corresponding to the subtraction operation", until it is determined that the value of the sign bit of the first target quantum state currently including the subtraction operation result is 1.

3. The method of claim 2, wherein said "outputting a finally obtained counting result as integer part of a quotient of dividing the dividend data by the divisor data" comprises:

outputting a finally obtained third target quantum state, wherein the third target quantum state contains an integer-bit binary value of the quotient of dividing the dividend data by the divisor data.

4. The method of claim 3, wherein said "for a current first target quantum state and a current second target quantum state, iteratively executing quantum state evolution corresponding to fractional part operation of the quotient" comprises:

inverting the sign-bit sub-quantum state of the current second target quantum state, executing the quantum state evolution corresponding to the subtraction operation for the current first target quantum state and the second target quantum state with its sign bit inverted, so as to evolve the current first target quantum state to a quantum state including a binary value of a remainder of dividing said dividend data by said divisor data;

left-shifting sub-quantum state of each bit of the current first target quantum state by one bit, and re-inverting the sign-bit sub-quantum state of the current second target quantum state; for the first target quantum state that has been left-shifted by one bit and the second target quantum state that has been re-inverted, iteratively executing quantum state evolution corresponding to the subtraction operation, counting the number of executions of the subtraction operation until the first target quantum state that has been left-shifted by one bit is reduced to a negative number, and obtaining a fractional part quantum state including a binary value of the counting result on a preset intermediate bit qubit;

swapping a sub-quantum state of the last bit of the fractional part quantum state with an initial quantum state |0⟩ of the corresponding preset precision bit qubit, and outputting a quantum state on the preset precision bit qubit after swapping; and returning to execute the step of "inverting the sign-bit sub-quantum state of the current second target quantum state, executing the quantum state evolution corresponding to the subtraction operation for the current first target quantum state and the second target quantum state with its sign bit inverted", until a preset number of iterations required for the quantum state evolution corresponding to the iterative execution of the fractional part operation of the quotient is reached, wherein the preset number of iterations is equal to the number of precision bits in the fractional part to be operated.

5. The method of claim 4, further comprising:

obtaining a preset sign-bit-qubit, and executing a preset quantum logic gate operation for a qubit corresponding to the sign-bit sub-quantum state of the first target quantum state, a qubit corresponding to the sign-bit sub-quantum state of the second target quantum state, a first preset auxiliary qubit and the preset sign-bit-qubit, so as to finally obtain a sign value represented by a sign-bit-qubit substate in the third target quantum state.

6. The method of claim 1, wherein said "according to a sign-bit sub-quantum state of the minuend quantum state and the quantum state of the third preset auxiliary qubit, controlling the minuend quantum state to execute quantum state evolution corresponding to the complement operation" comprises:

executing a CNOT gate operation on a first sign-bit-qubit corresponding to the sign-bit sub-quantum state in the minuend quantum state and the third preset auxiliary qubit, wherein the first sign-bit-qubit is a controlling bit and the third preset auxiliary qubit is a controlled bit;

according to the quantum state of the third preset auxiliary qubit after execution of the CNOT gate operation, controlling whether a current minuend quantum state executes the quantum state evolution corresponding to the complement operation:

if yes, inverting a non-sign-bit sub-quantum state of the current minuend quantum state, and for an inverted minuend quantum state and a fourth preset auxiliary qubit quantum state |1⟩, executing quantum state evolution corresponding to the addition operation to obtain an evolved first complement quantum state; otherwise, using the minuend quantum state as the first complement quantum state; and executing CNOT gate operation on a current first sign-bit-qubit and the third preset auxiliary qubit to restore a current quantum state of the third preset auxiliary qubit; wherein the first sign-bit-qubit is a controlling bit, and the third preset auxiliary qubit is a controlled bit.

7. The method of claim 1, wherein said "for the sign-bit sub-quantum state in the subtrahend quantum state, executing quantum state evolution corresponding to sign-bit-inversion, and according to a quantum state of the third preset auxiliary qubit and an inverted sign-bit sub-quantum state, controlling a current subtrahend quantum state to execute a quantum state evolution corresponding to the complement operation" comprises:

executing an X-gate operation on a second sign-bit-qubit corresponding to the sign-bit sub-quantum state in the subtrahend quantum state to obtain the inverted sign-bit sub-quantum state;

executing a first CNOT gate operation on a current second sign-bit-qubit and the third preset auxiliary qubit, wherein the second sign-bit-qubit is a controlling bit, and the third preset auxiliary qubit is a controlled bit;

according to a current quantum state of the third preset auxiliary qubit after execution of the CNOT gate operation, controlling whether the current subtrahend quantum state executes the quantum state evolution corresponding to the complement operation:

if yes, inverting a non-sign-bit sub-quantum state of the current subtrahend quantum state, and for an inverted subtrahend quantum state and a fourth preset auxiliary qubit quantum state |1⟩ , executing quantum state evolution corresponding to the addition operation to obtain an evolved second complement quantum state; otherwise, using the current subtrahend quantum state as the second complement quantum state;

executing a second CNOT gate operation on the current second sign-bit-qubit and the third preset auxiliary qubit to restore the current quantum state of the third preset auxiliary qubit; wherein the second sign-bit-qubit is a controlling bit, and the third preset auxiliary qubit is a controlled bit.

8. The method of claim 1, wherein the MAJ module is an MAJ quantum circuit, the UMA module is a UMA quantum circuit, and each of the MAJ quantum circuit and the UMA quantum circuit comprises two CNOT quantum logic gates and one TOFFOLI quantum logic gate, the method further comprises, before the step "according to an addition instruction, cascading the MAJ modules and the UMA modules both in the target module number, to generate a target quantum circuit corresponding to the adder":

obtaining operation qubits corresponding to the two CNOT quantum logic gates and one TOFFOLI quantum logic gate, a control relationship between the operation qubits, and a timing relationship between the two CNOT quantum logic gates and the one TOFFOLI quantum logic gate; and according to the operation qubits, the control relationship and the timing relationship, using the two CNOT quantum logic gates and the one TOFFOLI quantum logic gate to construct and generate the MAJ quantum circuit or the UMA quantum circuit as a corresponding MAJ module or a corresponding UMA module.

9. The method of claim 8, wherein the MAJ module and the UMA module each includes three input items and three output items, said step "according to an addition instruction, cascading the MAJ modules and the UMA modules both in the target module number, to generate a target quantum circuit corresponding to the adder" specifically comprises:

according to the addition instruction, using three output items of an MAJ cascading module as three input items of a corresponding UMA cascading module, so as to cascade the MAJ cascading module with the corresponding UMA cascading module to generate a target quantum circuit corresponding to the adder, wherein the MAJ cascading module is determined by cascading between MAJ modules in the target module number, and the UMA cascading module is determined by cascading between UMA modules in the target module number.

10. The method of claim 9, wherein the three input items of the MAJ module include a carry input item and two sub-quantum state input items to be operated, the three output items of the MAJ module include a carry output item and two intermediate result output items, the three input items of the UMA module include a carry output item and two intermediate result output items of the corresponding MAJ module, and the three output items of the UMA module include a result carry output item, an accumulation output item and a sub-quantum state input item to be operated, said step "according to an addition instruction, using three output items of an MAJ cascading module as three input items of a corresponding UMA cascading module, so as to cascade the MAJ cascading module with the corresponding UMA cascading module to generate a target quantum circuit corresponding to the adder" specifically comprises:

according to the addition instruction, using the carry output item output by the previous MAJ module and the two sub-quantum state input items to be operated as the three input items of the next MAJ module, so as to cascade the MAJ modules in the target module number;

using two intermediate result output items of an MAJ module as two input items of a corresponding UMA module, obtaining a previous UMA module preceding the corresponding UMA module, and using the result carry output item of the previous UMA module as an input item of the corresponding UMA module, so as to cascade MAJ modules in the target module number and the UMA modules in the target module number to generate an initial quantum circuit, wherein the carry output item of the last MAJ module is used as an input item to the corresponding first UMA module; and adding a CNOT quantum logic gate between the last MAJ module and the corresponding first UMA module in the initial quantum circuit, wherein the qubit corresponding to the carry output item of the MAJ module is used as the controlling bit, and the preset auxiliary qubit is used as the controlled bit, so as to generate the target quantum circuit of the adder.

11. An electronic device, comprising:
a memory having a computer program stored therein, and
a processor, configured to execute the computer program to perform the method of claim 1.

12. A non-transitory storage medium having a computer program stored thereon, the computer program being configured to perform during execution thereof the method of claim 1.

* * * * *